United States Patent
Sagayama

(10) Patent No.: US 8,962,972 B2
(45) Date of Patent: Feb. 24, 2015

(54) STRUCTURE INSTALLATION RACK, METHOD FOR INSTALLING THE SAME, STRUCTURE CONNECTING STRUCTURE, CONNECTION MEMBER AND METHOD FOR INSTALLING THIS STRUCTURE CONNECTING STRUCTURE, AND SOLAR CELL SYSTEM

(75) Inventor: Kenichi Sagayama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/389,329

(22) PCT Filed: Aug. 4, 2010

(86) PCT No.: PCT/JP2010/063217
§ 371 (c)(1),
(2), (4) Date: Feb. 7, 2012

(87) PCT Pub. No.: WO2011/016498
PCT Pub. Date: Feb. 10, 2011

(65) Prior Publication Data
US 2012/0132262 A1 May 31, 2012

(30) Foreign Application Priority Data

Aug. 7, 2009 (JP) ................................. 2009-185047
Aug. 7, 2009 (JP) ................................. 2009-185050
Oct. 30, 2009 (JP) ................................. 2009-251345
Oct. 30, 2009 (JP) ................................. 2009-251346

(51) Int. Cl.
*H01L 31/0203* (2014.01)
*H01L 31/042* (2014.01)

(52) U.S. Cl.
CPC ................. *H02S 20/00* (2013.01); *Y02B 10/12* (2013.01); *Y02E 10/50* (2013.01)
USPC .......................................... 136/251; 136/244

(58) Field of Classification Search
CPC ............. E04F 10/00; E04D 3/35; E04D 3/36; E04D 3/362
See application file for complete search history.

(56) References Cited

U.S. PATENT DOCUMENTS 4,219,981 A * 9/1980 Stewart et al. ................... 52/478
6,499,408 B1 * 12/2002 Kundel, Sr. ...................... 104/94

(Continued)

FOREIGN PATENT DOCUMENTS

JP 59-158943 9/1984
JP 7-158218 6/1995

(Continued)

OTHER PUBLICATIONS

Gardner, Gutter Repair, Handyman, pp. 92-95, Feb. (2005).*

(Continued)

*Primary Examiner* — Jayne Mershon
(74) *Attorney, Agent, or Firm* — Nixon & Vanderhye, P.C.

(57) ABSTRACT

A structure installation rack in one embodiment is formed with horizontal rails (15) obtained by connecting a plurality of rail members (151, 152) having a pair of side plates extending in the same direction, and having a shape in which the sides of the pair of side plates extending in the direction are linked by the main plate. The connected rail members (151, 152) have a shape in which part of at least one end of the main plate or each side plate is cut off. One end of each side plate of each of the rail members (151, 152) and the other end of each side plate are connected in a state in which the one end of each side plate is superposed on the inside or outside of the other end of each side plate.

9 Claims, 44 Drawing Sheets

(56) References Cited

U.S. PATENT DOCUMENTS

| | | |
|---|---|---|
| 2003/0070368 A1* | 4/2003 | Shingleton .................. 52/173.3 |
| 2006/0055209 A1* | 3/2006 | Hoshino |
| 2008/0155908 A1* | 7/2008 | Nomura et al. |
| 2009/0165841 A1* | 7/2009 | Gunn et al. .................. 136/245 |
| 2010/0243023 A1* | 9/2010 | Patton et al. |
| 2010/0275977 A1* | 11/2010 | Kinard et al. ................. 136/251 |
| 2010/0294340 A1* | 11/2010 | Cunningham et al. ........ 136/251 |

FOREIGN PATENT DOCUMENTS

| | | |
|---|---|---|
| JP | 9-235844 | 9/1997 |
| JP | 2001-164713 | 6/2001 |
| JP | 2008-208554 | 9/2008 |
| WO | WO 2008/105296 | 9/2008 |

OTHER PUBLICATIONS

International Search Report for PCT/JP2010/063217, mailed Nov. 9, 2010.

* cited by examiner

FIG.17
(a)
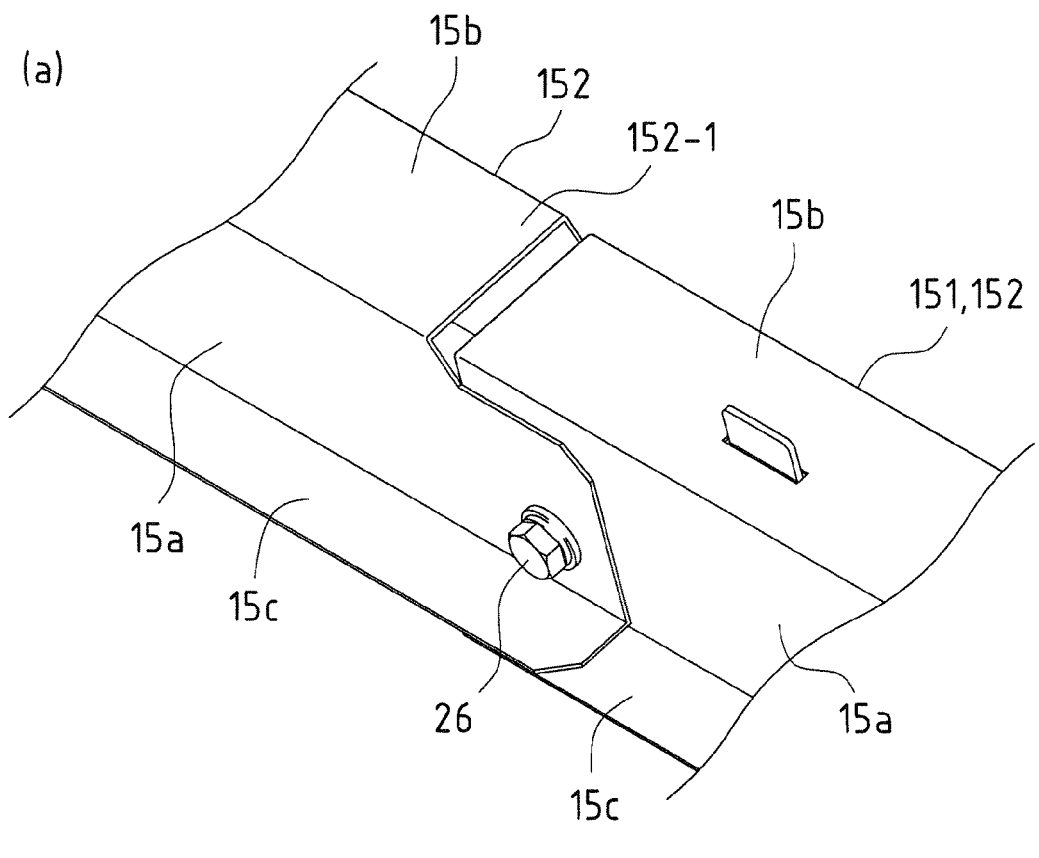
(b)
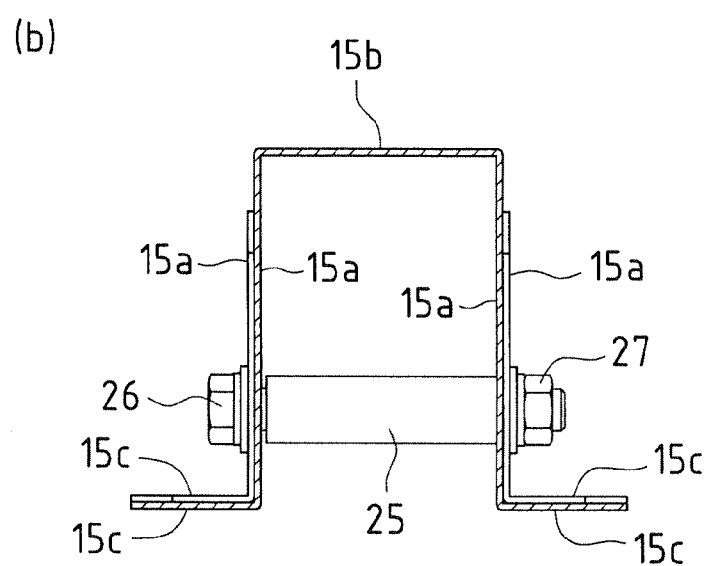

FIG.20
(a)
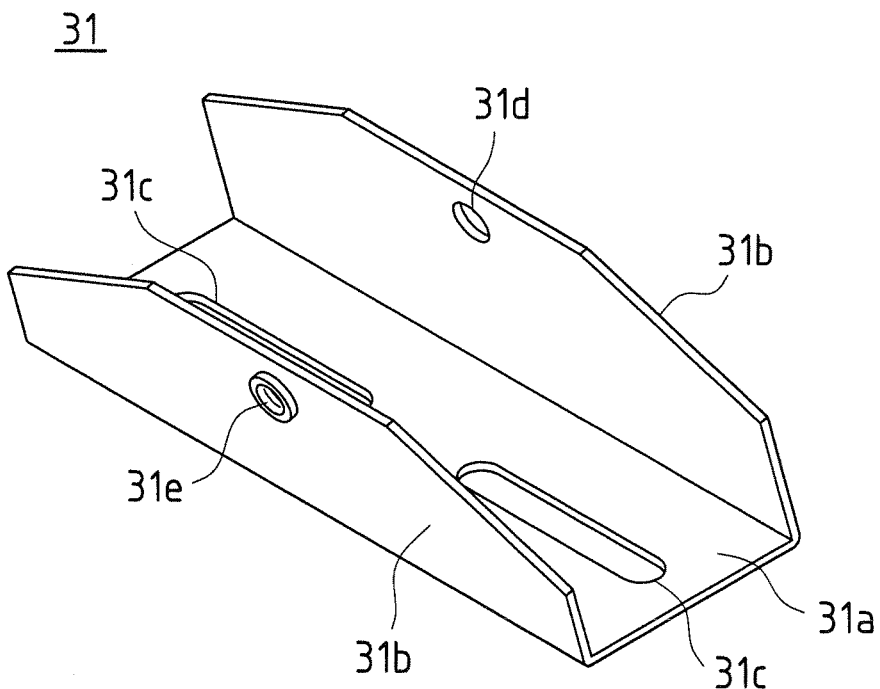
(b)
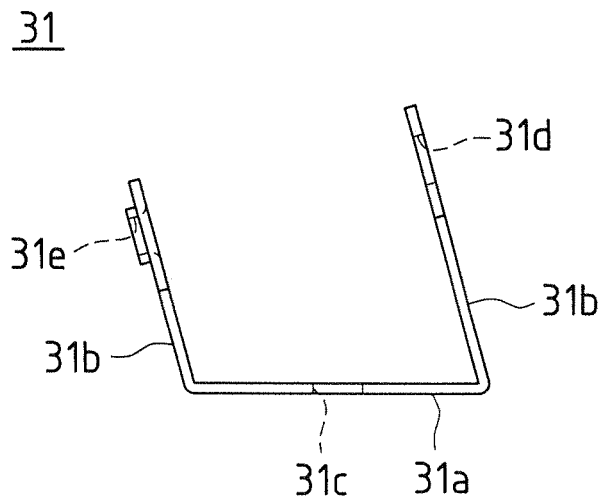

FIG.21
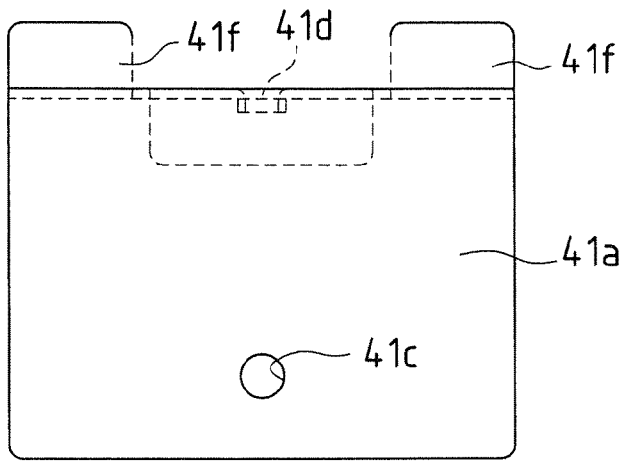
(a)
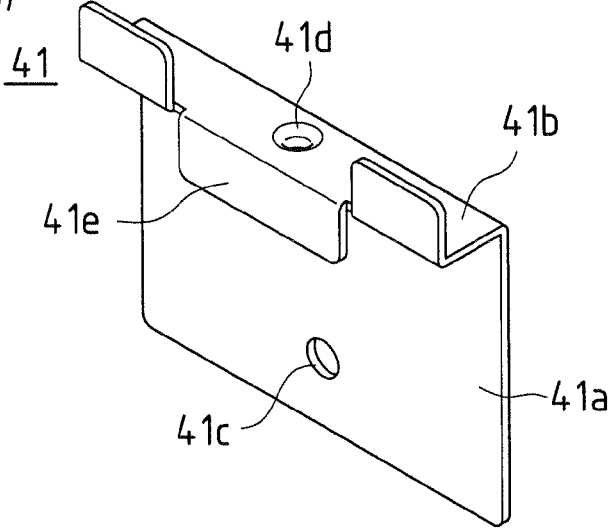
(b)
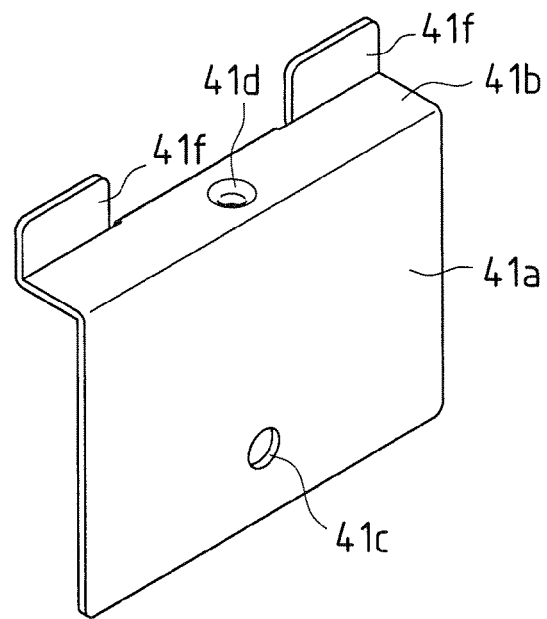
(c)

FIG.22
(a)
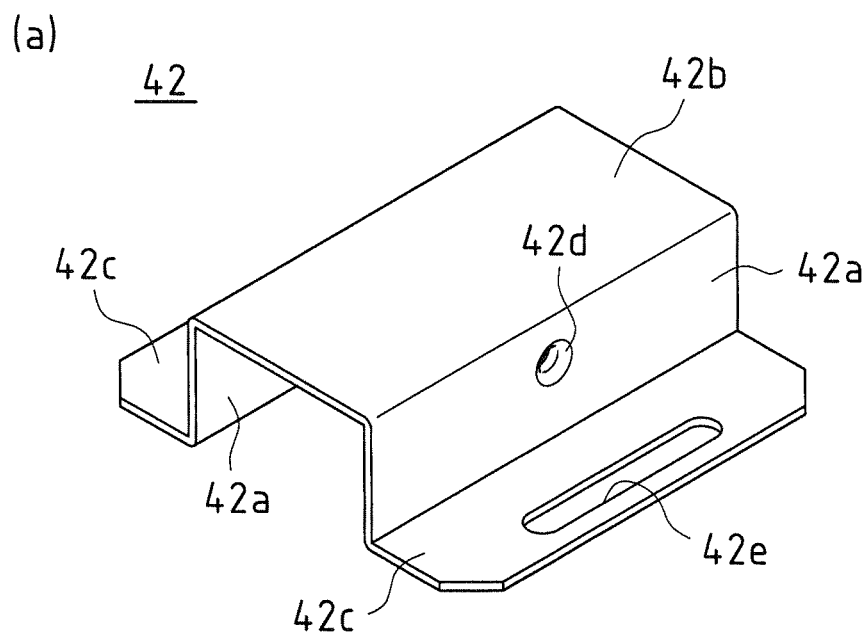
(b)
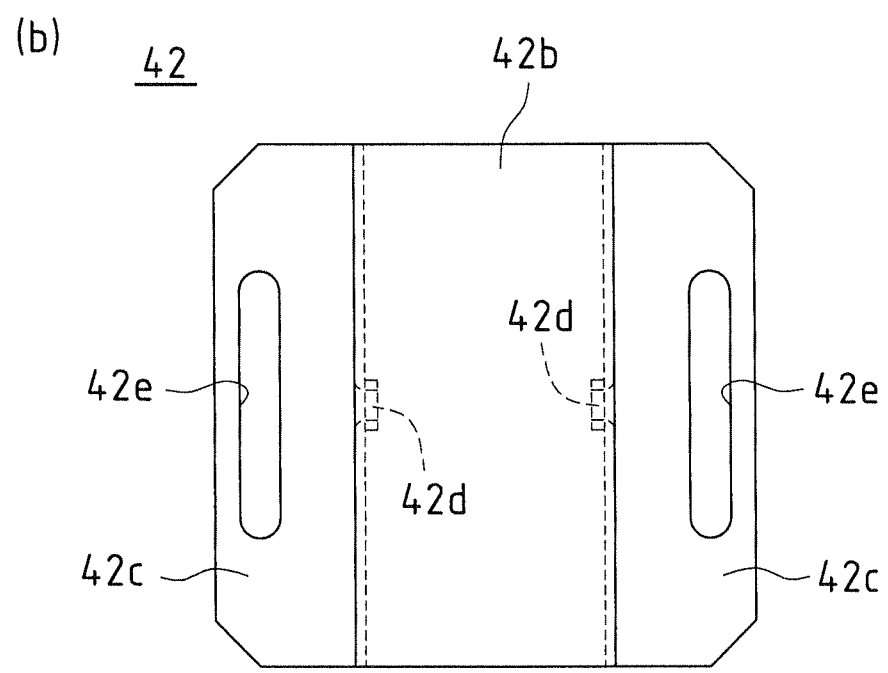

FIG.30
(a)
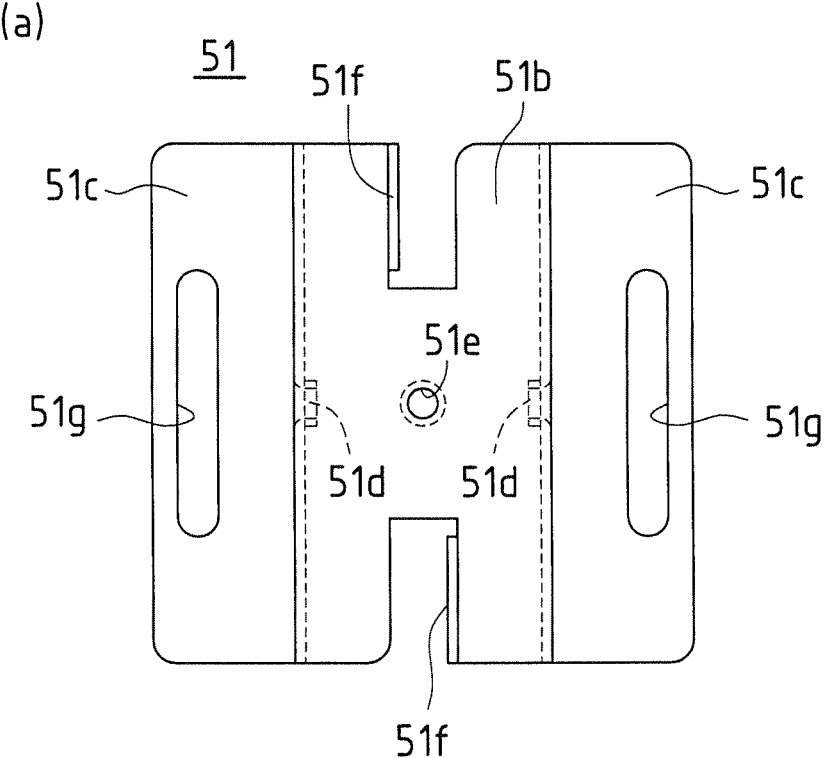
(b)
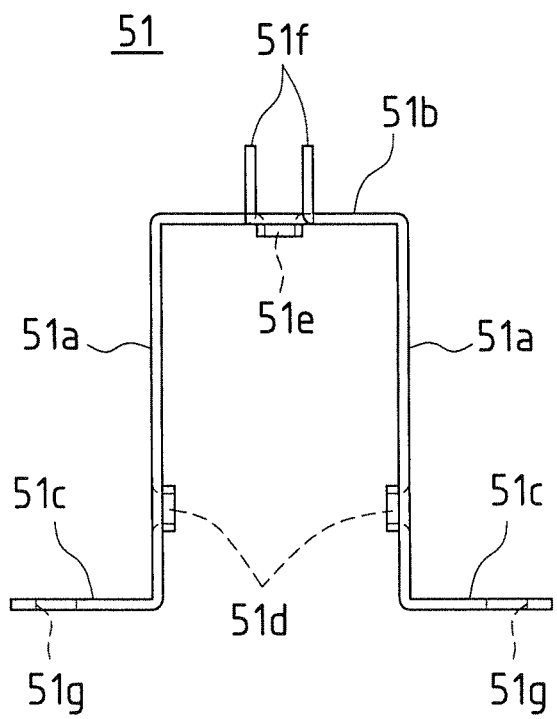

US 8,962,972 B2

STRUCTURE INSTALLATION RACK, METHOD FOR INSTALLING THE SAME, STRUCTURE CONNECTING STRUCTURE, CONNECTION MEMBER AND METHOD FOR INSTALLING THIS STRUCTURE CONNECTING STRUCTURE, AND SOLAR CELL SYSTEM

This application is the U.S. national phase of International Application No. PCT/JP2010/063217 filed 4 Aug. 2010 which designated the U.S. and claims priority to JP Application Nos. 2009-185047 filed 7 Aug. 2009, 2009-185050 filed 7 Aug. 2009, 2009-251345 filed 30 Oct. 2009, 2009-251346 filed 30 Oct. 2009, the entire contents of each of which are hereby incorporated by reference.

TECHNICAL FIELD

The present invention relates to a structure installation rack for installing and connecting solar cell modules and other such structures, to a structure connecting structure, to connecting members used therefor, to a method for installing the same, and to a solar cell system.

BACKGROUND ART

For example, in a solar cell system, a solar cell module, which is a structure, is fixed and supported on a rack. This rack needs to be able not only to support the weight of the solar cell module, but also to withstand wind pressure exerted on the solar cell module, so it needs to have high strength. Since a solar cell module in the form of a flat panel is susceptible to high wind pressure, care has to be exercised in regard to the strength of the rack.

For instance, with the attachment structure of Patent Literature 1, support rails on which a combination of cylindrical bodies are provided, and the ends of a solar cell module are supported by these support rails. Because the cylindrical bodies themselves have large section modulus, a combination of cylindrical bodies gives the support rails high strength.

With the attachment structure of Patent Literature 2, a plurality of frames having a hat-shaped cross section are arranged in rows, and a solar cell module is fixed and supported on these frames. These hat-shaped frames also have large section modulus, so strength of the frames is high.

PRIOR ART DOCUMENT

Patent Documents

Patent Literature 1: JP 2001-164713A
Patent Literature 2: JP H9-235844A

DISCLOSURE OF INVENTION

Problem to be Solved by the Invention

Patent Literature 1 and 2 are premised on the installation of a solar cell module at a home or the like, so there is a limited surface area over which the solar cell module can be installed, and the support rails and frames can only be up to about a few meters in length.

However, at a large-scale power generating plant or the like, numerous solar cell modules are installed in rows, so when the support rails of Patent Literature 1 or the frames of Patent Literature 2 are used, the support rails or frames have to be extended.

With Patent Literature 1, a cylindrical portion is provided at one end of two support rails, a rod-shaped portion is provided at the other end, the cylindrical portion and the rod-shaped portion are fitted together at these ends to connect two support rails, and this allows the support rails to be extended. However, providing these cylindrical portions and rod-shaped portions makes the shape of the support rails more complicated and increases the number of parts. Also, when the cylindrical portions and rod-shaped portions of the two support rails are fitted together, these support rails have to be supported linearly, and this is not an easy job. Accordingly, if such support rails are used at a large-scale power plant or the like, the cost is extremely high and the installation work is difficult.

Also, with Patent Literature 2, there is no mention of extending the frames, and application of the frames to a large-scale power plant or the like is not considered.

The attachment structures of Patent Literature 1 and 2 are premised on the installation of a solar cell module on the roof of a home or the like, the solar cell module is laid flat on the roof, and high wind pressure is exerted only on the light receiving face side of the solar cell module, so only this light receiving face side needs to withstand the wind pressure.

With the attachment structure of Patent Literature 1, a cover material is placed over the ends of the solar cell module, and this cover material is screwed to the top plates of the support frames, but this also withstands the wind pressure exerted on the light receiving face side of the solar cell module. With the attachment structure of Patent Literature 2, the ends of the solar cell module are latched to hooks formed on the top plates of the frames, but once again this withstands the wind pressure exerted on the light receiving face side of the solar cell module.

Nevertheless, at a large-scale power generating plant or the like, numerous solar cell modules are arranged in rows so as to be inclined with respect to the ground, and therefore wind pressure is exerted on both the front and back of the solar cell modules. Therefore, when the solar cell modules are merely screwed to the top plates of the support frames as in Patent Literature 1, or when the solar cell modules are merely latched to hooks on the top plates of the frames as in Patent Literature 2, when wind pressure is exerted on the rear face side of the solar cell modules, the screws may loosen from the top plates of the support frames, or the modules may become unlatched from their hooks, making it very likely that the solar cell modules will be blown off, which means that these solar cell module attachment structures are not strong enough.

In view of this, the present invention was conceived in light of the above problems, and it is an object thereof to provide a structure installation rack with which numerous solar cell modules can be securely supported, there are few parts, and the rack is easy to install, as well as a method for installing the structure installation rack, and a solar cell system.

It is also an object of the present invention to provide a structure connecting structure with which a solar cell module can be securely supported even when wind pressure is exerted on the front and back of the solar cell module, as well as connecting members used therein, a method for installing this structure connecting structure, and a solar cell system.

Means for Solving Problem

To solve the above problems, the structure installation rack of the present invention comprises rails for installing a plurality of structures, wherein the rails are obtained by connecting a plurality of rail members each having a main plate and a pair of side plates extending in the same direction, and having a shape in which the sides of the pair of side plates extending in said direction are linked by the main plate, and part of at least one end of the main plate or each side plate of each of the connected rail members is cut off, and one end of each side plate of each of the rail members and the other end of each side plate are connected in a state in which the one end of each side plate is superposed outside or inside the other end of each side plate.

These rail members have a cross sectional shape that is groove-shaped or close to being groove-shaped, the rail members have large section modulus, and the rail members have high strength. Therefore, the rails in which a plurality of rail members are connected have also high strength.

Also, part of at least one end of the main plate and at least one end of each side plate of each of the connected rail members is cut out along said direction, or a cut is made along said direction between the end of the main plate and the end of each side plate.

Consequently, it is easy to superpose one end of each side plate of each of the rail members on the outside or inside of the other end of each side plate. Since ends of the rail members are connected in this state, the side plates on both sides form a double-walled structure at the places where the rail members are connected, and this increases their strength. Furthermore, even if the number of rail members is increased in order to extend the rails, this merely entails repeating the process of superposing and connecting the one end of each side plate of each of the rail members on the outside or inside of the other end of each side plate, so the installation work is easy.

For example, part of at least one end of the main plate and at least one end of each side plate of each of the connected rail members may be cut out along said direction, or a cut may be made along said direction between at least one end of the main plate and at least one end of each side plate.

With a connecting structure such as this, the rail members can be linked even though the main plates of the connected rail members have the same width.

Further, the width of the main plates of the connected rail members is the same.

Also, when at least one end of the main plate of each of the connected rail members is cut out, if the one end of each side plate of each of the rail members and the other end of each side plate are connected in a state in which the one end of each side plate is superposed on the outside or inside of the other end of each side plate, the main plates of the rail members are spaced apart at the position of the cut-out ends of the main plates. Thus, the main plates of the rail members will not interfere with each other, which facilitates connection of the ends of the rail members.

Further, the side plates elastically deform so that the one end of each side plate of each rail member is superposed on the outside or inside of the other end of each side plate. Elastic deformation of the side plates allows one side plate of each of the rail members to be superposed on the outside or inside of another side plate.

Also, a pipe is disposed inside the one or the other end of each side plate in a state in which the one end of each side plate of each of the rail members is superposed on the outside or inside of the other end of each side plate, a bolt is passed through a hole in the one end of each side plate, a hole in the other end of each side plate, and the pipe, and a nut is threaded into the end of the bolt to connect the one end of each side plate to the other end of each side plate.

In this case, the ends of the rail members can be connected with one bolt, one pipe, and one nut, which minimizes the number of parts and assembly steps.

A cylindrical female thread member is disposed inside the one or the other end of each side plate in a state in which the one end of each side plate of each of the rail members is superposed on the outside or inside of the other end of each side plate, and two bolts are passed through holes in the one end of each side plate and holes in the other end of each side plate and are threaded into the female threads on the inside of the cylindrical female thread member from both ends of the cylindrical female thread member to connect the one end of each side plate and the other end of each side plate.

In this case, the rail member ends can be connected with two bolts and one cylindrical female thread member, which minimizes the number of parts and assembly steps.

Also, the bending angle of each of the side plates with respect to the main plate is set so that the separation of the side plates is wider the farther away they are from the main plate.

That is, the opening side of a rail member is made wider. In this case, the side plates of one rail member can be easily superposed inside the side plates of another rail member merely by covering the side plates of the one rail member with the side plates of the other rail member.

Further, the rail members have a hat-shaped cross section defined by a pair of mutually opposing side plates, a main plate that links opposing sides of the side plates, and flanges that are bent at the edges of the side plates. The section modulus of this hat-shaped cross section is greater than the section modulus of a groove-shaped cross section, and the strength of the rail members is higher.

Also, the rail members are formed by roll forming. Roll forming is favorable in the mass production of the rail members, and lowers the cost of the rail members.

Further, the rails are put up by supporting the areas near the connections between the plurality of rail members connected so as to make up the rails. Thus supporting the areas near the connections reinforces those connections.

Also, the rails are laid out in three rows, each of the structures is installed so as to span these rails, and a reinforcing member is provided only to the middle rail of the laid-out rails. Here, when the structures are installed spanning the three rails, a heavy load will be exerted on the middle rail, while the load will be lighter on the two outer rails on either side. In view of this, if the strength of the three rails is set to match the lighter load exerted on the two outer rails on either side, and all of the rails are the same, the rails will be lighter and the cost of the rails can be reduced. However, since the middle rail is not strong enough, a reinforcing member is attached to this middle rail.

In other words, with a configuration in which a reinforcing member is attached to only the middle of the rails, the strength of the three rails can be set according to the lighter load exerted on the two outer rails on either side, which makes the rails lighter and reduces their cost.

If the strength of the three rails were set to match the heavier load exerted on the middle rail, then even though the rails could all be the same, the rails would be heavier and more expensive.

The reinforcing members need only be attached to one end of the rail members of the middle rail. If the reinforcing members are attached to both ends of the rail members, then numbers of the reinforcing members is increased, the installation work is more complicated, and the cost is higher. The reinforcing members have a truss structure, for example.

The middle rail can also be reinforced by providing a reinforcing piece that is superposed and fixed near the middle of the middle rail in the lengthwise direction of the middle rail.

Further, an increase in the number of required parts can be avoided by also using these reinforcing pieces to link and connect the structures to the rails.

Next, another structure installation rack of the present invention comprises base rails arranged in rows, arms provided to protrude from one end of each of the base rails, vertical rails that span and are fixed to the other ends of the base rails and the upper ends of the arms, and horizontal rails that are disposed perpendicular to the vertical rails, are arranged in rows over the vertical rails, and on which the structures are installed and arranged, wherein the horizontal rails are obtained by connecting a plurality of the above-mentioned rail members. Therefore, the horizontal rails have high strength, the horizontal rails can be easily extended by connecting a plurality of rail members, and the installation work is easy.

Also, not only the rail members, but also the base rails, the arms, and the vertical rails are members that include a cross section that is the same as that of the rail members. Accordingly, when rails with a different type of base rails, arms, and vertical rails are connected to make a rack, the ends of the side plates of one rail can be superposed on the outside or inside of the ends of the side plates of another rail, thereby connecting the ends together, and this simplifies the installation work.

Further, the cross sectional shape of the horizontal rails, the base rails, the arms, and the vertical rails may be a hat-shaped cross section, which increases the strength of these portions.

Also, the rail members of the horizontal rails, the base rails, the arms, and the vertical rails may be formed by roll forming, which affords a reduction in cost through mass production of the rail members.

The installation method of the present invention is a method for installing the above-mentioned structure installation rack of the present invention, wherein one end of each side plate of each of the rail members is superposed outside or inside the other end of each side plate, after which the one end of each side plate and the other end of each side plate are connected.

Accordingly, even if the number of rail members is increased in order to extend the rails, this merely involves repeating the above connection work, which makes installation work easier.

Also, the solar cell system of the present invention comprises the above-mentioned structure installation rack of the present invention, wherein solar cell modules are installed as the structures on the horizontal rails of this structure installation rack.

Consequently, since the solar cell modules are flat and disposed obliquely, high wind pressure is likely to be exerted on the front and back of the solar cell modules. Accordingly, it is favorable for the above-mentioned structure installation rack of the present invention to be used as a rack for a solar cell system.

Also, to solve the above-mentioned problem, the structure connecting structure of the present invention is a structure connecting structure for connecting and fixing structures, including rails on which the structures are installed, and connecting members that connect and fix the structures to the rails, wherein the rails have a main plate and a pair of side plates extending in the same direction, and have a shape in which the sides of the pair of side plates extending in said direction are linked by the main plate, and the connecting members are superposed on and fixed to the side plates of the rails, and the connected portions between the connecting members and the structures are located on the center lines of the rails or are in positions that are linearly symmetrical in relation to the center lines.

In other words, the rails have a main plate and a pair of side plates extending in the same direction, and have a shape in which the sides of the pair of side plates extending in said direction are linked by the main plate. These rails have large section modulus and therefore have high strength.

Also, since the connecting members are superposed on and fixed to the side plates of the rails, the connection strength of the structures is increased.

Further, the connected portions between the connecting members and the structures are located on the center lines of the rails or are in positions that are linearly symmetrical in relation to the center lines. Therefore, when wind pressure is exerted on the structures, this wind pressure acts uniformly with respect to the center line of the rails. This improves the load bearing of the rails.

If the wind pressure acted on a location that was offset from the center line, there would be a force that attempted to twist the rails, and this would lower the strength of the rails.

Also, since the structures are connected by the connecting members, even if the strength of the rails is not increased, and only the strength of the connecting members is increased, the strength of the connected portions of the structures can still be increased.

For example, the connecting members are in pairs, the pairs of connecting members are each superposed on and fixed to the side plates of the rails, and the structures are connected at locations of the connecting members that are linearly symmetrical in relation to the center lines of the rails. Alternatively, the connecting members each have a main plate and a pair of side plates extending in the same direction, and have a shape in which the sides of the pair of side plates extending in said direction are linked by the main plate, a cross section of the connecting members is disposed so as to be superposed on the inside of a cross section of the rails, and the structures are connected to the main plates of the connecting members via holes on the center lines of the main plates of the rails. With either of these constitutions, there is an increase in the strength of the connected portions of the structures, and wind pressure exerted on the structures acts uniformly with respect to the center lines of the rails, so the rails have better load bearing.

Also, a cross section of the connecting members is disposed so as to be superposed on the inside of a cross section of the rails, and the side plates of the connecting members are superposed on the side plates of the rails. Consequently, the side plates each have a double-walled structure, and the strength is improved in this double-walled structure portion.

Also, reinforcing members are provided, wherein a cross section of the reinforcing members is disposed inside a cross section of the rails, the side plates of the reinforcing members are superposed on a portion of the side plates of the rails, and the opening in a cross section of the rails is closed by the main plates of the reinforcing members. Specifically, the reinforcing members give the cross sectional shape of the rails a closed structure. Consequently, the section modulus of the rails is larger, and there is a further increase in the strength of the rails.

Alternatively, there are provided a pipe disposed on the inside of a cross section of the rails, and a shaft that is passed through the pipe and holes in the side plates of the rails and fixed.

Further, since the connecting members comprise protrusions that stick out over the main plates of the rails, the structures can be placed on the main plates of the rails and latched onto the protrusions of the connecting members, so that the structures can be positioned.

Also, the rails have a hat-shaped cross section defined by a pair of mutually opposing side plates, a main plate that links the side plates, and flanges that are bent at the edges of the side plates. The section modulus of this hat-shaped cross section is greater than the section modulus of a cross section defined by only the main plate and the side plates, and therefore the strength of the rail members is higher.

Also, since the position where the structures are supported by the connecting members is higher than the main plates of the rails, the structures float above the rails, forming a water path between the structures and the rails, and this prevents water from standing.

Next, the connecting members used for the structure connecting structure according to the present invention are in pairs and each have a side plate and a main plate that is bent at the edges of the side plate, a hole for fixing the structures is formed in the main plate of each of the connecting members, and a protrusion is provided on the main plate of each of the connecting members. Also, a plurality of holes for fixing structures are formed in the main plate of each of the connecting members, and an interval is set between the holes so that the structure can be disposed in the space between the holes. Alternatively, the connecting member of the present invention has a main plate a pair of side plates extending in the same direction, and have a shape in which the sides of the pair of side plates extending in said direction are linked by the main plate, and a hole for fixing the structures is formed on the center line of the main plate, and a protrusion is provided on the main plate.

These connecting members of the present invention are used to achieve the above-mentioned structure connecting structure of the present invention.

Next, the installation method of the present invention is a method for installing the above-mentioned structure connecting structure of the present invention, wherein the connecting members comprise a protrusion that sticks out over the main plate of the rail, and the structure is placed on the main plate of the rail and is positioned by being latched to the protrusion of the connecting members.

Consequently, when a structure is placed on the main plates of the rails, this structure latches onto the protrusion of the connecting members and is thereby positioned, so the installation work is easier.

Also, the solar cell system of the present invention makes use of the above-mentioned structure connecting structure of the present invention to connect and fix solar cell modules as the structures onto the rails.

Further, there is provided a fixing member disposed opposite the connecting members fixed to the rail, wherein the solar cell modules are fixed by sandwiching the sides of the solar cell modules in the water flow direction between the connecting members and the fixing member.

Since the above-mentioned structure connecting structure of the present invention is used with the solar cell system of the present invention, a solar cell module can be securely connected and fixed onto the rails.

Further, there is provided a fixing member disposed opposite the connecting members fixed to the rail, wherein a solar cell module is fixed by sandwiching the sides of the solar cell module in the water flow direction between the connecting members and the fixing member. In this case, the solar cell module can be fixed even though the sides of the solar cell module are fixed at two places with a shorter interval than the sides of the solar cell module in the water flow direction. Accordingly, the interval at which the connecting members and fixing members are disposed can be shorter, which allows the rack, etc., supporting the solar cell module to be smaller.

Effects of the Invention

Because the present invention is constituted as above, even if there are numerous solar cell modules, they can be securely supported, only a few parts are needed, and the installation work can be carried out with ease. Also, the solar cell modules can be securely supported even if wind pressure is exerted on the front and back of the solar cell modules.

BRIEF DESCRIPTION OF DRAWINGS

FIGS. 17(a) and 17(b) show the connection structure of a rail member, with FIG. 17(a) being a perspective view and FIG. 17(b) a cross sectional view;

FIGS. 20(a) and 20(b) show a connecting piece for connecting a truss and a base rail in the structure installation rack of this embodiment, with FIG. 20(a) being a perspective view and FIG. 20(b) a side view;

FIGS. 21(a), 21(b), and 21(c) show a first connecting piece disposed on the rear face side of a solar cell module at the middle horizontal rail, with FIG. 21(a) being a front view, FIG. 21(b) a perspective view of the first connecting piece, and FIG. 21(c) a perspective view of the first connecting piece as seen from the opposite side;

FIGS. 22(a) and 22(b) show a reinforcing piece in a structure connecting structure of this embodiment, with FIG. 22(a) being a perspective view and FIG. 22(b) a plan view;

FIG. 30(a) is a plan view of the second connecting piece in FIG. 29, and FIG. 30(b) is a side view thereof;

DESCRIPTION OF EMBODIMENTS

Embodiments of the structure installation rack, a method for installing this structure installation rack, a structure connecting structure, connecting members and an installation method for this structure connecting structure, and a solar cell system according to the present invention will now be described in detail through reference to the appended drawings.

Figure 1:
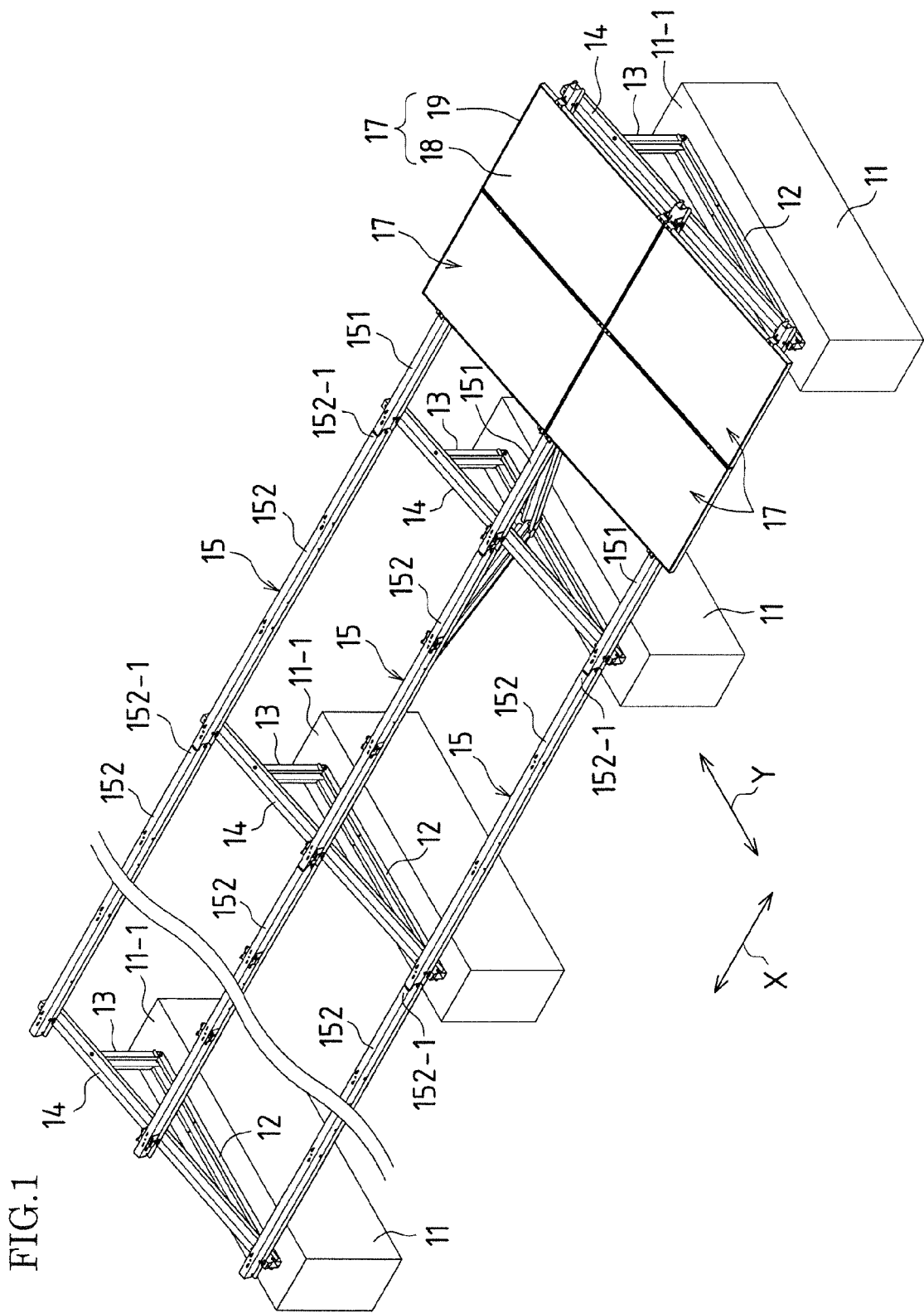
FIG. 1 is a perspective view of a solar cell system to which an embodiment of the structure installation rack of the present invention has been applied.
Figure 2:
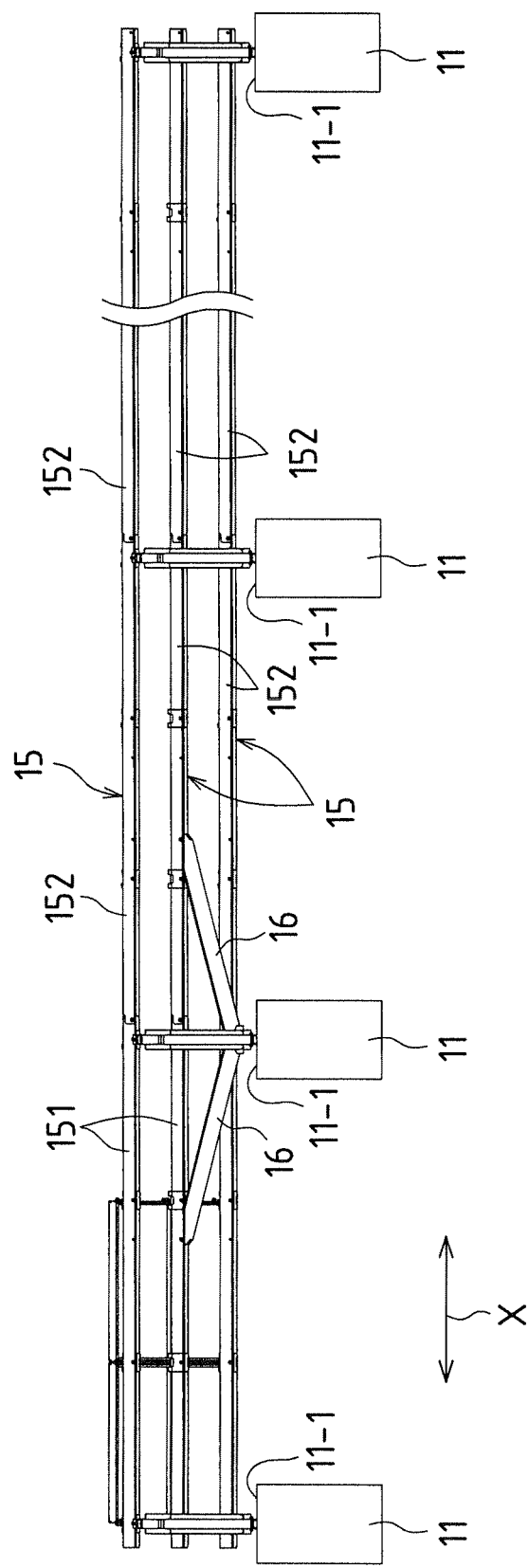
FIG. 2 is a rear view of the solar cell system in FIG. 1.

FIG. 1 is a perspective view of a solar cell system to which an embodiment of the present invention has been applied. FIG. 2 is a rear view of the solar cell system in FIG. 1, and FIG. 3 is a partially enlarged perspective view of the solar cell system in FIG. 1.

This solar cell system is premised on use in a large-scale power generating plant, and the structure installation rack of this embodiment is used to install numerous solar cell modules.

Figure 3:
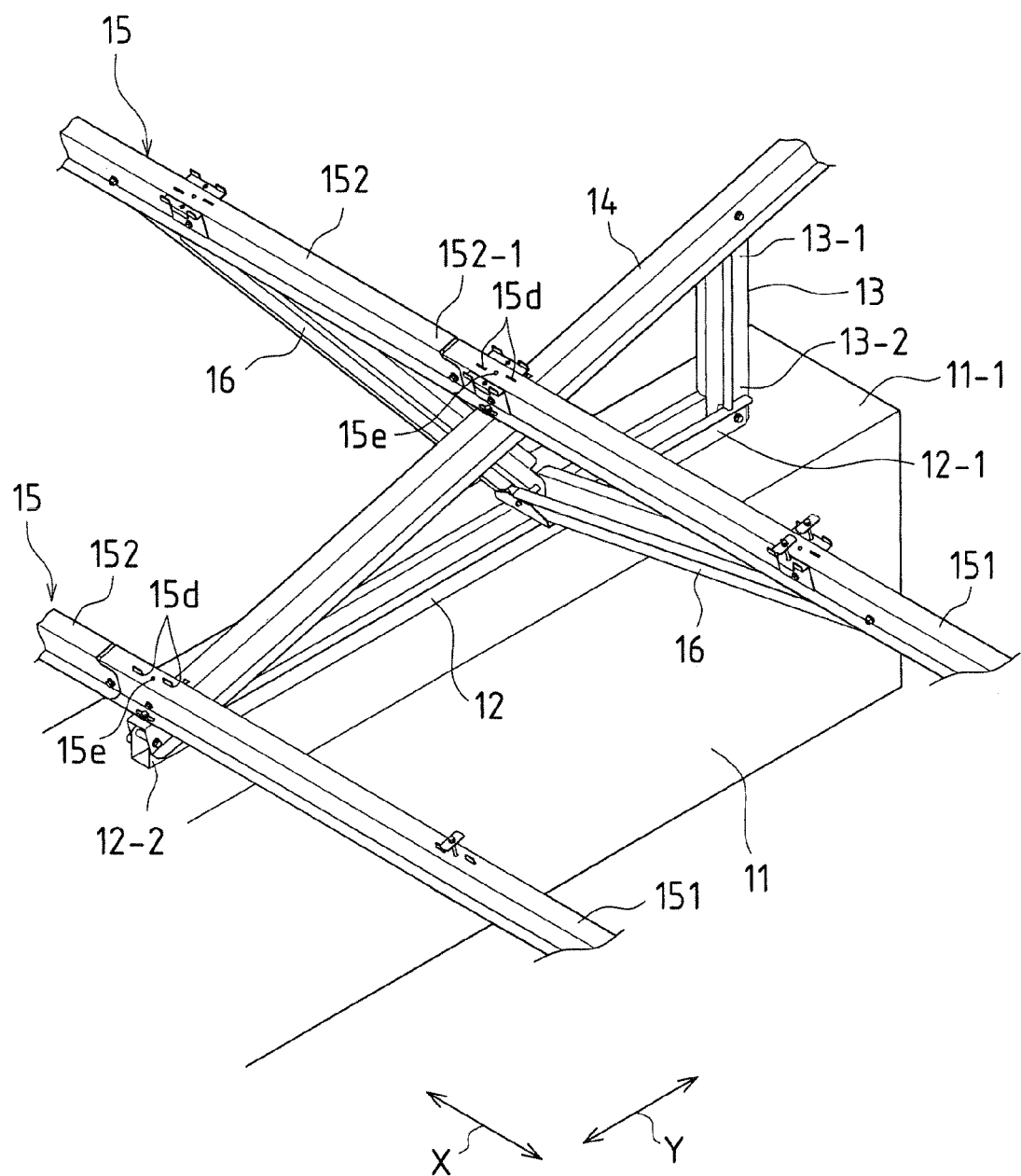
FIG. 3 is a partially enlarged perspective view of the solar cell system in FIG. 1.

As shown in FIGS. 1, 2, and 3, with the structure installation rack of this embodiment, a plurality of concrete foundations 11 are placed equidistantly on the ground, a base rail 12 is fixed to the top face 11-1 of each of the concrete foundations 11, with these base rails 12 provided equidistantly, an arm 13 is connected upright to the rear end 12-1 of each of the base rails 12, a vertical rail 14 is fixed to obliquely span the upper end 13-1 of each of the arms 13 and the distal end 12-2 of each of the base rails 12, three horizontal rails 15 are disposed perpendicular to each vertical rail 14, and the horizontal rails 15 are provided in rows on the vertical rails 14. If we call the base rail 12 at the far right in FIG. 1 the first, two trusses 16 are provided spanning the base rails 12 and the middle horizontal rail 15 for each of the even-numbered base rails 12, thereby constructing a truss structure for reinforcing the middle horizontal rail 15.

In FIGS. 1, 2, and 3, we will let the direction in which the concrete foundations 11 are aligned be the X direction (the left and right direction), and a direction perpendicular to this X direction be the Y direction (front and rear direction).

With a structure installation rack thus constituted, a plurality of solar cell modules 17 are arranged in a horizontal row and placed on the upper horizontal rail 15 and the middle horizontal rail 15, and a plurality of the solar cell modules 17 are also arranged in a horizontal row and placed on the lower horizontal rail 15 and the middle horizontal rail 15. Therefore, two rows of the solar cell modules 17 are placed on the three horizontal rails 15. Also, six of the solar cell modules 17 are allocated between the vertical rails 14, any two of which are adjacent on the left and right. The solar cell modules 17 are each such that a solar cell panel 18 including a plurality of solar cells disposed in the row and column directions are supported by a support frame 19.

Next, the concrete foundations 11, the base rails 12, the arms 13, the vertical rails 14, the horizontal rails 15, the trusses 16, and so forth that make up the structure installation rack will be described.

The concrete foundations 11 are produced by making a form on the ground, pouring concrete into this form, and allowing the concrete to harden. The concrete foundations 11 are disposed equidistantly, and the top faces 11-1 thereof lie in the same horizontal plane, at the same height.

The top faces 11-1 of the concrete foundations 11 are used as horizontal foundation surfaces. The base rails 12 are fixed equidistantly and in parallel over these foundation surfaces, after which the base rails 12, the arms 13, the vertical rails 14, the horizontal rails 15, the trusses 16, and so forth are assembled and connected to construct a structure installation rack. Naturally, instead of using a plurality of the concrete foundations 11, a foundation with another structure may be used, such as a mat foundation in which concrete is poured evenly onto the entire installation area of the rack.

Figure 4:
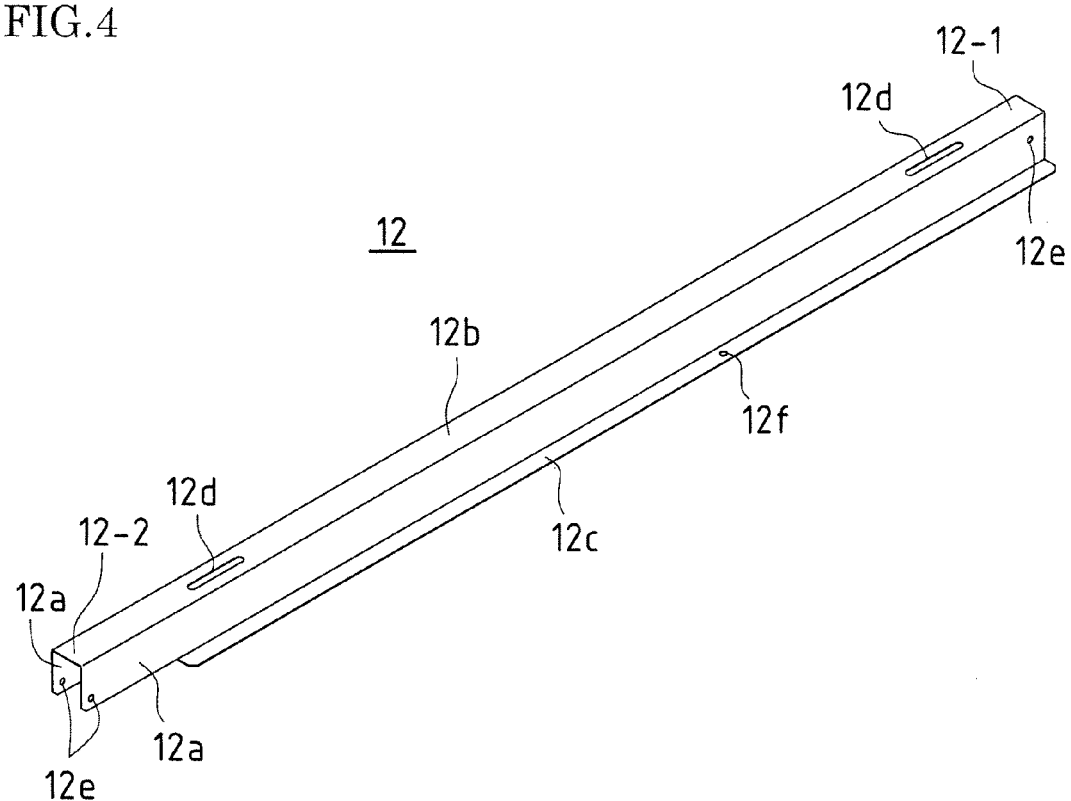
FIG. 4 is a perspective view of a base rail in the structure installation rack of this embodiment.

FIG. 4 is a perspective view of the base rail 12. The base rail 12 shown in FIG. 4 has a hat-shaped cross section defined by a pair of mutually opposing side plates 12a, a main plate 12b that links the opposing sides of the side plates 12a, and flanges 12c that are bent outward from the edges of the side plates 12a. The flanges 12c are cut out at the distal ends 12-2 of the base rails 12, and these distal ends 12-2 of the base rails 12 form a groove-shaped cross section defined by the side plates 12a and the main plate 12b.

Slots 12d are formed near the ends of the main plate 12b of the base rail 12, bolt holes 12e are formed at the ends of each of the side plates 12a, and a bolt hole 12f is formed in the center of each of the flanges 12c.

Figure 5:
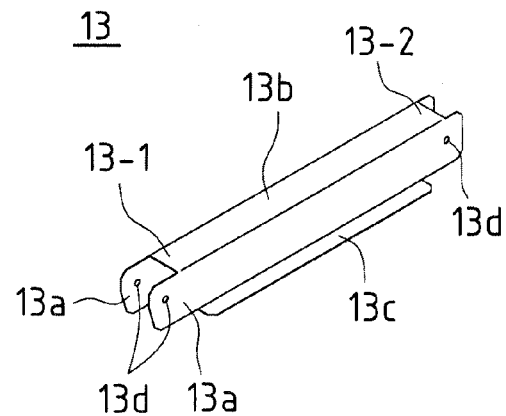
FIG. 5 is a perspective view of an arm in the structure installation rack of this embodiment.

FIG. 5 is a perspective view and a plan view of the arm 13. As shown in FIG. 5, the arm 13 has a hat-shaped cross section defined by a pair of mutually opposing side plates 13a, a main plate 13b that links the opposing sides of the side plates 13a, and flanges 13c that are bent outward from the edges of the side plates 13a. The main plate 13b and the flanges 13c are cut out at the lower end 13-2 of the arm 13, leaving only the side plates 13a. The main plate 13b and the flanges 13c are also cut out at the upper end 13-1 of the arm 13, leaving only the side plates 13a. Further, bolt holes 13d are formed in the ends of each of the side plates 13a of the arm 13.

FIGS. 6(a) and 6(b) show the vertical rail 14. As shown in FIG. 6(a), the vertical rail 14 has a hat-shaped cross section defined by a pair of mutually opposing side plates 14a, a main plate 14b that links the opposing sides of the side plates 14a, and flanges 14c that are bent outward from the edges of the side plates 14a.

Pairs of T-shaped holes 14d are formed in the center and near both ends of the main plate 14b of the vertical rail 14. Also, bolt holes 14e are formed in the distal end of each of the side plates 14a, and bolt holes 14e are formed at positions somewhat toward the rear from the center of each of the side plates 14a.

Figure 7:
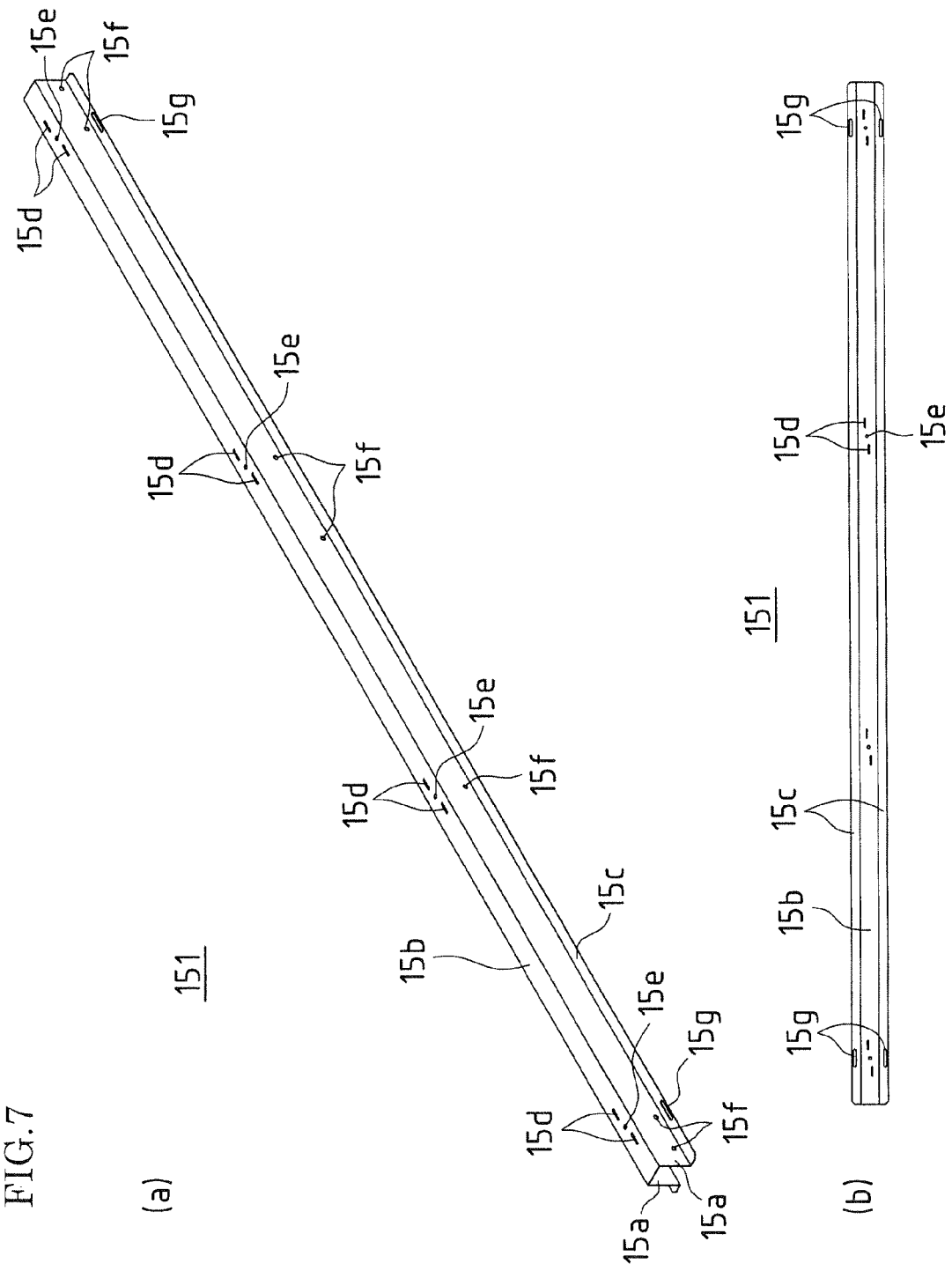
FIGS. 7(a) and 7(b) show a rail member constituting a horizontal rail in the structure installation rack of this embodiment, with FIG. 7(a) being a perspective view and FIG. 7(b) a plan view.
Figure 8:
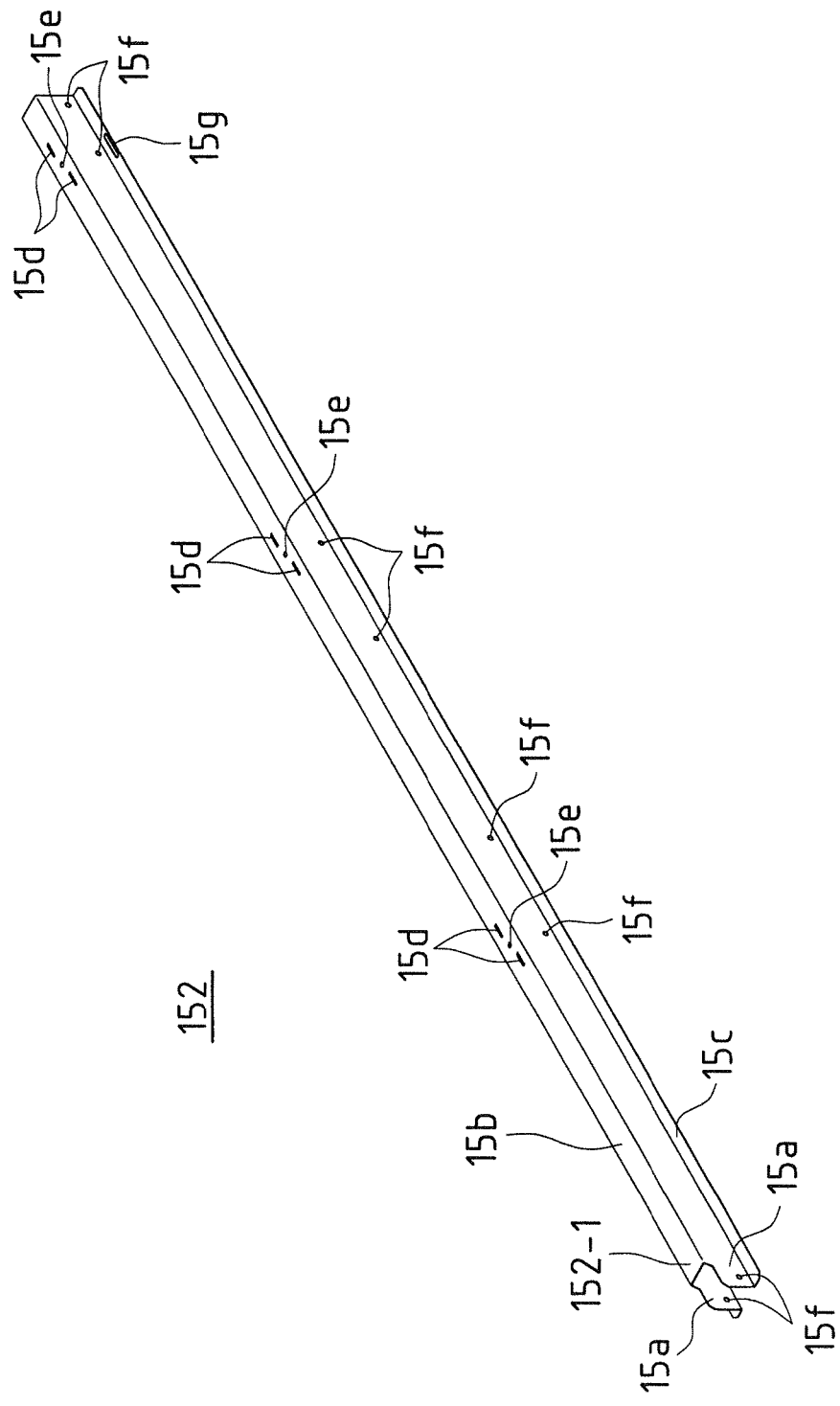
FIG. 8 is a perspective view of another rail member constituting the horizontal rail in the structure installation rack of this embodiment.

FIGS. 7(a), 7(b), and 8 show a rail member constituting the horizontal rail 15. As shown in FIG. 1, the horizontal rails 15 are far longer in the X direction, and it is impossible for the horizontal rail 15 to be constituted by only one member, so a plurality of rail members are connected to make up the horizontal rail 15.

FIGS. 7(a) and 7(b) a perspective view and a plan view of a first rail members 151, if we call the rail members 151 to the far right side of the horizontal rails 15 in FIG. 1 "the first rail members 151." As shown in FIG. 7, the first rail members 151 each have a hat-shaped cross section defined by a pair of mutually opposing side plates 15a, a main plate 15b that links the opposing sides of the side plates 15a, and flanges 15c that are bent outward from the edges of the side plates 15a. In other words, the rail members 151 are such that the sides extending in the lengthwise direction of the side plates 15a are linked by the main plate 15b, and the flanges 15c protrude outward from the side plates 15a.

A pair of slits 15d and a bolt hole 15e are formed at each of four places on the main plate 15b of the first rail member 151. Further, bolt holes 15f are formed at a plurality of places on the side plates 15a, and slots 15g are formed at both ends of each of the flanges 15c.

The length of the first rail members 151 is slightly more than the spacing of the vertical rails 14 shown in FIG. 1, which allows the first rail members 151 to span the vertical rails 14.

FIG. 8 is a perspective view of a second and subsequent rail member 152 from the left of the first rail member 152, if we call the rail members 151 to the far right side in FIG. 1 "the first rail members 151." As shown in FIG. 8, the second and subsequent rail members 152 are the same as the rail members 151 in FIG. 7 in that they each have a hat-shaped cross section defined by a pair of side plates 15a, a main plate 15b, and flanges 15c. A pair of slits 15d and a bolt hole 15e are formed at each of three places on the main plate 15b, bolt holes 15f are formed at a plurality of places on the side plates 15a, and a slot 15g is formed at one end of each of the flanges 15c.

Further, at one end 152-1 of the rail member 152, a portion along one side of each of the side plates 15a and the main plate 15b are cut out, leaving only the side plates 15a and the flanges 15c.

The length of the rail members 152 is substantially the same as the spacing between the vertical rails 14 shown in FIG. 1, and is slightly less than the length of the first rail members 151.

Figure 9:
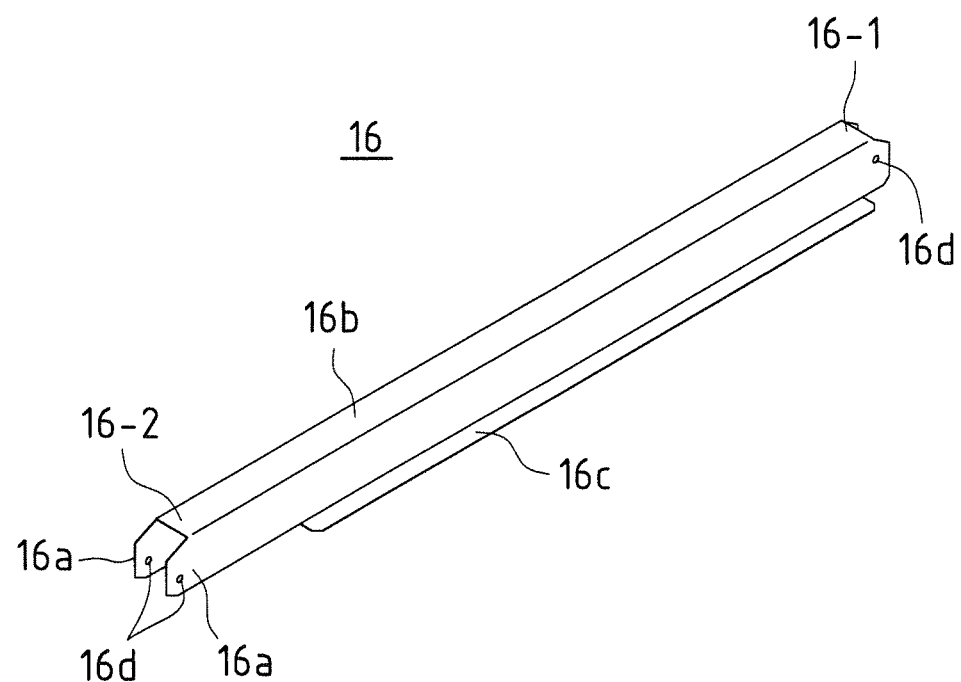
FIG. 9 is a perspective view of a truss in the structure installation rack of this embodiment.

FIG. 9 is a perspective view of the truss 16. The truss 16 shown in FIG. 9 has a hat-shaped cross section defined by a pair of mutually opposing side plates 16a, a main plate 16b that links the opposing sides of the side plates 16a, and flanges 16c that are bent outward from the edges of the side plates 16a.

The main plate 16b and the flanges 16c are cut out at one end 16-1 of this truss 16, leaving only the side plates 16a. Also, the main plate 16b and the flanges 16c are cut out at the other end 16-2 of the truss 16, leaving only the side plates 16a.

Further, bolt holes 16d are formed at both ends of each of the side plates 16a of the truss 16.

Here, the base rails 12, the arms 13, the vertical rails 14, the horizontal rails 15, and the trusses 16 all have a hat-shaped cross section defined by a pair of mutually opposing side plates, a main plate that links the opposing sides of the side plates, and flanges that are bent outward from the edges of the side plates. Also, the hat-shaped cross sections are all the same size. In other words, the widths of the main plates are the same and the widths of the side plates are the same. Furthermore, all of these are formed by cutting or punching out plated sheet steel of the same thickness, and then bending the plated sheet steel. Accordingly, the material and production equipment can be shared for all the pieces, which affords a major reduction in cost.

Furthermore, plated sheet steel can be subjected to roll forming in order to achieve a hat-shaped cross sectional shape. In this case, the pieces can be mass produced very quickly, which further reduces cost. As discussed above, the solar cell system to which the structure installation rack of this embodiment is applied is premised on being installed in large-scale power generating plant, so an extremely large number of solar cell modules are used, and the scale of the rack is large. Accordingly, the base rails 12, the arms 13, the vertical rails 14, the horizontal rails 15, and the trusses 16 are all used in large numbers, and to mass-produce these quickly, it is better for them to have the same cross sectional shape and size, and to employ roll forming, the result of which will be that cost can be lowered greatly.

Figure 10:
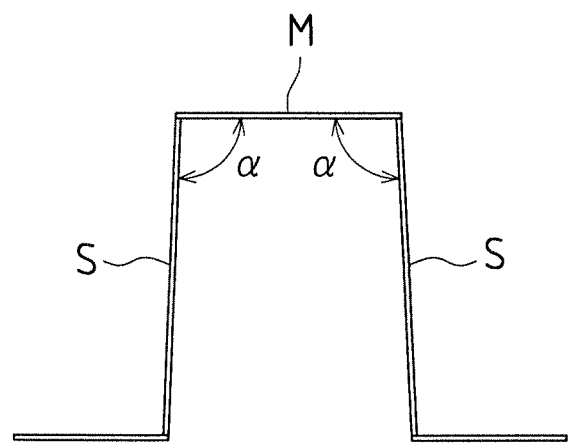
FIG. 10 is a simplified diagram of the cross sectional shape of the base rail, arm, horizontal rail, truss, and so forth in the structure installation rack of this embodiment.

Also, the hat-shaped cross sectional shape of the base rails 12, the arms 13, the vertical rails 14, the horizontal rails 15, and the trusses 16, as shown in FIG. 10, is such that the bending angle a of the side plates S is set with respect to the main plate M so that the separation of the side plates S is wider the farther away they are from the main plate M. That is, the distance between the side plates S is larger at the opening of the hat-shaped cross section of the rail, and the width of the main plate M is narrower than the width of the opening of the rail. Therefore, as will be discussed below, it is easier to superpose the side plates at a rail end with another rail end during installation work.

Next, we will describe the triangular structure produced by assembling the base rails 12, the arms 13, and the vertical rails 14 on the concrete foundations 11.

FIGS. 11(a) and 11(b) show a triangular structure including the base rail 12, the arm 13, and the vertical rail 14. As shown in FIG. 11(a), the base rail 12 is fixed to the top face 11-1 of the concrete foundation 11, the arm 13 is connected upright to the rear end 12-1 of the base rail 12, and the vertical rail 14 is fixed to obliquely span the upper end 13-1 of the arm 13 and the distal end 12-2 of the base rail 12, which constructs a triangular structure including the base rail 12, the arm 13, and the vertical rail 14.

Two bolts 21 are previously provided to protrude from the top face 11-1 of the concrete foundation 11, these bolts 21 are passed through the slots 12d in the main plate 12b of the base rail 12, the main plate 12b of the base rail 12 is placed on the top face 11-1 of the concrete foundation 11 such that the main plate 12b of the base rail 12 is brought into contact with the top face 11-1 of the concrete foundation 11. At this point, the base rail 12 and the bolts 21 can be moved along the slots 12d (in the Y direction in FIG. 1), so the base rail 12 can be moved in the Y direction to adjust its position in the Y direction.

Figure 12:
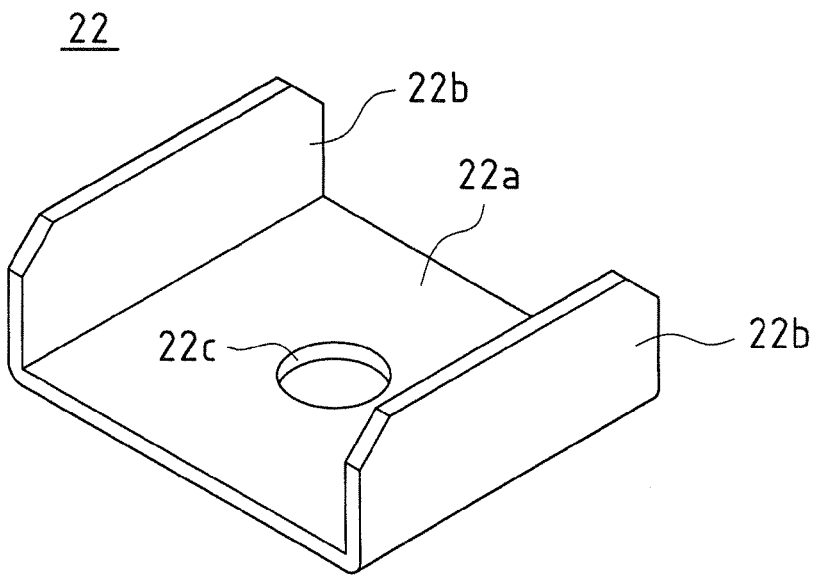
FIG. 12 is a perspective view of a reinforcing piece used to fix a base rail.

FIG. 12 is a perspective view of a reinforcing piece 22 used to fix the base rail 12. This reinforcing piece 22 has a main plate 22a and side plates 22b that are bent at the edges of the main plate 22a. A bolt hole 22c is formed in the center of the main plate 22a.

Figure 13:
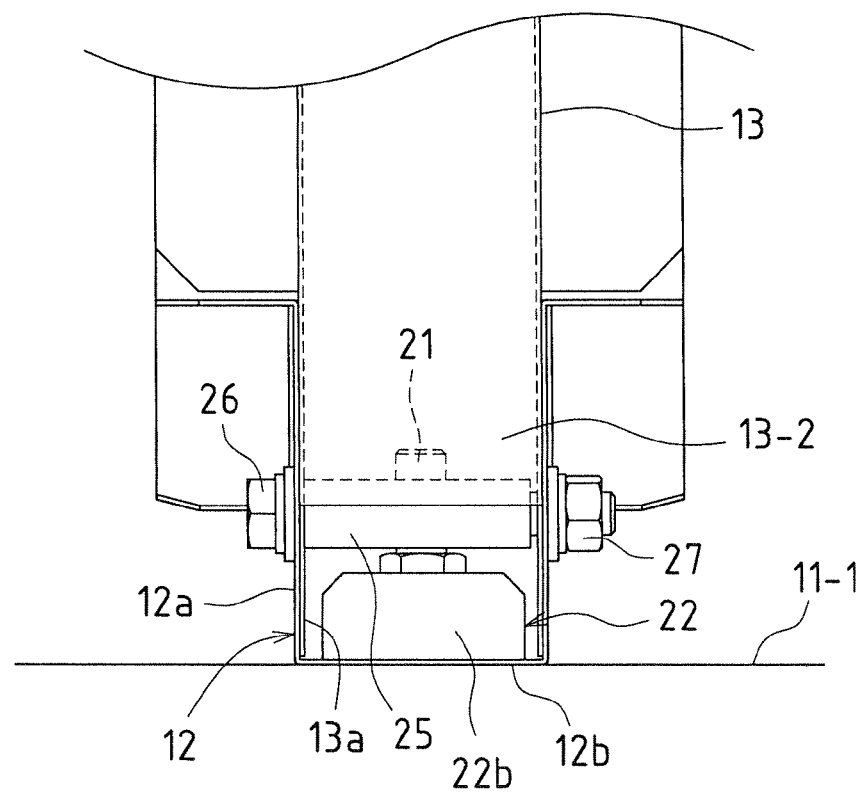
FIG. 13 is a cross sectional view of the connection structure between an arm and a base rail.

Two of these reinforcing pieces 22 are used. After the main plate 12b of the base rail 12 is placed on the top face 11-1 of the concrete foundation 11, the bolts 21 are passed through the holes in the two reinforcing pieces 22 to dispose the reinforcing pieces 22 inside the base rail 12. At this point, as shown in FIG. 13, the orientation of the reinforcing piece 22 is set so that the side plates 22b of the reinforcing piece 22 will be perpendicular to the side plates 12a of the base rail 12, and the side plates 22b of the reinforcing piece 22 are brought into contact with the main plate 12b of the base rail 12. Nuts are then threaded into the bolts 21 and tightened, which fixes the base rail 12 to the top face 11-1 of the concrete foundation 11.

In this state, the side plates 22b of the reinforcing piece 22 are in pressure contact with the main plate 12b of the base rail 12, which reinforces the main plate 12b of the base rail 12. Also, since the width of the side plates 22b of the reinforcing piece 22 is set to be substantially the same as the spacing between the side plates 12a of the base rail 12, the side plates 12a of the base rail 12 are reinforced.

After this, the arm 13 is connected upright to the rear end 12-1 of the base rail 12. The main plate 13b and the flanges 13c are cut out at the lower end 13-2 of the arm 13, leaving only the side plates 13a. Also, as shown in FIG. 10, the distance between the side plates 12a of the base rail 12 is larger on the opening side of the hat-shaped cross section. Accordingly, as the lower ends of the side plates 13a undergo elastic deformation so that they move closer together, the lower ends of the side plates 13a can be easily inserted into and sandwiched inside the rear ends of the side plates 12a of the base rail 12, allowing the lower ends of the side plates 13a and the rear ends of the side plates 12a to be superposed. At this point, the arm 13 will stand on its own, making the subsequent work of connecting the arm 13 easier.

In this state in which the arm 13 is standing on its own, as shown in FIG. 13, a pipe 25 is inserted between the side plates 13a of the arm 13, then the pipe 25, the bolt holes 13d in the side plates 13a of the arm 13, and the bolt holes 12e in the side plates 12a of the base rail 12 are aligned, the bolt 26 is passed through the pipe 25, the bolt holes 13d in the side plates 13a of the arm 13, the bolt holes 12e in the side plates 12a of the base rail 12, and washers, a nut 27 is threaded into the end of the bolt 26 and tightened, and the lower ends of the side plates 13a of the arm 13 are connected to the side plates 12a of the base rail 12.

When the bolt 26 is thus passed through the pipe 25, the side plates 13a of the arm 13, and the side plates 12a of the base rail 12 and the nut 27 is threaded into it, the pipe 25 is sandwiched between the side plates 13a and 12a, which reinforces these side plates and prevents the deformation of the hat-shaped cross sectional shape of the arm 13 and the base rail 12 (shown in FIG. 10). Also, the length of the pipe 25 is equal to the distance separating the side plates of the rails, and the size of the pipe 25 is greater than that of the nut and so forth, which facilitates manual installation work. Also, since only one pipe 25, one bolt 26, one nut 27, and so on are used, fewer parts and steps are required, and the cost can be lowered.

Next, the vertical rail 14 is installed obliquely spanning the distal end 12-2 of the base rail 12 and the upper end 13-1 of the arm 13, and is fixed. The flanges 12c are cut out at the distal ends of the base rail 12. Also, as shown in FIG. 10, the distance between the side plates 14a of the vertical rail 14 is larger on the opening side of the hat-shaped cross section. Therefore, as the distal ends of the side plates 12a of the base rail 12 undergo elastic deformation so as to move closer together, they can be easily inserted inside the distal ends of the side plates 14a of the vertical rail 14, allowing the distal ends of the side plates 12a and the distal ends of the side plates 14a to be superposed.

In this state, just as in FIG. 13, a pipe is inserted between the side plates 12a of the base rail 12, then the pipe, the bolt holes 12e in the side plates 12a of the base rail 12, and the bolt holes 14e in the side plates 14a of the vertical rail 14 are aligned, a bolt is passed through the pipe, the bolt holes 12e in the side plates 12a of the base rail 12, the bolt holes 14e in the side plates 14a of the vertical rail 14, and washers, a nut is threaded into the end of the bolt and tightened, and the lower ends of the side plates 14a of the vertical rail 14 are connected to the side plates 12a of the base rail 12.

Similarly, at the upper end 13-1 of the arm 13, the main plate 13b and the flanges 13c are cut out, leaving only the side plates 13a, so that as the upper ends of the side plates 13a undergo elastic deformation so as to move closer together, the upper ends of the side plates 13a can be inserted inside the side plates 14a of the vertical rail 14.

In this state, just as in FIG. 13, a pipe is inserted between the side plates 13a of the arm 13, then the pipe, the bolt holes 13d in the side plates 13a of the arm 13, and the bolt holes 14e in the side plates 14a of the vertical rail 14 are aligned, a bolt is passed through the pipe, the bolt holes 13d in the side plates 13a of the arm 13, the bolt holes 14e in the side plates 14a of the vertical rail 14, and washers, a nut is threaded into the end of the bolt and tightened, and the upper ends 13-1 of the arm 13 are connected to the side plates 14a of the vertical rail 14.

A triangular structure including the base rail 12, the arm 13, and the vertical rail 14 is thus constructed. This triangular structure is able to adequately withstand force in both the vertical direction and the horizontal direction even though the number of parts was not increased.

Next, the structure for connecting and fixing the rail members 151 and 152 (which constitute the horizontal rails 15) to the vertical rails 14 will be described.

Figure 14:
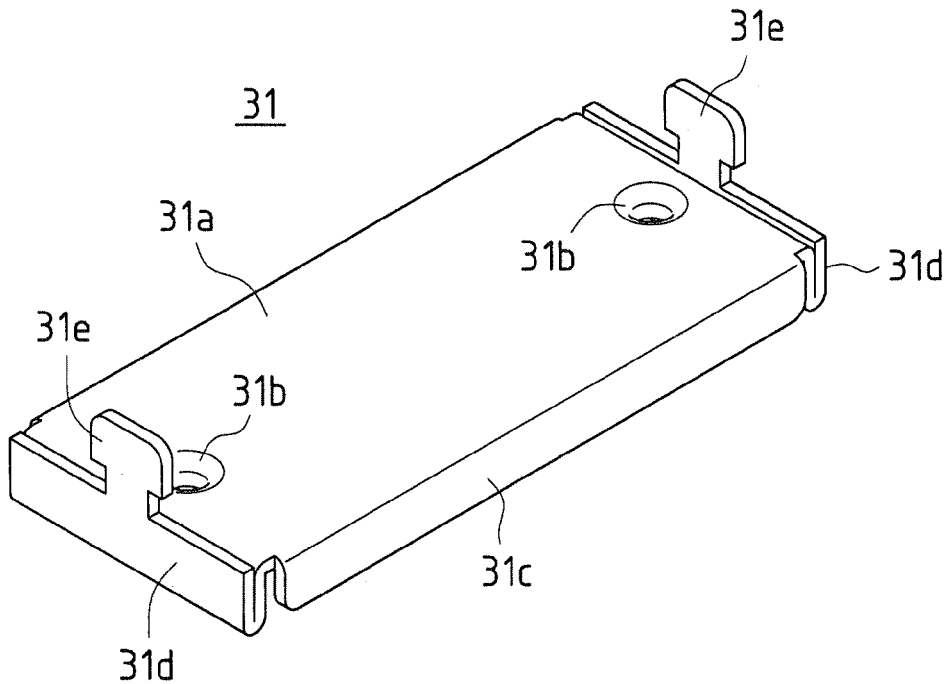
FIG. 14 is a perspective view of an attachment piece used to connect and fix a horizontal rail to a vertical rail.

FIG. 14 is a perspective view of an attachment piece 31 used to connect and fix the rail members 151 and 152 of the horizontal rails 15 to the vertical rails 14. With this attachment piece 31, two threaded holes 31b are formed in a main plate 31a, side plates 31c are provided at both ends of the main plate 31a, side plates 31d are provided at the front and rear of the main plate 31a and bent double, and T-shaped support tabs 31e protrude from the center of the side plates 31d.

Figure 6:
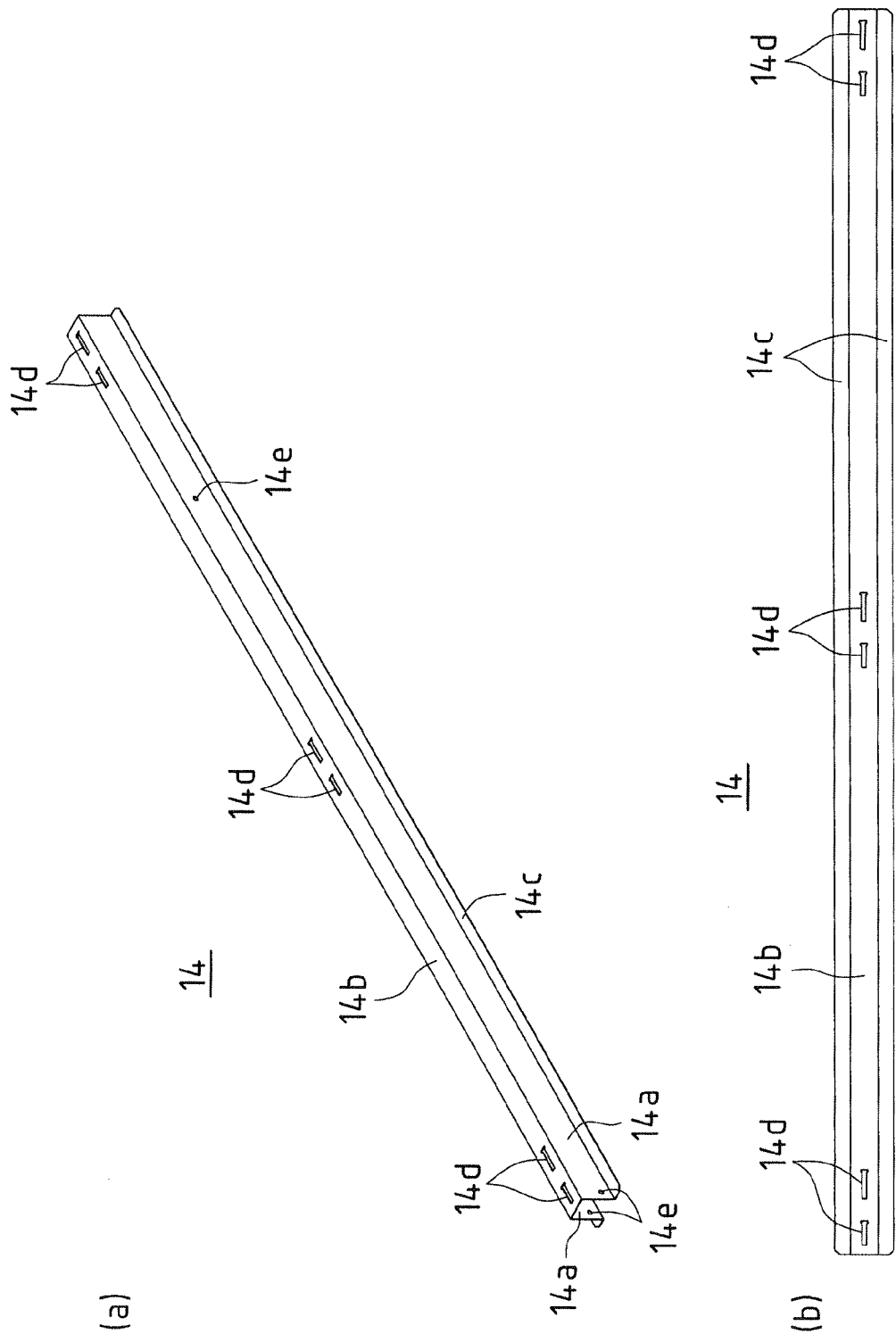
FIGS. 6(a) and 6(b) are a perspective view and a plan view of a vertical rail in the structure installation rack of this embodiment.
Figure 11:
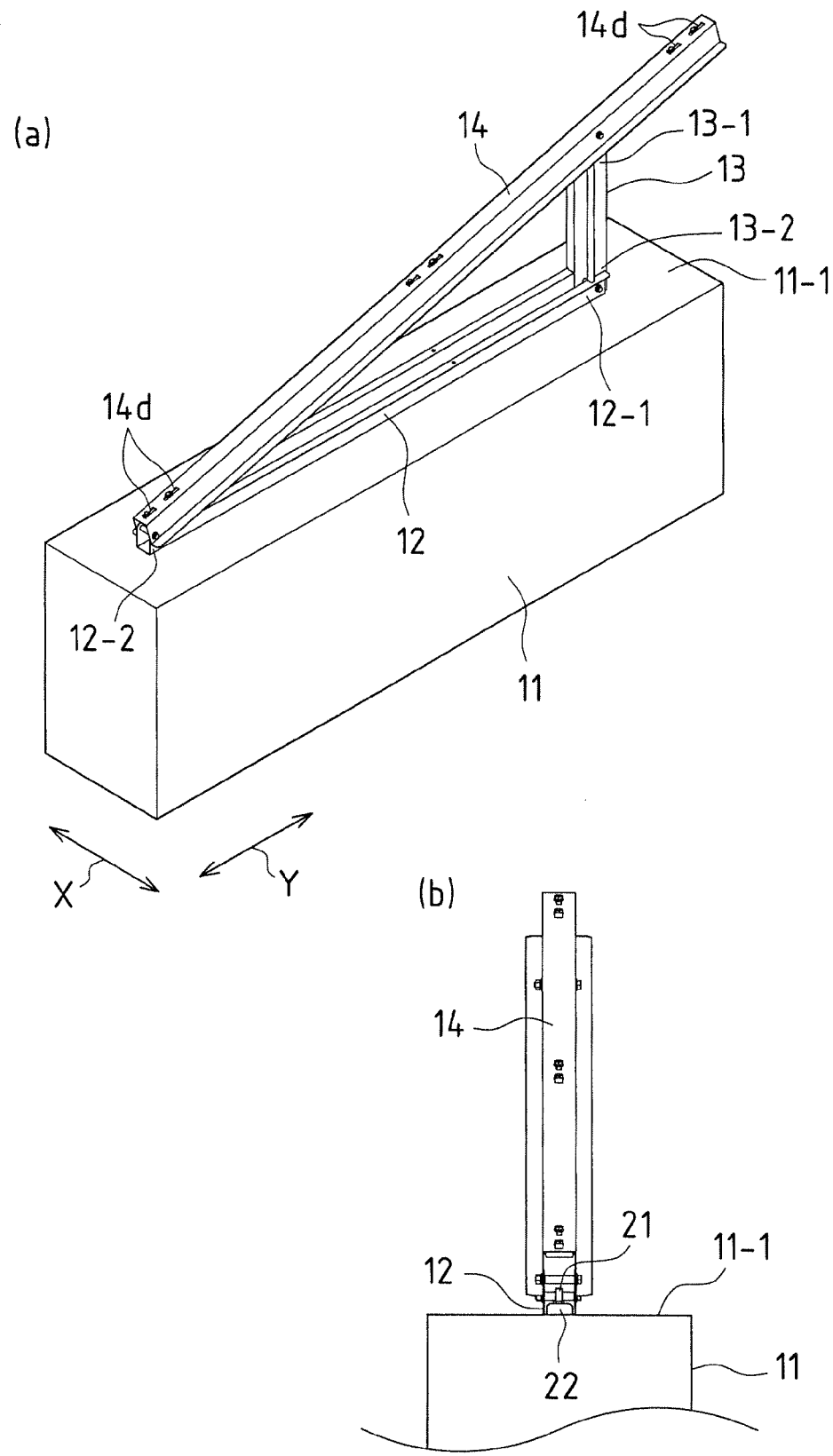
FIGS. 11(a) and 11(b) show a triangular structure including the base rail, arm, and vertical rail, with FIG. 11(a) being a perspective view and FIG. 11(b) a front view.

As shown in FIGS. 6 and 11, pairs of T-shaped holes 14d are formed in the center and near both ends of the main plate 14b of the vertical rail 14. An attachment piece 31 is attached to the main plate 14b of the vertical rail 14 at each pair of T-shaped holes 14d, and the attachment pieces 31 are disposed at three locations in the center and near both ends of the main plate 14b of the vertical rail 14.

Figure 15:
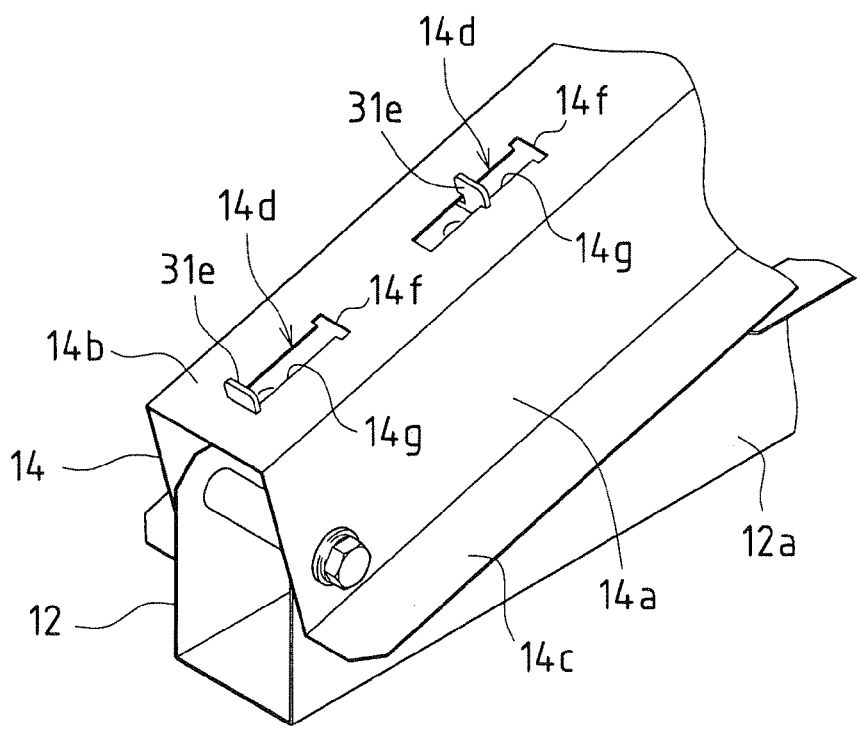
FIG. 15 is a perspective view of the state when an attachment piece has been attached to a vertical rail.

As shown in FIG. 15, the heads of the support tabs 31e of the attachment piece 31 are fitted into slits 14f of the T-shaped holes 14d, the support tabs 31e are moved to engagement holes 14g of the T-shaped holes 14d, the heads of the support tabs 31e are hooked in the engagement holes 14g of the T-shaped holes 14d, and the attachment piece 31 is attached to the main plate 14b of the vertical rail 14.

Figure 16:
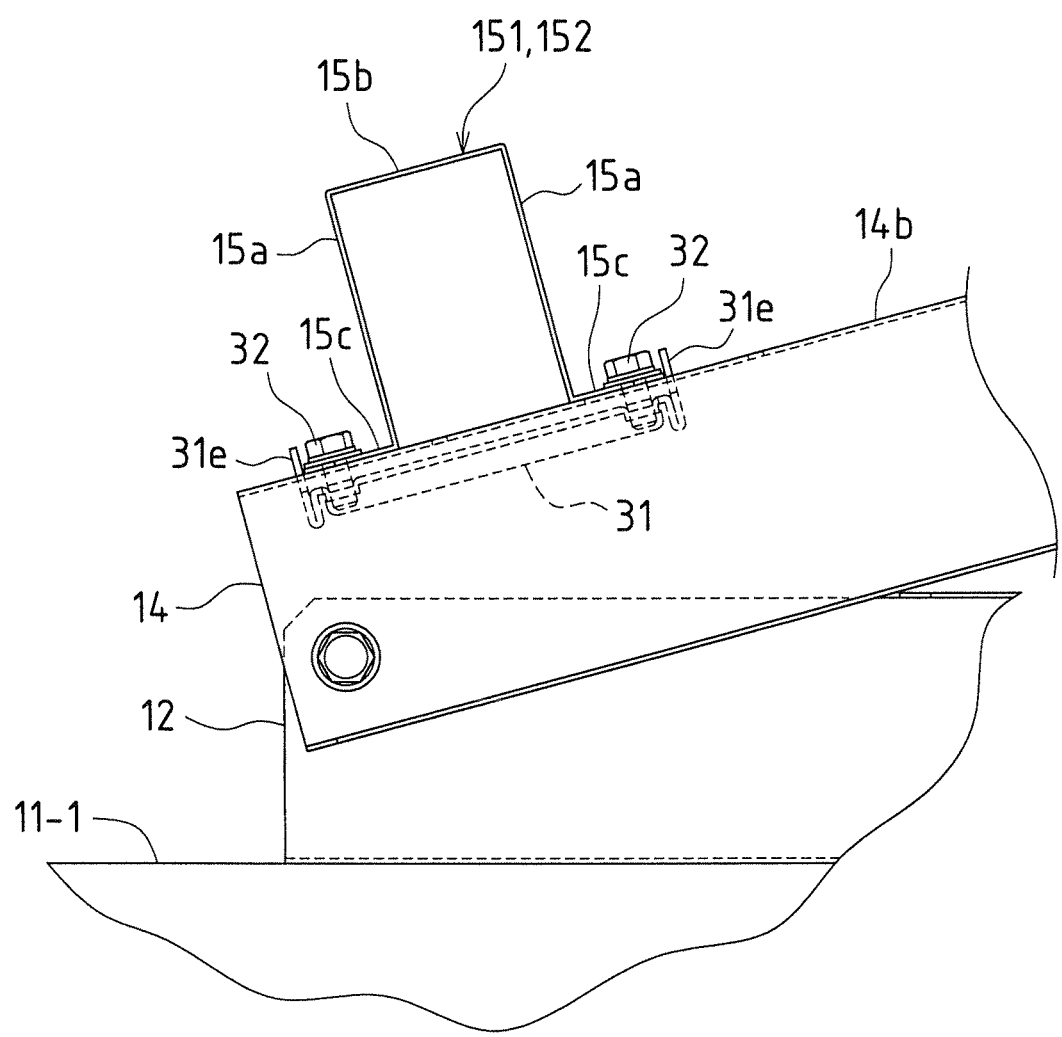
FIG. 16 is a cross sectional view of the state when a horizontal rail has been connected to a vertical rail.

As shown in FIGS. 1 and 16, the rail members 151 and 152 are placed on the main plates 14b so as to be perpendicular to the vertical rails 14, and the flanges 15c of the rail members 151 and 152 are disposed between the heads of the support tabs 31e of the attachment pieces 31. The slots 15g in the flanges 15c of the rail members 151 and 152 are superposed on the threaded holes 31b in the attachment pieces 31 via the T-shaped holes 14d in the main plates 14b of the vertical rails 14, bolts 32 are threaded into the threaded holes 31b of the attachment piece 31 via the slots 15g in the flanges 15c of the rail members 151 and 152 and the T-shaped holes 14d in the main plates 14b of the vertical rails 14, and the bolts are temporarily tightened.

In this temporarily tightened state, the bolts 32 can be moved along the slots 15g in the flanges 15c of the rail members 151 and 152, so the rail members 151 and 152 can moved along the slots 15g (in the X direction in FIG. 1), allowing the position to be adjusted in the X direction.

Also, the attachment pieces 31 can be moved along the T-shaped holes 14d in the main plates 14b (in the lengthwise direction of the vertical rails 14), and the rail members 151 and 152 can be moved along with these attachment pieces 31. This movement of the rail members 151 and 152 in the lengthwise direction of the vertical rails 14 adjusts the spacing of the three horizontal rails 15 disposed on the vertical rails 14.

After the position of the three horizontal rails 15 has been adjusted in the X direction, and the spacing of the horizontal rails 15 has been adjusted, the bolts 32 of the attachment pieces 31 are tightened to fix the horizontal rails 15 on the vertical rails 14.

The position of the horizontal rails 15 can thus be adjusted in the X direction. Also, as discussed above, the base rails 12 can be moved in the Y direction to adjust their position in the Y direction, so the position of the horizontal rails 15 in the Y direction can be adjusted by adjusting the position of the base rails 12. Therefore, the position of the horizontal rails 15 in the X and Y directions can be adjusted. Furthermore, the spacing of the horizontal rails 15 can be adjusted. Accordingly, even if there is error in the position of the concrete foundations 11, the horizontal rails 15 can be accurately positioned by adjusting the spacing of the horizontal rails 15 and adjusting the position of the horizontal rails 15 in the X and Y directions, which in turn allows the solar cell modules 17 attached on the horizontal rails 15 to be accurately positioned.

Next, the connection structure of the plurality of rail members 151 and 152 constituting the horizontal rails 15 will be described.

The rail member 151 shown in FIG. 7 is a first rail member on the far right side of the horizontal rails 15 in FIG. 1. These span the vertical rails 14 of the first and second concrete foundations 11 in FIG. 1, and are fixed to these vertical rails 14 with the attachment pieces 31.

Also, the rail members 152 shown in FIG. 8 are the second and subsequent rail members of the horizontal rails 15 in FIG. 1, and span the left end of the immediately prior rail member and the next vertical rail 14. For example, the second rail member 152 spans the left end of the first rail member 151 and the third vertical rail 14, the third rail member 152 spans the left end of the second rail member 152 and the fourth vertical rail 14, and so on thereafter, with the n-th rail member 152 spanning the left end of the (n−1)-th rail member 152 and the (n+1)-th vertical rail 14. The second and subsequent rail members 152 are also fixed to the vertical rails 14 with the attachment pieces 31.

As shown in FIGS. 7(a) and 7(b), the main plate 15b is not cut out at either end of the first rail member 151. As shown in FIG. 8, a portion along one side of each of the side plates 15a and the main plate 15b are cut out at one end 152-1 of the second and subsequent rail members 152, leaving only the side plates 15a and the flanges 15c. As shown in FIGS. 1 and 3, one end 152-1 of each of the second and subsequent rail members 152 is connected to the left end of the immediately prior rail member.

For example, as shown in FIG. 17(a), the left ends of the side plates 15a of the first rail member 151 are inserted into and sandwiched on the inside of one end of the side plates 15a of the second rail member 152. As shown in FIG. 10, since the distance between the side plates 15a is larger on the opening side of the hat-shaped cross section of the horizontal rail 15 (the rail members 151 and 152), the left ends of the first side plates 15a can be inserted on the inside of one end of the second side plates 15a merely by putting one end of the side plates 15a of the second rail member 152 over the left ends of the side plates 15a of the first rail member 151.

In this state, as shown in FIG. 17(b), the pipe 25 is inserted between the side plates 15a of the first rail member 151, then the pipe 25, bolt holes 15f in the side plates 15a of the first rail member 151, and bolt holes 15f in the side plates 15a of the second rail member 152 are aligned, a bolt 26 is passed through the pipe 25, the bolt holes 15f in the side plates 15a of the first rail member 151, the bolt holes 15f in the side plates 15a of the second rail member 152, and washers, and a nut 27 is threaded into the ends of the bolts 26 and tightened, which connects the side plates 15a of the second rail member 152 to the side plates 15a of the first rail member 151.

Then, one end of the side plates 15a of the third rail member 152 is put over the left ends of the side plates 15a of the second rail member 151, the left ends of the second side plates 15a are inserted inside one end of the third side plates 15a, and the third side plates 15a are connected to the second side plates 15a using the pipe 25, the bolt 26, the nut 27, and washers.

Similarly, the left ends of the side plates 15a of the (n−1)-th rail member 151 are inserted on the inside of one end of the side plates 15a of the n-th rail member 152, and the n-th side plates 15a are connected to the (n−1)-th side plates 15a using the pipe 25, the bolt 26, the nut 27, and washers.

Thus, a single, long horizontal rail 15 is constituted by connecting a plurality of the rail members 151 and 152.

As is clear from FIGS. 17(a) and 17(b), the side plates 15a on both sides have a double-walled structure at the places where the rail members 151 and 152 are connected, which increases the strength thereof. Furthermore, if the number of rail members 151 and 152 is increased to extend the horizontal rail 15, this can be accomplished merely by repeating the same connection steps, so the installation work is easy.

Also, since the main plate 15b is cut out at one end 152-1 of the rail member 152, the main plates 15b of the rail members are spaced apart where the rail members are connected. Accordingly, the main plates 15b of the rail members do not interfere with each other, which makes it easier to connect the ends of the rail members.

Next, a truss structure for reinforcing the middle horizontal rail 15 will be described.

As shown in FIG. 1, since a plurality of the solar cell modules 17 are arranged in two rows on the three horizontal rails 15, the middle horizontal rail 15 bears a heavier load than the upper and lower horizontal rails 15. For example, in FIG. 1, let us focus only on the two (upper and lower) solar cell modules 17 to the far right. Generally speaking, the upper and lower horizontal rail 15 each bear a load equivalent to 0.5 solar cell module 17, while the middle horizontal rail 15 bears a load equivalent to 1.0 solar cell module 17. Therefore, the middle horizontal rail 15 bears approximately twice the weight as do the upper and lower horizontal rails 15.

In view of this, if the strength of the three horizontal rails 15 is set to match the smaller load exerted on the upper and lower horizontal rails 15, and the horizontal rails 15 are all the same, then the horizontal rails 15 can be lighter in weight and their cost lowered. However, since the middle horizontal rail 15 will not be strong enough, a truss structure is constructed in which two trusses 16 are provided spanning the base rail 12 and the middle horizontal rail 15 as shown in FIG. 1, which reinforces the middle horizontal rail 15.

In other words, with a structure in which only the middle of the horizontal rails 15 is reinforced, the strength of the three horizontal rails 15 is set on the basis of the smaller load exerted on the upper and lower horizontal rails 15, which makes the horizontal rails 15 more lightweight and reduces their cost.

The solar cell modules 17 are arranged in two rows in this embodiment, but they may instead be arranged in three or more rows. In this case, horizontal rails other than the top horizontal rail and bottom horizontal rail shall be considered to correspond to the above-mentioned middle horizontal rail, and trusses are attached to the horizontal rails other than the top horizontal rail and bottom horizontal rail.

Also, if we call the base rail 12 on the far right side in FIG. 1 the first one, then truss structures are provided for each of the even-numbered base rails 12. Consequently, the rail members 151 and 152 of the middle horizontal rail 15 are reinforced by only one truss 16, which reduces the number of trusses 16, simplifies the installation work, and keeps the cost lower.

Figure 18:
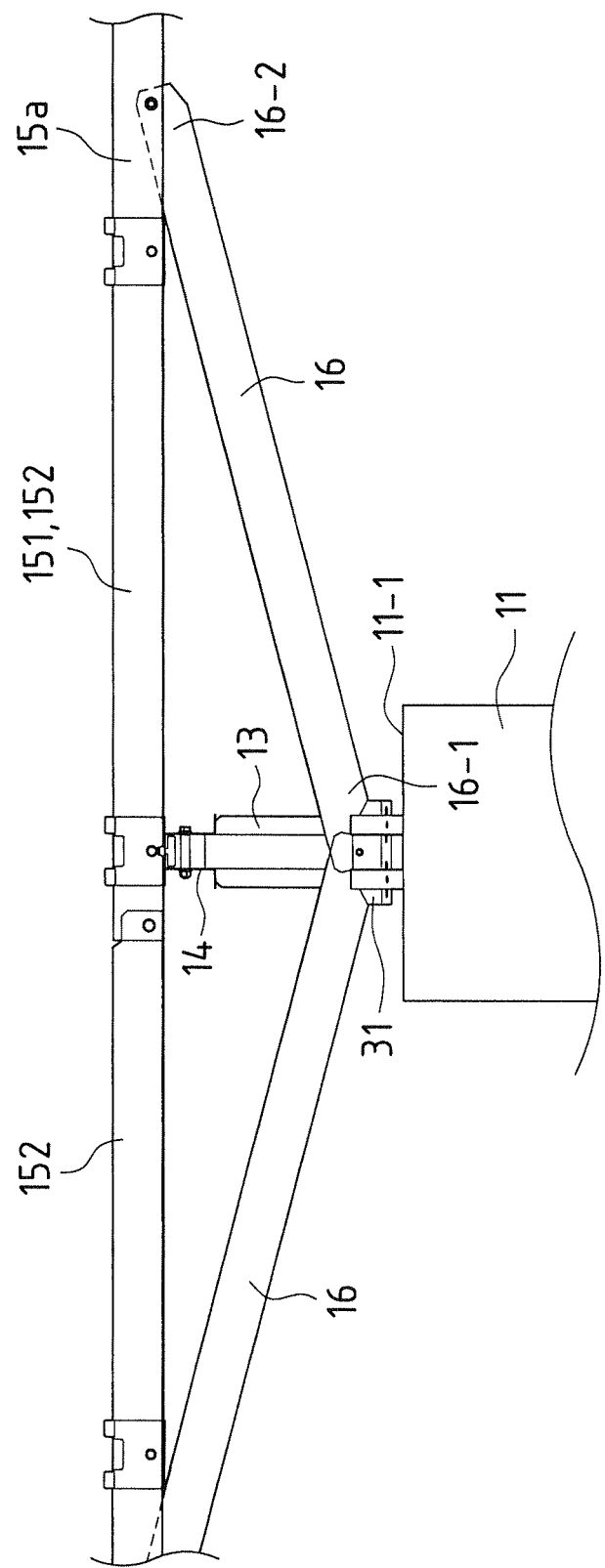
FIG. 18 is a front view of trusses that span a base rail and the middle horizontal rail.
Figure 19:
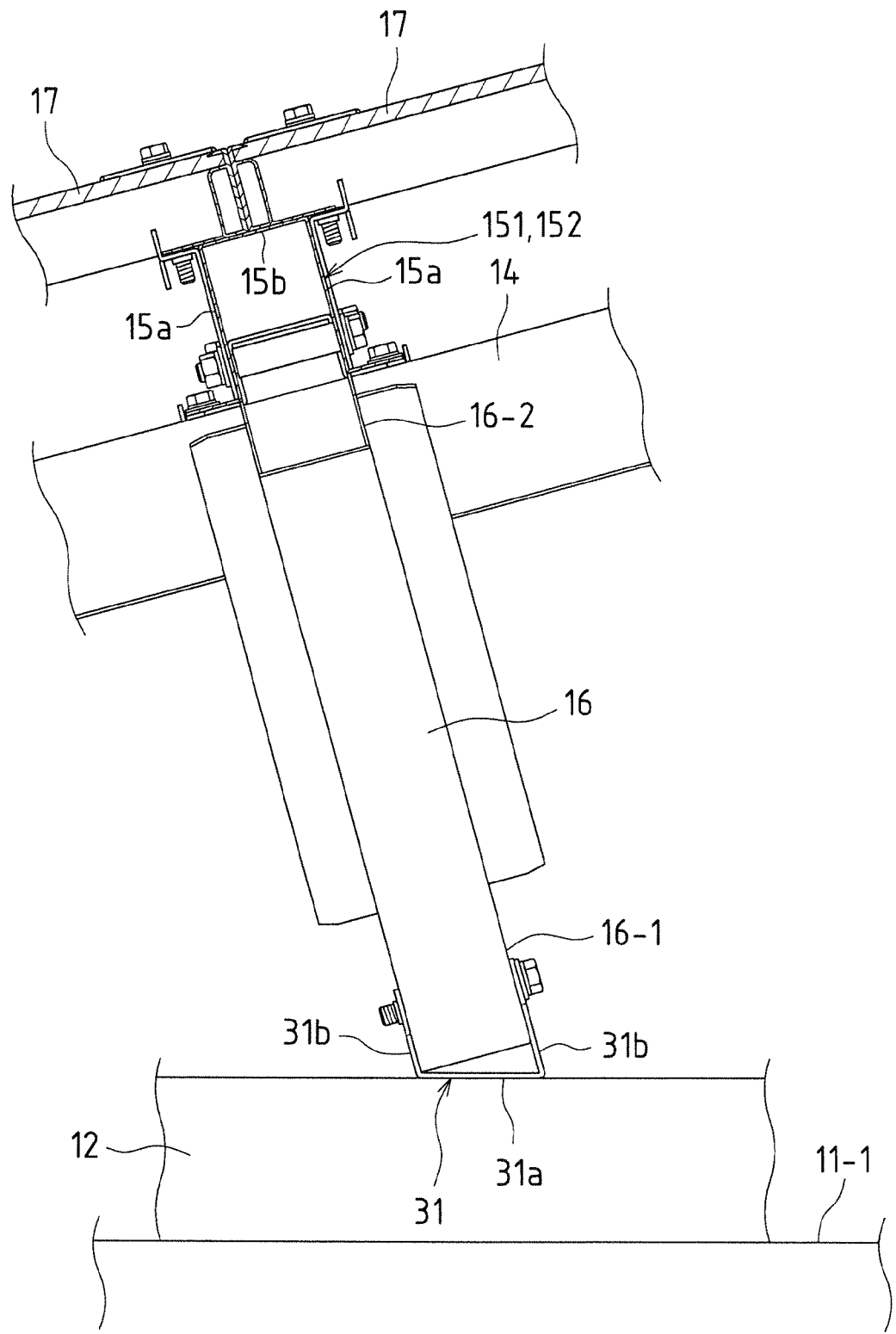
FIG. 19 is a side view of each of the trusses in FIG. 18.

FIGS. 18 and 19 are a front view and a side view of trusses 16 spanning the base rail 12 and the middle horizontal rail 15. As is clear from FIG. 19, when the trusses 16 are viewed from the side, each truss 16 is disposed perpendicular to the solar cell modules 17. This is so that the trusses 16 will not collapse under wind pressure or the weight of the solar cell modules 17. Also, for the trusses 16 to be disposed perpendicular to the solar cell modules 17, the trusses 16 must be supported so as to be inclined with respect to the base rails 12, and to this end, the side plates 31b of the attachment pieces 31 for connecting two of the trusses 16 and a base rail 12 are inclined.

FIGS. 20(a) and 20(b) are a perspective view and a side view of an attachment piece 31 for connecting two of the trusses 16 and a base rail 12. This attachment piece 31 has a main plate 31a and side plates 31b that are bent at both edges of the main plate 31a, and the side plates 31b are inclined with respect to the main plate 31a. Two slots 31c are formed in the main plate 31a, and a bolt hole 31d and a threaded hole 31e are formed in the side plates 31b.

The main plate 31a of this attachment piece 31 is placed in the approximate center of the flanges 12c of even-numbered base rails 12, the two slots 31c of the main plate 31a are superposed on the bolt holes 12f in the flanges 12c, two bolts are passed through the slots 31c in the main plate 31a and the bolt holes 12f in the flanges 12c, nuts are threaded into the ends of these bolts, and the attachment piece 31 is temporarily fastened onto the flanges 12c of the base rail 12.

In this temporarily fastened state, since the bolts pass through the slots 31c in the main plate 31a, the attachment piece 31 can be moved along the slots 31c (in the X direction in FIG. 1).

After the attachment piece 31 has been temporarily fastened, the ends of the two trusses 16 are connected to the attachment piece 31 and the middle horizontal rail 15. Here, the ends of the side plates 16a of the two trusses 16 (the end 16-1 in FIG. 9) and the side plates 31b of the attachment piece 31 are superposed so that the ends of the side plates 16a of the two trusses 16 alternate with the side plates 31b of the attachment piece 31. A pipe is inserted between the innermost side plates that are opposite each other, then the pipe, the bolt holes 16d in the side plates 16a of the trusses 16, and the holes 31d and 31e in the side plates 31b of the attachment piece 31 are aligned, bolts are passed through the pipe, the bolt holes 16d in the side plates 16a of the two trusses 16, the bolt hole 31d in the side plate 31b of the attachment piece 31, and a washer, and the end of the bolt is threaded into the threaded hole 31e in the side plate 31b of the attachment piece 31, which temporarily fastens the ends of the two trusses 16 to the attachment piece 31.

Also, as both of the trusses 16 undergo elastic deformation so that the ends (the other end 16-2 in FIG. 9) of the side plates 16a of the trusses 16 move closer together, the ends of these side plates 16a are inserted inside the side plates 15a or the rail member 151 or 152 of the middle horizontal rail 15. A pipe is inserted between the side plates 16a of the trusses 16, then the pipe, the bolt holes 16d in the side plates 16a of the trusses 16, and the bolt holes 15f in the side plates 15a of the rail member 151 or 152 are aligned, a bolt is passed through the pipe, the bolt holes 16d in the side plates 16a of the trusses 16, the bolt holes 15f in the side plates 15a of the rail member 151 or 152, and washers, and a nut is threaded into the end of the bolt to temporarily fasten the ends of the trusses 16 to the rail member 151 or 152.

In attaching the trusses 16, while moving the attachment pieces 31 along the slots 31c (in the X direction in FIG. 1), the position of the ends (the other end 16-2 in FIG. 9) of the side plates 16a of the trusses 16 is adjusted, so as to align the bolt holes 16d in the ends of the side plates 16a and the bolt holes 15f in the side plates 15a of the rail member 151 or 152. This is because the position of the horizontal rails 15 in the X direction is adjusted by moving the rail members 151 and 152 of the horizontal rails 15 in the X direction as discussed above, so the position of the trusses 16 must be offset by an amount equivalent to this adjustment of the position of the horizontal rails 15 in the X direction.

After both ends of the trusses 16 have been connected to the attachment pieces 31 and the middle horizontal rail 15, bolts for connecting the ends of the trusses 16 are tightened to fix the trusses 16.

Next, the structure connecting structure of this embodiment, that is, a structure for connecting and attaching solar cell modules 17 onto the horizontal rails 15, will be described.

Here, as is clear from FIG. 1, the middle horizontal rail 15 supports the ends of the upper and lower solar cell modules 17, while the upper and lower horizontal rails 15 support the end of either the upper or lower solar cell modules 17. Therefore, the connection structure (attachment structure) of the solar cell modules 17 is different for the middle horizontal rail 15 from that of the upper and lower horizontal rails 15. These connection structures will therefore be described separately.

FIG. 21 shows a first connecting piece disposed on the rear side of the solar cell modules 17 at the middle horizontal rails 15. This first connecting piece 41 has a side plate 41a and a main plate 41b that is bent at the upper edge of the side plate 41a. A hanging tab 41e that is bent and hangs down in the center on one side of the main plate 41b, and protrusions 41f that are bent and raised up at both ends on one side of the main plate 41b are formed on the main plate 41b. Also, a threaded hole 41d is formed in the approximate center of the main plate 41b, and a bolt hole 41c is formed in the side plate 41a. The height of the side plate 41a is substantially equal to the height of the side plates 15a of the horizontal rails 15.

FIG. 22 shows a reinforcing piece used along with the first connecting piece 41 of FIG. 21. This reinforcing piece 42 has a hat-shaped cross section defined by a pair of side plates 42a that are opposite each other, a main plate 42b that links the opposing sides of the side plates 42a, and flanges 42c that are bent outward at the edges of the side plates 42a. The reinforcing piece 42 is set to a width that allows it to fit inside the horizontal rails 15.

Threaded holes 42d are formed in the side plates 42a of this reinforcing piece 42, and slots 42e are formed in the flanges 42c.

Figure 23:
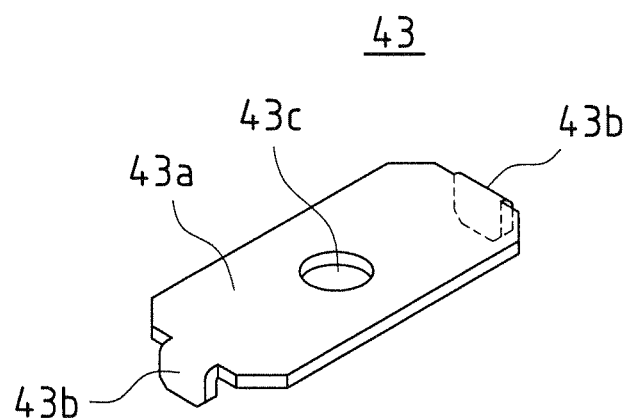
FIG. 23 is a perspective view of a first fixing piece disposed on the light receiving face side of a solar cell module.

FIG. 23 is a perspective view of a first fixing piece disposed on the light receiving face side of a solar cell module 17. This first fixing piece 43 has protruding tabs 43b bent downward at the front and rear ends of a presser plate 43a, and a bolt hole 43c is formed in the center of the presser plate 43a.

Figure 24:
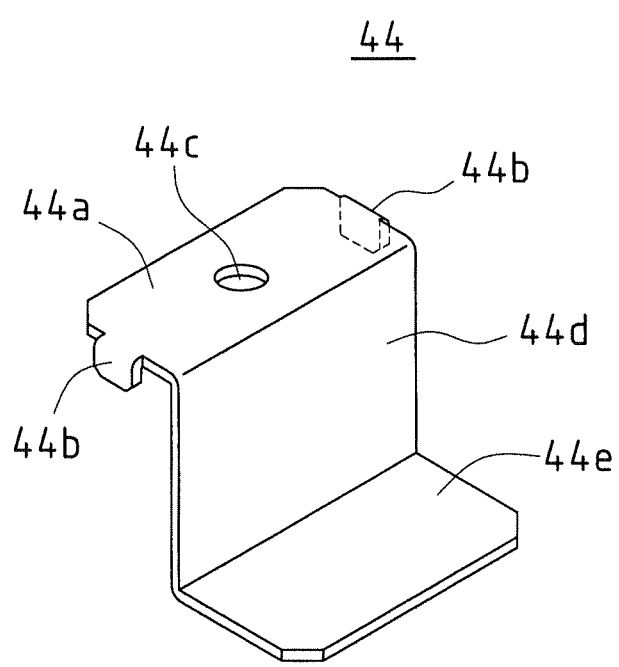
FIG. 24 is a perspective view of a second fixing piece disposed on the light receiving face side of a solar cell module.

FIG. 24 is a perspective view of a second fixing piece disposed on the light receiving face side of a solar cell module 17. This second fixing piece 44 has protruding tabs 44b bent downward at the front and rear ends of a presser plate 44a, a bolt hole 44c is formed in the center of the presser plate 44a, a vertical wall 44d that is bent perpendicular from one end edge of the presser plate 44a is formed, and a bottom tab 44e that is bent at the bottom end edge of the vertical wall 44d is formed.

The first connecting piece 41, the reinforcing piece 42, and the first and second fixing pieces 43 and 44 are made of steel sheets that are sufficiently thicker than the base rail 12, the arm 13, the vertical rail 14, the horizontal rail 15, and the trusses 16, and are therefore high in strength.

Figure 25:
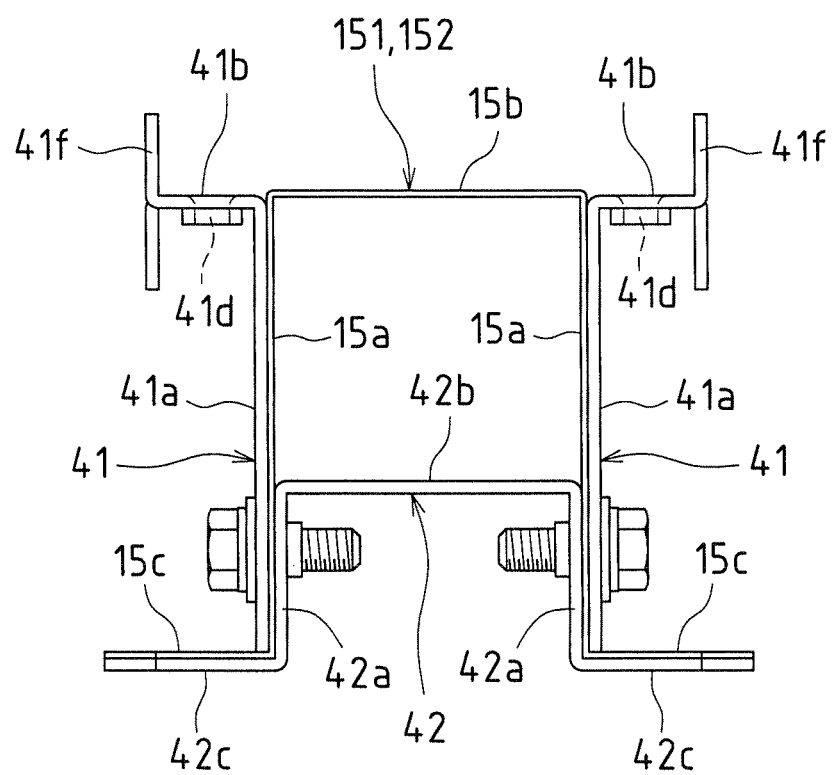
FIG. 25 is a cross sectional view of the state when a first connecting piece and a reinforcing piece have been attached to the middle horizontal rail.

Here, the first connecting pieces 41 are disposed in pairs at the places where the bolt hole 15e and the pair of slits 15d are formed on the main plate 15b of the rail members 151 and 152 of the middle horizontal rail 15, and as shown in FIG. 25, the side plates 41a of the two first connecting pieces 41 are superposed on the side plates 15a of the horizontal rail 15, the main plates 41b of these first connecting pieces 41 are oriented so as to protrude outward from the horizontal rail 15, and the protrusions 41f of these first connecting pieces 41 protrude upward beyond the main plate 15b of the horizontal rail 15.

Just as with the first connecting piece 41, the reinforcing piece 42 is disposed where the bolt hole 15e and the pair of slits 15d are formed on the main plate 15b of the middle horizontal rail 15, and is fitted on the inside of the horizontal rail 15, and as shown in FIG. 25, the side plates 42a of the reinforcing piece 42 are superposed on the lower portion of the side plates 15a of the horizontal rail 15, and the flanges 42c of the reinforcing piece 42 are superposed on the flanges 15c of the horizontal rail 15.

As shown in FIG. 25, two bolts are threaded into threaded holes 42d in the side plates 42a of the reinforcing piece 42 via the bolt holes 41c in the side plates 41a of the first connecting pieces 41 and the bolt holes 15f in the side plates 15a of the horizontal rail 15, and are tightened. Therefore, at the positions of the first connecting pieces 41, the side plates and flanges have a two- or three-walled structure, so the strength is higher at these positions.

As shown in FIG. 7, since the bolt holes 15e and the pairs of slits 15d are formed at four locations in the first rail member 151 on the far right side of the middle horizontal rail 15 in FIG. 1, two of the first connecting pieces 41 are provided at each of these four locations, and one reinforcing piece 42 is provided at each of the same four locations. Also, as shown in FIG. 8, since the bolt holes 15e and the pairs of slits 15d are formed at three locations in the second and subsequent rail members 151 of the horizontal rail 15, two of the first connecting pieces 41 are provided at each of these three locations, and one reinforcing piece 42 is provided at the same three locations.

Also, at both ends of the rail member 151 shown in FIG. 7, the slots 42e in the flanges 42c of the reinforcing piece 42 are superposed on the slots 15g in the flanges 15c of the rail member 151. Furthermore, at one end of the rail member 152 shown in FIG. 8, the slots 42e in the flanges 42c of the reinforcing piece 42 are superposed on the slots 15g in the flanges 15c of the rail member 152. Accordingly, the slots 15g in the flanges 15c of the rail members 151 and 152 are not blocked by the flanges 42c of the reinforcing piece 42, nor is the length of these slots 15g limited, and there is no hindrance to the movement of the rail members 151 and 152 along the slots 15g (in the X direction in FIG. 1).

Figure 26:
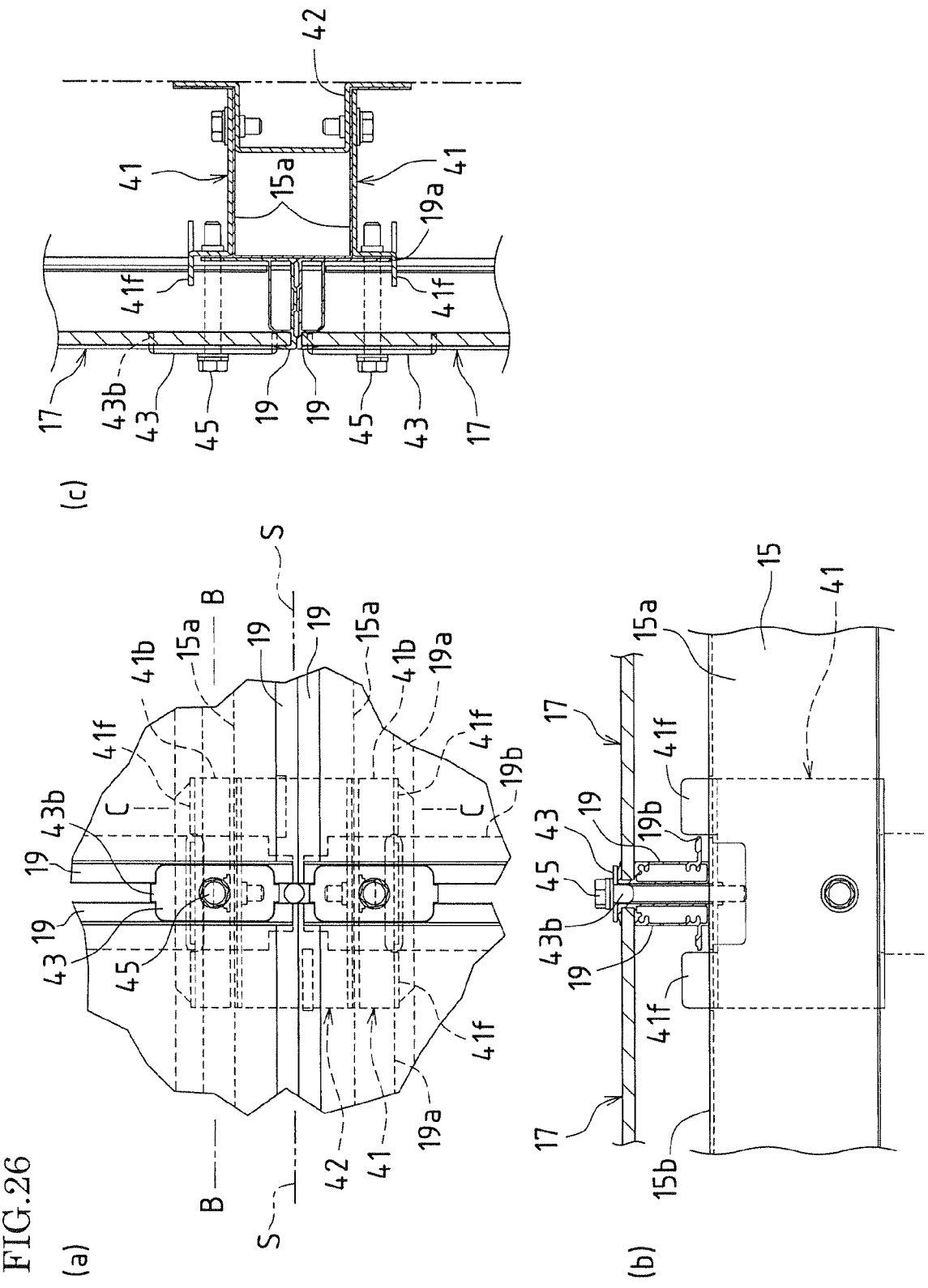
FIG. 26(a) is a plan view of the state when a first connecting piece, a reinforcing piece, and a first fixing piece have been used to attach four (top, bottom, left, and right) solar cell modules to the middle horizontal rail.
FIG. 26(b) is a cross sectional view along the B-B line in FIG. 26(a)
FIG. 26(c) is a cross sectional view along the C-C line in FIG. 26(a)
Figure 27:
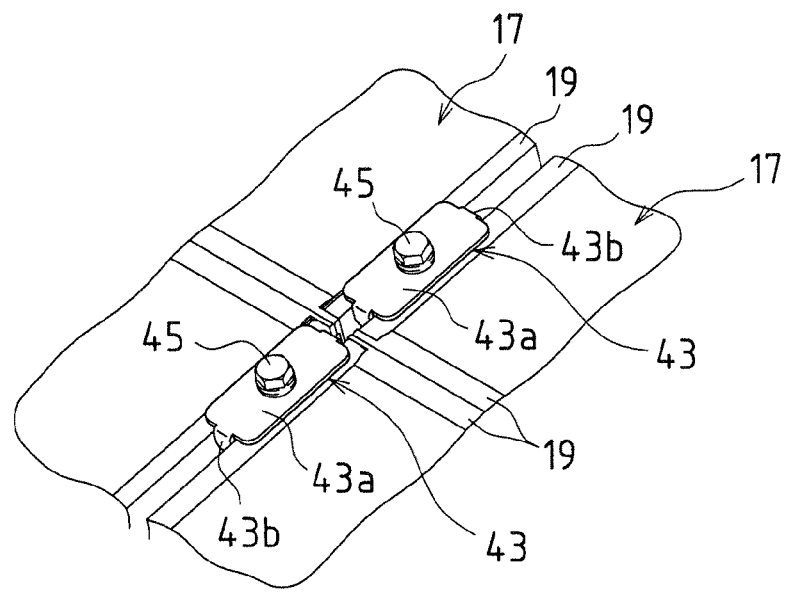
FIG. 27 is a perspective view of the attachment state in FIG. 26(a) as seen from the light receiving face side of the solar cell module.

FIG. 26(a) is a plan view of the state when the first connecting pieces 41, the reinforcing piece 42, and the first fixing piece 43 have been used to attach four (top, bottom, left, and right) solar cell modules 17 to the middle horizontal rail 15. FIG. 26(b) is a cross sectional view along the B-B line in FIG. 26(a), and FIG. 26(c) is a cross sectional view along the C-C line in FIG. 26(a). FIG. 27 is a perspective view of the state in FIG. 26 as seen from the light receiving face side of the solar cell module.

As shown in FIGS. 26(a) to 26(c), frame members 19 of the lower left and right solar cell modules 17 are inserted between the protrusions 41f of the lower first connecting piece 41, and placed on the main plate 15b of the horizontal rail 15. Here, the solar cell modules 17 are positioned up and down by dropping the solar cell modules 17 on the main plate 15b of the horizontal rail 15 until the inner edges 19a of the frame members 19 of the lower left and right solar cell modules 17 abut against the protrusions 41f of the lower first connecting piece 41.

As shown in FIGS. 26(a), 26(b), and 27, the protruding tabs 43b of the first fixing piece 43 are inserted between the frame members 19 of the lower left and right solar cell modules 17, the frame members 19 of these solar cell modules 17 are separated by a specific spacing, and at the same time, as shown in FIG. 26(b), bottom protrusions 19b of the frame members 19 of the solar cell modules 17 are brought into contact with the protrusions 41f of the first connecting pieces 41, thereby positioning the solar cell modules 17 to the left and right.

Then, bolts 45 are threaded into the threaded holes 41d in the main plates 41 of the first connecting pieces 41 via the gap between the frame members 19 of the lower left and right solar cell modules 17 and via the bolt holes 43c in the first fixing pieces 43, and the bolts are tightened. Consequently, the frame members 19 of the lower left and right solar cell modules 17 are sandwiched and fixed between the main plate 15b of the horizontal rail 15 and the first fixing piece 43.

Similarly, frame members 19 of the upper left and right solar cell modules 17 are inserted between the protrusions 41f of the upper first connecting piece 41, and placed on the main plate 15b of the horizontal rail 15. At this point, the frame members 19 of the upper left and right solar cell modules 17 are brought into contact with the frame members 19 of the lower left and right solar cell modules 17, thereby positioning up and down the upper left and right solar cell modules 17. The protruding tabs 43b of the first fixing pieces 43 are then inserted between the frame members 19 of the upper left and right solar cell modules 17, and the bottom protrusions 19b of the frame members 19 of these solar cell modules 17 are brought into contact with the protrusions 41f of the first connecting pieces 41, thereby positioning the solar cell modules 17 to the left and right.

Then, bolts 45 are threaded into the threaded holes 41d in the main plates 41 of the first connecting pieces 41 via the gap between the frame members 19 of the upper left and right solar cell modules 17 and via the bolt holes 43c in the first fixing pieces 43, and the bolts are tightened, thereby fixing the frame members 19 of the upper left and right solar cell modules 17.

Meanwhile, the second fixing pieces 44 are used to fix the two upper and lower solar cell modules 17 to the far right or left in FIG. 1.

Figure 28:
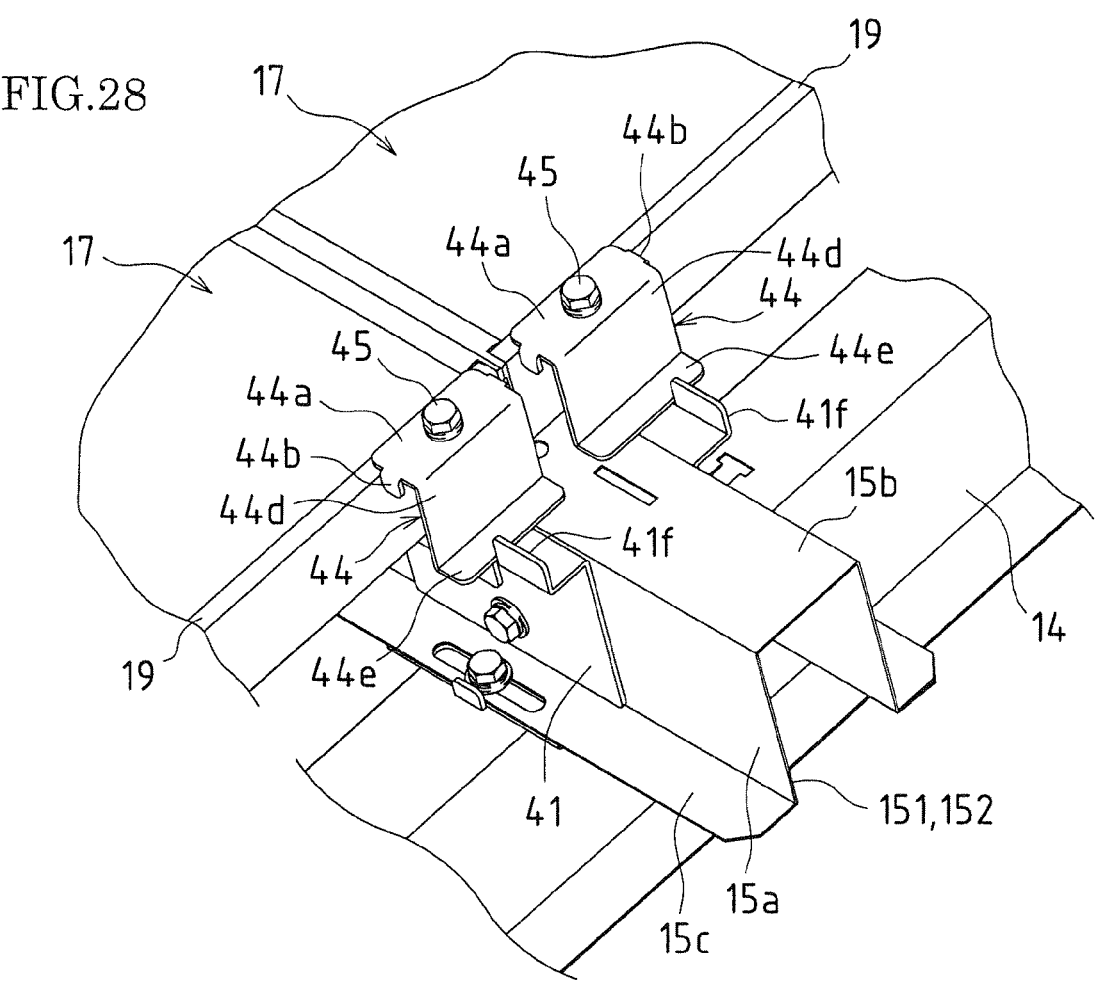
FIG. 28 is a perspective view of the state when a first connecting piece, a reinforcing piece, and a second fixing piece have been used to attach a solar cell module to a horizontal rail.

As shown in FIG. 28, the frame members 19 of the solar cell modules 17 to the far right or left are inserted between the protrusions 41f of the first connecting pieces 41 and placed on the main plate 15b of the horizontal rail 15. The bottom tabs 44e of the second fixing pieces 44 are then placed on the main plate 15b of the horizontal rail 15, and the protruding tabs 44b of the second fixing pieces 44 are pressed against the frame members 19 of the solar cell modules 17, which brings the bottom protrusions 19b of the frame members 19 of the solar cell modules 17 into contact with the protrusions 41f of the first connecting pieces 41, and positions the solar cell modules 17 to the left and right.

The bolts 45 are then threaded into the threaded holes 41d in the main plates 41b of the first connecting pieces 41 via the bolt holes 44c in the second fixing pieces 44, and the bolts are tightened. Consequently, the frame members 19 of the solar cell modules 17 are sandwiched and fixed between the main plate 15b of the horizontal rail 15 and the second fixing pieces 44.

As discussed above, at the first connecting pieces 41 and the reinforcing pieces 42, the side plates 15a of the horizontal rail 15, the side plates 41a of the first connecting pieces 41, and the side plates 42a of the reinforcing pieces 42 are double- or triple-walled, and the flanges 15c of the horizontal rail 15 and the flanges 42c of the reinforcing pieces 42 are double-walled, so the strength is higher at these places. Also, since the main plate 15b and the side plates 15a of the horizontal rail 15 and the main plates 42 of the reinforcing pieces 42 have a square, closed structure, this also increases strength at these places.

Also, when a high wind pressure is exerted on the front and back of the solar cell modules 17, the middle part of the solar cell modules 17 may bend under this pressure, and a strong force is generated that tries to separate the frame members 19 of the solar cell modules 17 from the places where they are latched. In this embodiment, however, even if wind pressure is exerted on the front and rear faces of the solar cell modules 17, since the protrusions 41f of the first connecting pieces 41 are hooked inside the frame members 19 of the solar cell modules 17, and the frame members 19 of the solar cell modules 17 are sandwiched between the first connecting pieces 41 and the first or second fixing pieces 43 or 44, the frame members 19 of the solar cell modules 17 will not come loose.

Furthermore, the pairs of first connecting pieces 41 are disposed opposite each other with the horizontal rail 15 in between, and are disposed in up and down symmetry with respect to the center line S of the horizontal rail 15 (shown in FIG. 26(a)). The bolts 45 for fixing the upper and lower solar cell modules 17 are threaded into the threaded holes 41d in the first connecting pieces 41, and these bolts 45 are also disposed in up and down symmetry with respect to the center line S of the horizontal rail 15.

The effect of wind pressure produces a force at the locations of the first or second fixing pieces 43 or 44 and the protrusions 41f of the first connecting pieces 41, and if there is a mistake in this layout design, this force will act to twist the horizontal rails 15 or the frame members 19 of the solar cell modules 17, and these portions may end up being deformed. As shown in FIG. 26, however, since the protrusions 41 of the first connecting pieces 41 are substantially disposed on a straight line parallel to the center line S of the horizontal rail 15 and the bolts 45 of the first or second fixing pieces 43 or 44, and the bolts 45 of the first or second fixing pieces 43 or 44 and the protrusions 41f are disposed in up and down symmetry with respect to the center line S of the horizontal rails 15, a force resulting from the effect of wind pressure does not act to twist the frame members 19 of the solar cell modules 17 or the horizontal rails 15, and these portions will not be deformed.

To prevent this twisting force, the protrusions 41f of two first connecting pieces 41 and the bolts 45 of the first or second fixing pieces 43 or 44 are preferably disposed on the center line S of the horizontal rail 15, but as is clear from FIG. 26, the frame members 19 of the upper and lower solar cell modules 17 cannot both be fixed on the center line S of the horizontal rail 15, so the protrusions 41f of the two first connecting pieces 41 and the bolts 45 of the first or second fixing pieces 43 or 44 are provided at symmetrical positions with respect to the center line S of the horizontal rail 15.

Also, since the bolts 45 are threaded into the threaded holes 41d of the first connecting pieces 41, which are sufficiently thicker than the horizontal rail 15, wind pressure exerted on the solar cell modules 17 will not pull out the bolts 45.

Specifically, a closed structure and a double- or triple-walled structure are constituted by the horizontal rail 15, the first connecting pieces 41, and the reinforcing piece 42, the bolts 45 and the protrusions 41f for fixing the upper and lower solar cell modules 17 are disposed in up and down symmetry with respect to the center line S of the horizontal rail 15, and the bolts 45 are threaded into the threaded holes 41d of the first connecting pieces 41 that are sufficiently thick, and this markedly improves the load bearing of the horizontal rail 15.

Figure 29:
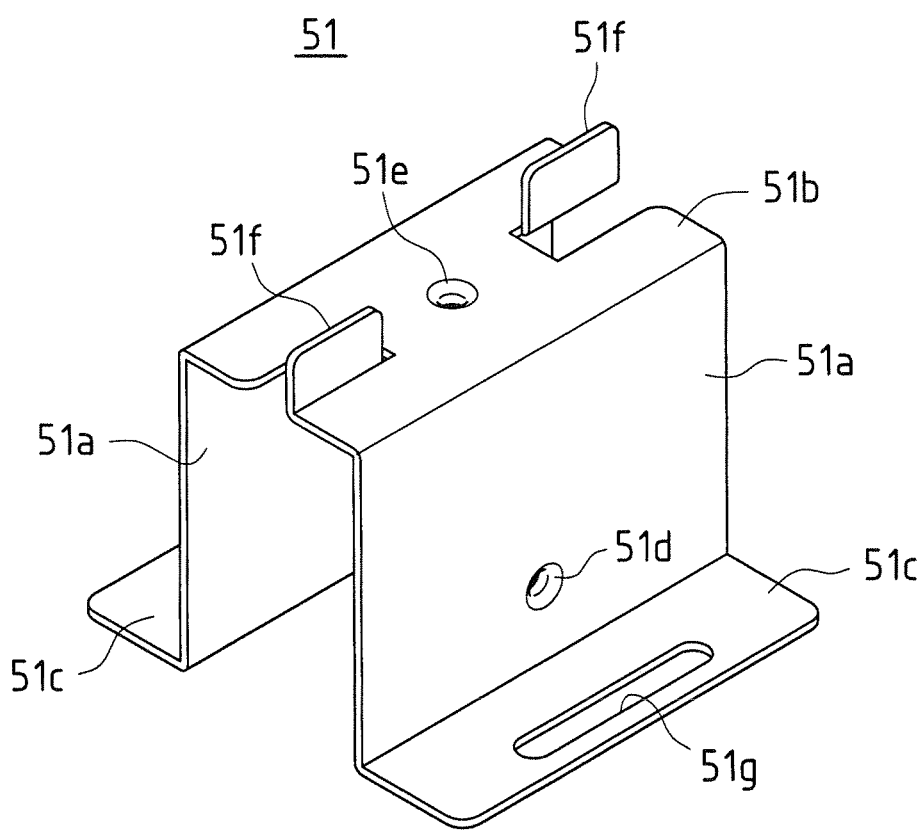
FIG. 29 is a perspective view of a second connecting piece in the structure connecting structure of this embodiment.

FIG. 29 is a perspective view of a second connecting piece disposed on the rear face side of the solar cell modules 17 in the upper and lower horizontal rails 15. FIG. 30 is a plan view (FIG. 30(a)) and a side view (FIG. 30(b)) of the second connecting piece in FIG. 29. This second connecting piece 51 has a hat-shaped cross section defined by a pair of mutually opposing side plates 51a, a main plate 51b that links the opposing sides of the side plates 51a, and flanges 51c that are bent at the edges of the side plates 51a and protrude outward, and has a shape and size that fit on the inside of the horizontal rail 15.

Substantially L-shaped cuts are formed inward from both ends of the main plate 51b of the second connecting piece 51, and the insides of these L-shaped cuts are raised to produce protrusions 51f. Also, threaded holes 51d are formed in the side plates 51a of the second connecting piece 51, a threaded hole 51e is formed on the center line of the main plate 51b, and slots 51g are formed in the flanges 51c.

This second connecting piece 51 is also made by bending sufficiently thick sheet steel, just as are the first connecting piece 41, the reinforcing piece 42, and the first and second fixing pieces 43 and 44, so it is high in strength.

These second connecting pieces 51 are disposed at the places where the pairs of slits 15d and the bolt holes 15e are formed in the main plates 15b of the upper and lower horizontal rails 15, and are fitted on the inside of the horizontal rails 15.

Figure 31:
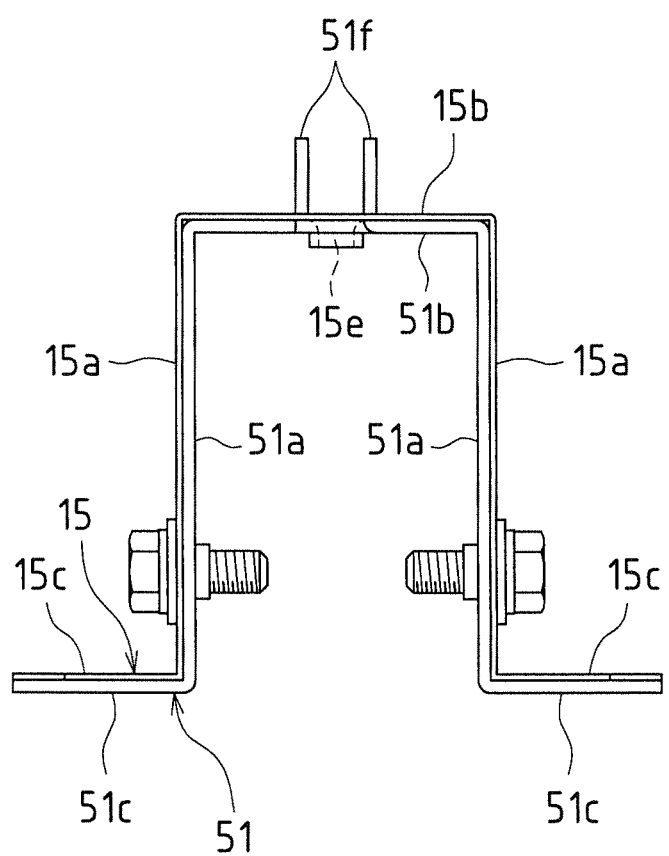
FIG. 31 is a cross sectional view of the state when a second connecting piece has been attached to the upper and lower horizontal rails.

As shown in FIG. 31, when the second connecting piece 51 is fitted on the inside of the horizontal rail 15, the protrusions 51f of the main plate 51b of the second connecting piece 51 protrude upward from the pair of slits 15d in the main plate 15b of the horizontal rail 15.

The side plates 51a of the second connecting piece 51 are superposed on the side plates 15a of the horizontal rail 15, the main plate 51b is superposed on the main plate 15b of the horizontal rail 15, and the flanges 51c are superposed on the flanges 15c of the horizontal rail 15.

In this state, two bolts are threaded into the threaded holes 51d in the side plates 51a of the second connecting piece 51 via the bolt holes 15f in the side plates 15a of the horizontal rail 15, and the bolts are tightened. Therefore, at the location of the second connecting piece 51, the main plate, side plates, and flanges have a double-walled structure, and the strength is higher at these locations.

As shown in FIG. 7, the pair of slits 15d and the bolt hole 15e are formed at each of four places on the first rail member 151 on the far right of the upper and lower horizontal rails 15 in FIG. 1, so the second connecting piece 51 is provided at each of these four places. Also, as shown in FIG. 8, the pair of slits 15d and the bolt hole 15e are formed at each of three places on the second and subsequent rail members 151 of the horizontal rail 15, so the second connecting piece 51 is provided at each of these three places.

At both ends of the rail member 151 shown in FIG. 7, the slots 51g in the flanges 51c of the second connecting piece 51 are superposed on the slots 15g in the flanges 15c of the rail member 151. At one end of the rail member 152 shown in FIG. 8, the slots 51g in the flanges 51c of the second connecting piece 51 are also superposed on the slots 15g in the flanges 15c of the rail member 152. Therefore, the slots 15g in the flanges 15c of the rail members 151 and 152 are not blocked by the flanges 51c of the second connecting piece 51, nor is the length of the slots 15g limited, and there is no hindrance to the movement of the rail members 151 and 152 along the slots 15g.

Figure 32:
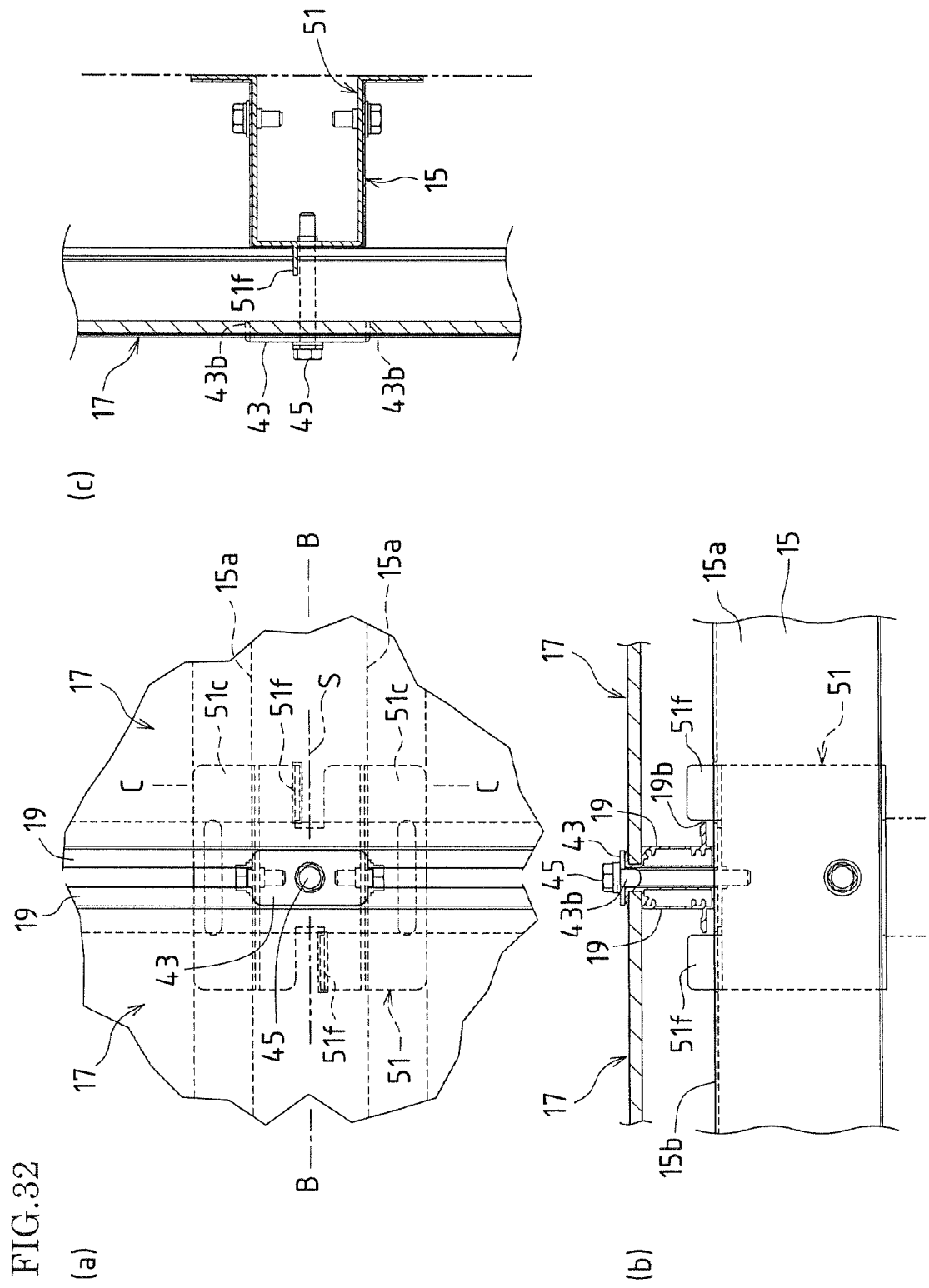
FIG. 32(a) is a plan view of the state when a second connecting piece and a first fixing piece have been used to attach two (left and right) solar cell modules to the upper and lower horizontal rails.
FIG. 32(b) is a cross sectional view along the B-B line in FIG. 32(a)
FIG. 32(c) is a cross sectional view along the C-C line in FIG. 32(a)

FIG. 32(a) is a plan view of the state when the second connecting piece 51 and the first fixing piece 43 have been used to attach two (left and right) solar cell modules 17 to the upper and lower horizontal rails 15. FIG. 32(b) is a cross sectional view along the B-B line in FIG. 32(a), and FIG. 32(c) is a cross sectional view along the C-C line in FIG. 32(a).

As shown in FIGS. 32(a) to 32(c), the frame members 19 of the left and right solar cell modules 17 are put between the protrusions 51f of the second connecting piece 51, and placed on the main plate 15b of the horizontal rail 15. The protruding tabs 43b of the first fixing piece 43 are then inserted between the frame members 19 of the left and right solar cell modules 17, which keeps the frame members 19 of the solar cell modules 17 separated by a specific distance, and at the same time the bottom protrusions 19b of the frame members 19 of the solar cell modules 17 are brought into contact with the protrusions 51f of the second connecting piece 51, which positions the solar cell modules 17 to the left and right.

Then, bolts 45 are threaded into the threaded holes 51e in the main plate 51b of the second connecting piece 51 via the bolt holes 43c in the first fixing piece 43, the gap between the frame members 19 of the solar cell modules 17, and the bolt hole 15e in the main plate 15b of the horizontal rail 15, and the bolts are tightened. Consequently, the frame members 19 of the solar cell modules 17 are sandwiched and fixed between the main plate 15b of the horizontal rail 15 and the first fixing piece 43.

In general, to make installation easier, a connection piece is disposed so as to support the lower sides of the lower solar cell modules 17. However, since positioning in the up and down direction is performed by the previously used first connecting piece 41 at the middle horizontal rail 15, the place fixed by the second connecting piece 51 may be the side of the solar cell modules 17 in the direction of water flow. Therefore, the spacing between the connecting pieces 41 and 51 can be made shorter than the side of the solar cell modules 17 in the direction of water flow, without making installation any harder. The same applies to the spacing of the connecting pieces 41 and 51 of the upper solar cell modules 17 supported and positioned by the lower solar cell modules 17. Consequently, it is possible to make the vertical rails 14 shorter than the length of the upper and lower solar cell modules 17 in the direction of water flow, and this in turns makes it possible for the rack to be more compact.

Figure 33:
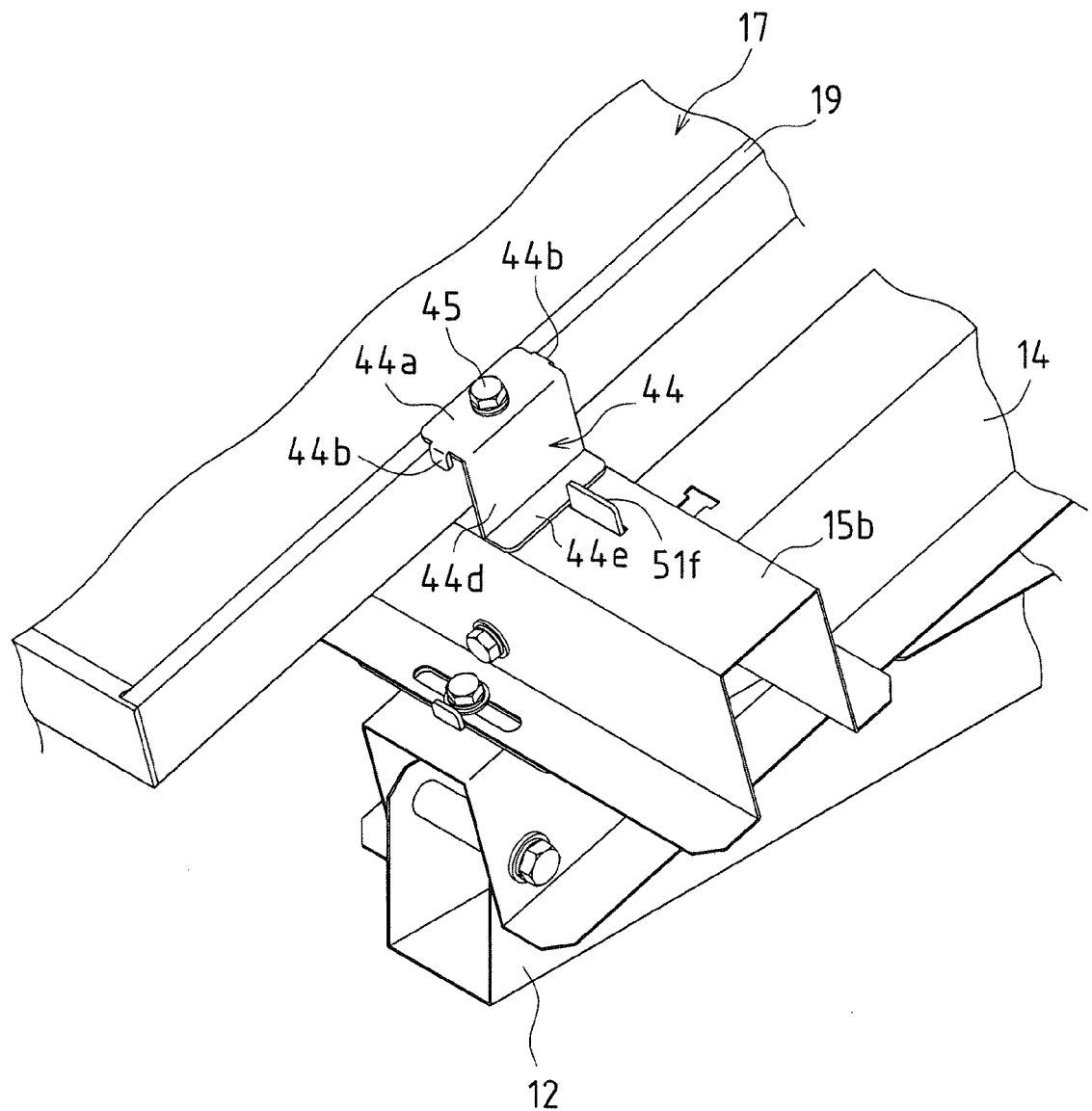
FIG. 33 is a perspective view of the state when a second connecting piece, a reinforcing piece, and a second fixing piece have been used to attach a solar cell module to a horizontal rail.

Also, the second fixing piece 44 is used to fix the two (upper and lower) solar cell modules 17 on the far right or left side in FIG. 1. As shown in FIG. 33, the frame members 19 of the solar cell modules 17 on the far right or left side are put between the protrusions 51f of the second connecting piece 51 and placed on the main plate 15b of the horizontal rail 15. The bottom tab 44e of the second fixing piece 44 is placed on the main plate 15b of the horizontal rail 15, and the protruding tabs 44b of the second fixing piece 44 are pressed against the frame members 19 of the solar cell modules 17, which brings the bottom protrusions 19b of the frame members 19 of the solar cell modules 17 into contact with the protrusions 51f of the second connecting piece 51 and positions the solar cell modules 17 to the left and right. A bolt 45 is threaded into the threaded hole 51e in the main plate 51 of the second connecting piece 51 via the bolt hole 43c in the second fixing piece 44 and the bolt hole 15e in the main plate 15b of the horizontal rail 15, and the bolt is tightened. This sandwiches and fixes the frame members 19 of the solar cell modules 17 between the second fixing piece 44 and the main plate 15b of the horizontal rail 15.

As discussed above, at the locations of the second connecting piece 51, the side plates, the main plate, and the flanges have a double-walled structure, so the strength is higher at these locations.

Also, when a high wind pressure is exerted on the front and back of the solar cell modules 17, the middle part of the solar cell modules 17 may bend under this pressure, and a strong force is generated that tries to separate the frame members 19 of the solar cell modules 17 from the places where they are latched. In this embodiment, however, even if wind pressure is exerted on the front and rear faces of the solar cell modules 17, since the protrusions 51f of the second connecting pieces 51 are hooked inside the frame members 19 of the solar cell modules 17, and the frame members 19 of the solar cell modules 17 are sandwiched between the second connecting pieces 51 and the first or second fixing pieces 43 or 44, the frame members 19 of the solar cell modules 17 will not come loose.

Also, the bolt hole 15e is formed on the center line S of the main plate 15b of the horizontal rail 15 (shown in FIG. 32(a)), and the threaded hole 51e is formed on the center line S of the main plate 51b of the second connecting piece 51. A bolt 45 for fixing the solar cell modules 17 is then threaded into the threaded hole 51e via the bolt hole 15e, and the bolt 45 is disposed on the center line S of the main plate 51b of the second connecting piece 51 and of the main plate 15b of the horizontal rail 15.

Thus, since the protrusions 51f of the second connecting piece 51 are substantially disposed on the center line S of the horizontal rail 15, and the bolts 45 of the first or second fixing pieces 43 or 44 are also disposed on the center line S of the horizontal rail 15, the force resulting from wind pressure acts hardly at all to twist the horizontal rail 15 or the frame members 19 of the solar cell modules 17, and these portions will not be deformed.

To prevent this twisting force, the protrusions 51f of the second connecting piece 51 and the bolts 45 are ideally on the center line S of the horizontal rail 15, but from the standpoint of the strength of the second connecting piece 51, some distance must be ensured between the side plates 51a and the area of the L-shaped cuts for forming the protrusions 51f, so the protrusions 51f are provided at locations that are offset slightly from the center line S. However, since the bolts 45 of the first or second fixing pieces 43 or 44 are on the center line S of the horizontal rail 15, the effect of twisting force can be kept to a minimum.

Also, since the bolt 45 is threaded into the threaded hole 51e of the second connecting piece 51, which is sufficiently thicker than the horizontal rail 15, wind pressure is exerted on the solar cell modules 17 will not pull out the bolts 45.

Specifically, the horizontal rail 15 and the second connecting piece 51 constitute a double-walled structure, the protrusions 51f and bolts 45 used to fix the solar cell modules 17 are disposed on the center line S of the horizontal rail 15, and the bolts 45 are threaded into the threaded holes 51e in the second connecting pieces 51 that are sufficiently thick, which greatly improves the load bearing of the horizontal rail 15.

Next, the procedure for installing the solar cell system in FIG. 1 will be described through reference to FIGS. 34 to 45.

First, as shown in FIG. 1, a plurality of concrete foundations 11 are formed equidistantly on the ground, and the top faces 11-1 of these foundations are made horizontal and in the same plane, thereby forming horizontal foundation faces.

Figure 34:
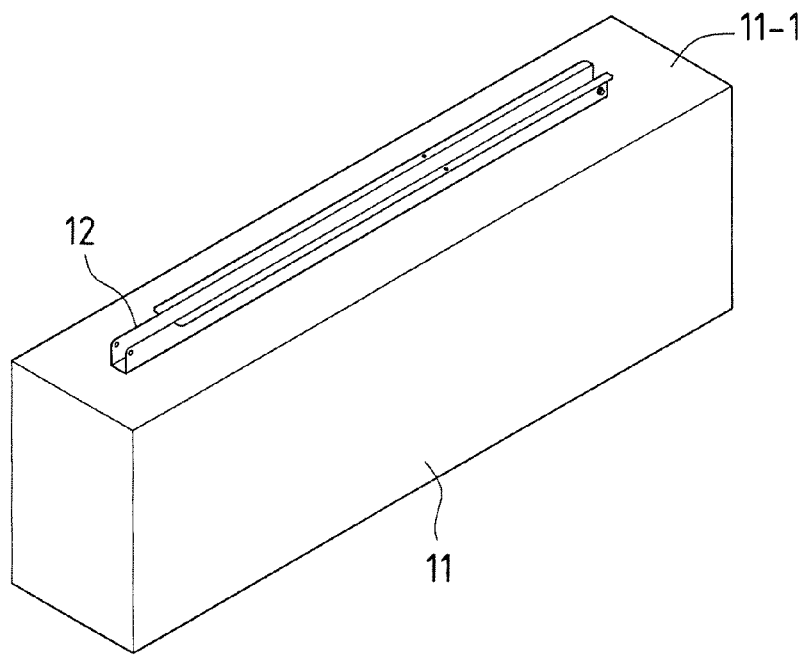
FIG. 34 is a perspective view of the state when a base rail has been fixed to a concrete foundation in the process of installing a solar cell system.

As shown in FIG. 34, a base rail 12 is fixed to the top face 11-1 of the concrete foundation 11. As discussed above, bolts 21 on the top face 11-1 of the concrete foundation 11 are passed through the slots 12d in the main plate 12b of the base rail 12, the base rail 12 is placed on the top face 11-1 of the concrete foundation 11, and the base rail 12 is moved in the Y direction to adjust its position in the Y direction. The bolts 21 are then passed through the two reinforcing pieces 22, the reinforcing pieces 22 are disposed on the inside of the base rail 12, and nuts are threaded into the bolts 21 and tightened to fix the base rail 12.

Figure 35:
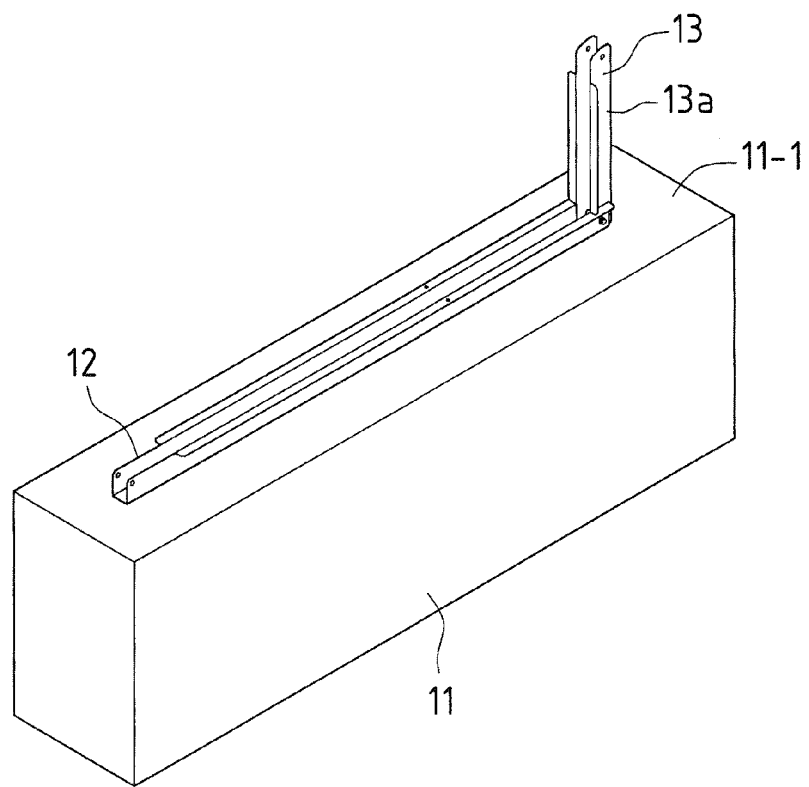
FIG. 35 is a perspective view of the state when an arm has been provided and fixed to protrude from the rear end of a base rail in the process of installing a solar cell system.

As shown in FIG. 35, the lower ends of the side plates 13a of an arm 13 are inserted on the inside of the rear end of the base rail 12, the arm 13 is put upright, a pipe is inserted between the side plates 13a of the arm 13 as discussed above, a bolt is passed through the pipe, the bolt holes 13d in the side plates 13a of the arm 13, the bolt holes 12e in the side plates 12a of the base rail 12, and washers, and a nut is threaded into one end of the bolt and tightened to fix the lower ends of the side plates 13a of the arm 13 to the side plates 12a of the base rail 12.

Figure 36:
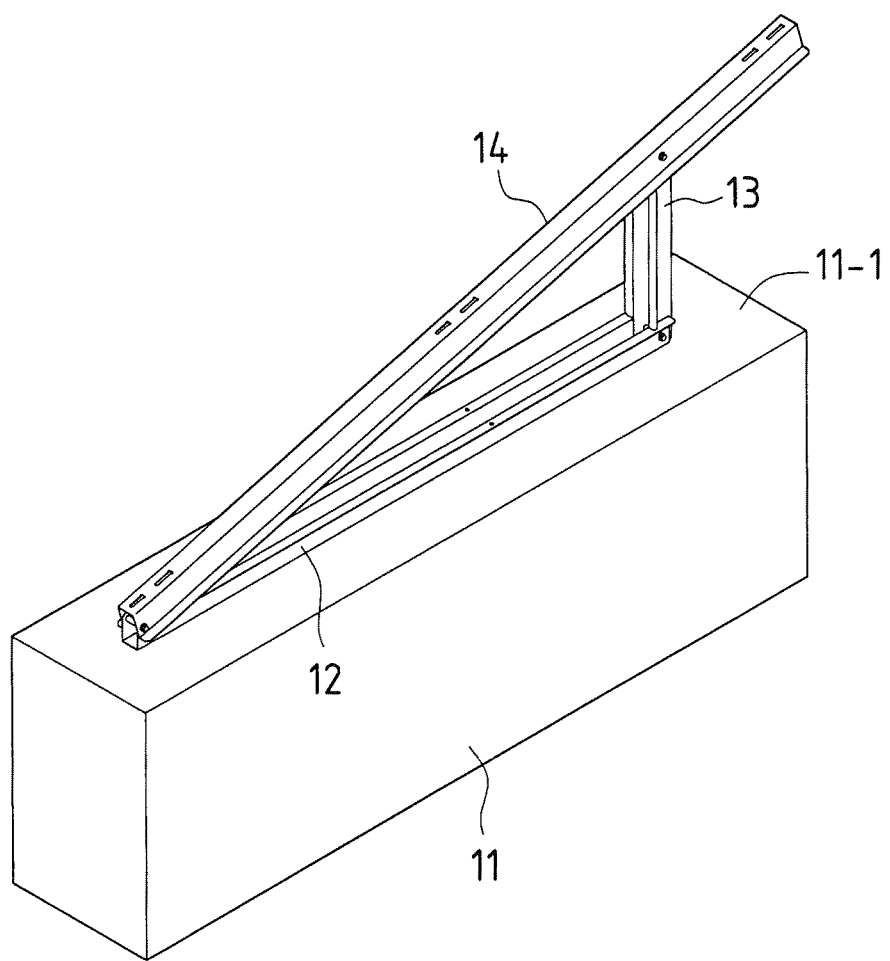
FIG. 36 is a perspective view of the state when a vertical rail is fixed to obliquely span the upper end of an arm and the distal end of a base in the process of installing a solar cell system.

As shown in FIG. 36, the vertical rail 14 is fixed to obliquely span the distal end of the base rail 12 and the upper end of the arm 13. The vertical rail 14 is connected to the distal end of the base rail 12, and the vertical rail 14 is connected to the upper end of the arm 13 using a pipe, a bolt, washers, a nut, etc.

Figure 37:
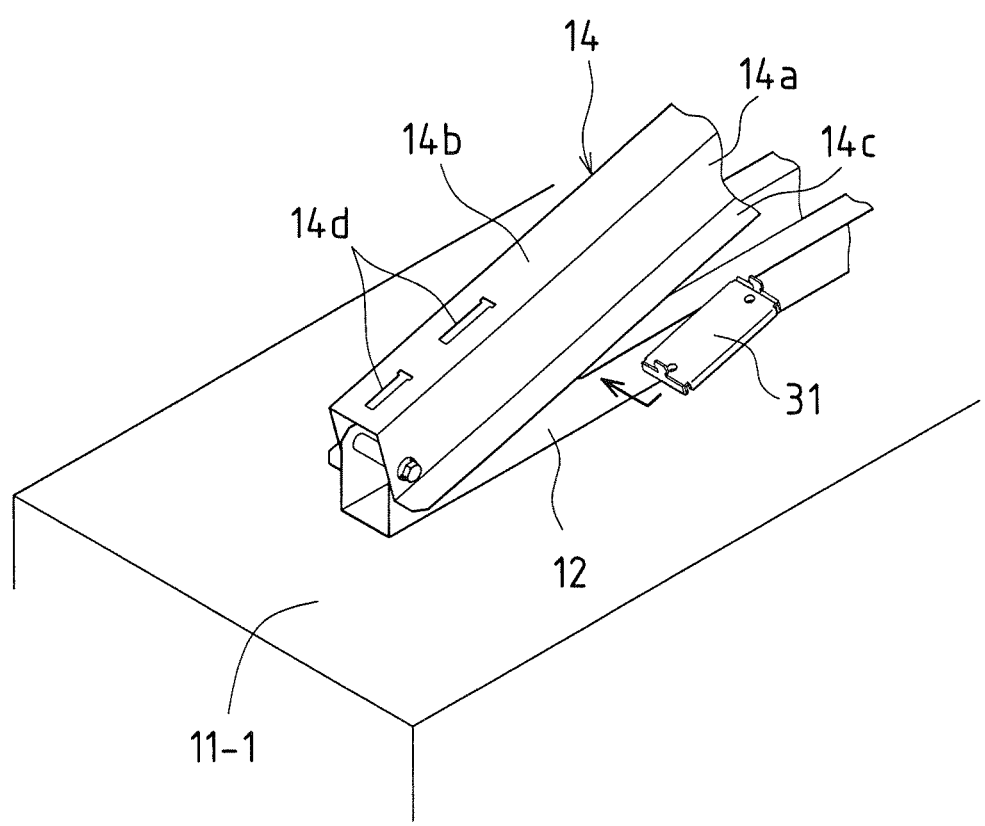
FIG. 37 is a perspective view of the step of attaching an attachment piece to a pair of T-shaped holes in a vertical rail in the process of installing a solar cell system.

As shown in FIG. 37, the attachment piece 31 is attached to the pair of T-shaped holes 14d formed in the main plate 14b of the vertical rail 14. Since the pairs of T-shaped holes 14d are formed at three places on the main plate 14b of the vertical rail 14, the attachment piece 31 is attached at each of these places.

Figure 38:
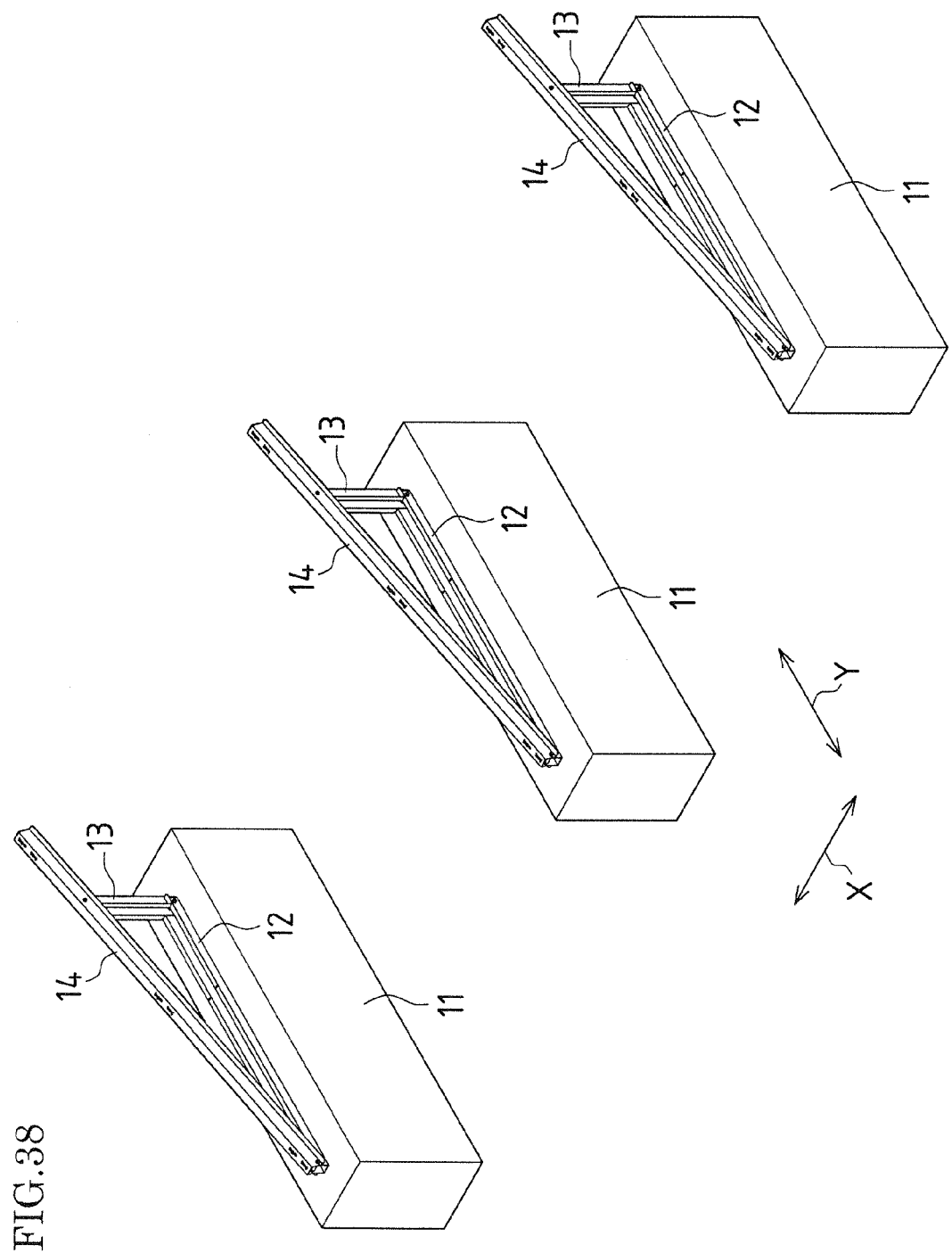
FIG. 38 is a perspective view of the state when a triangular structure including a base rail, an arm, and a vertical rail is constructed on each of a plurality of concrete foundations in the process of installing a solar cell system.

As shown in FIG. 38, a triangular structure including a base rail 12, an arm 13, and a vertical rail 14 is constructed on each of the concrete foundations 11. The attachment piece 31 is attached at each of three places on the main plate 14b for each of these vertical rails 14.

Figure 39:
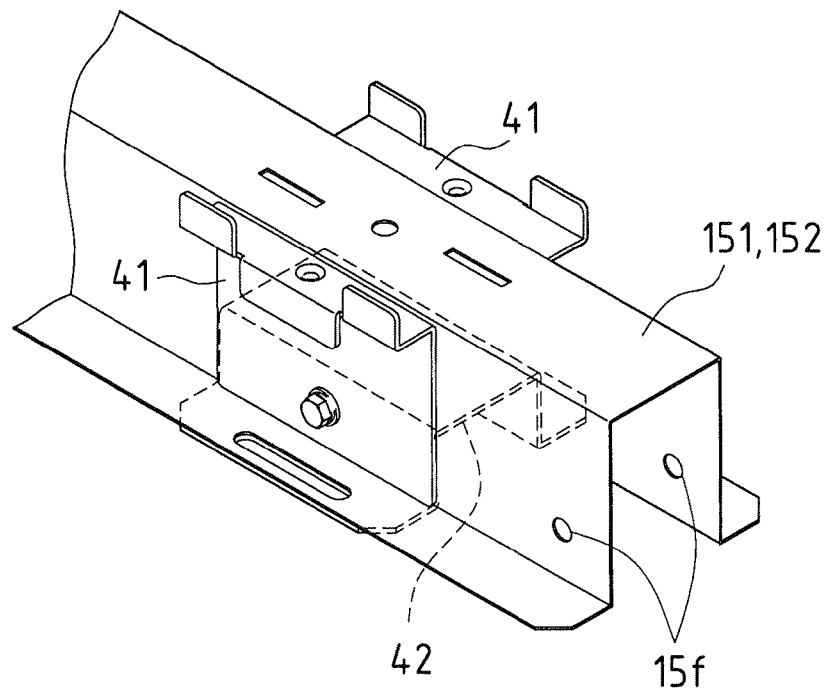
FIG. 39 is a perspective view of the state when a first connecting piece and a reinforcing piece have been attached to the middle horizontal rail in the process of installing a solar cell system.

As shown in FIG. 39, the first connecting pieces 41 and the reinforcing piece 42 are attached to the rail members 151 and 152 that will serve as the middle horizontal rail 15.

Figure 40:
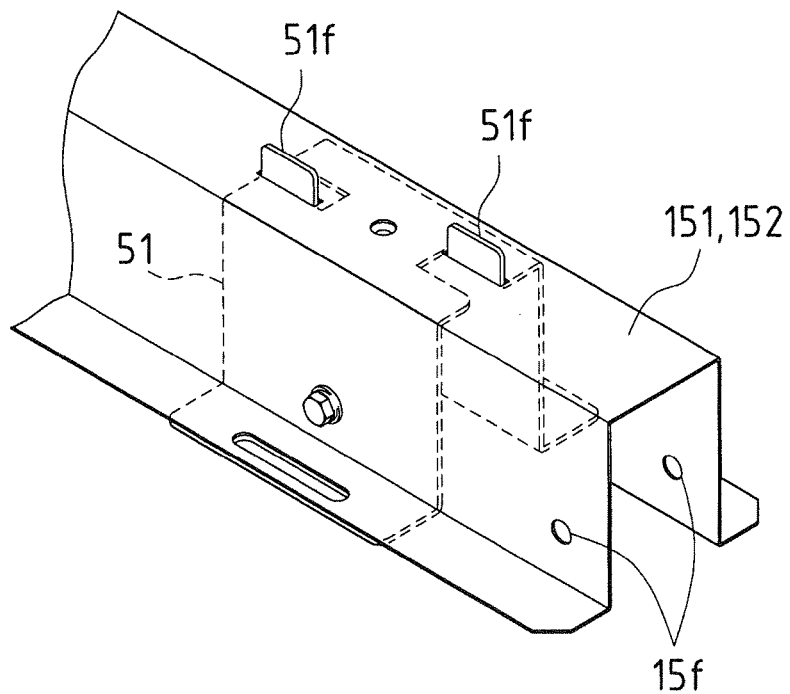
FIG. 40 is a perspective view of the state when a second connecting piece and a reinforcing piece have been attached to the upper and lower horizontal rails in the process of installing a solar cell system.

As shown in FIG. 40, the second connecting pieces 51 are attached to the rail members 151 and 152 that will serve as the upper and lower horizontal rails 15.

Figure 41:
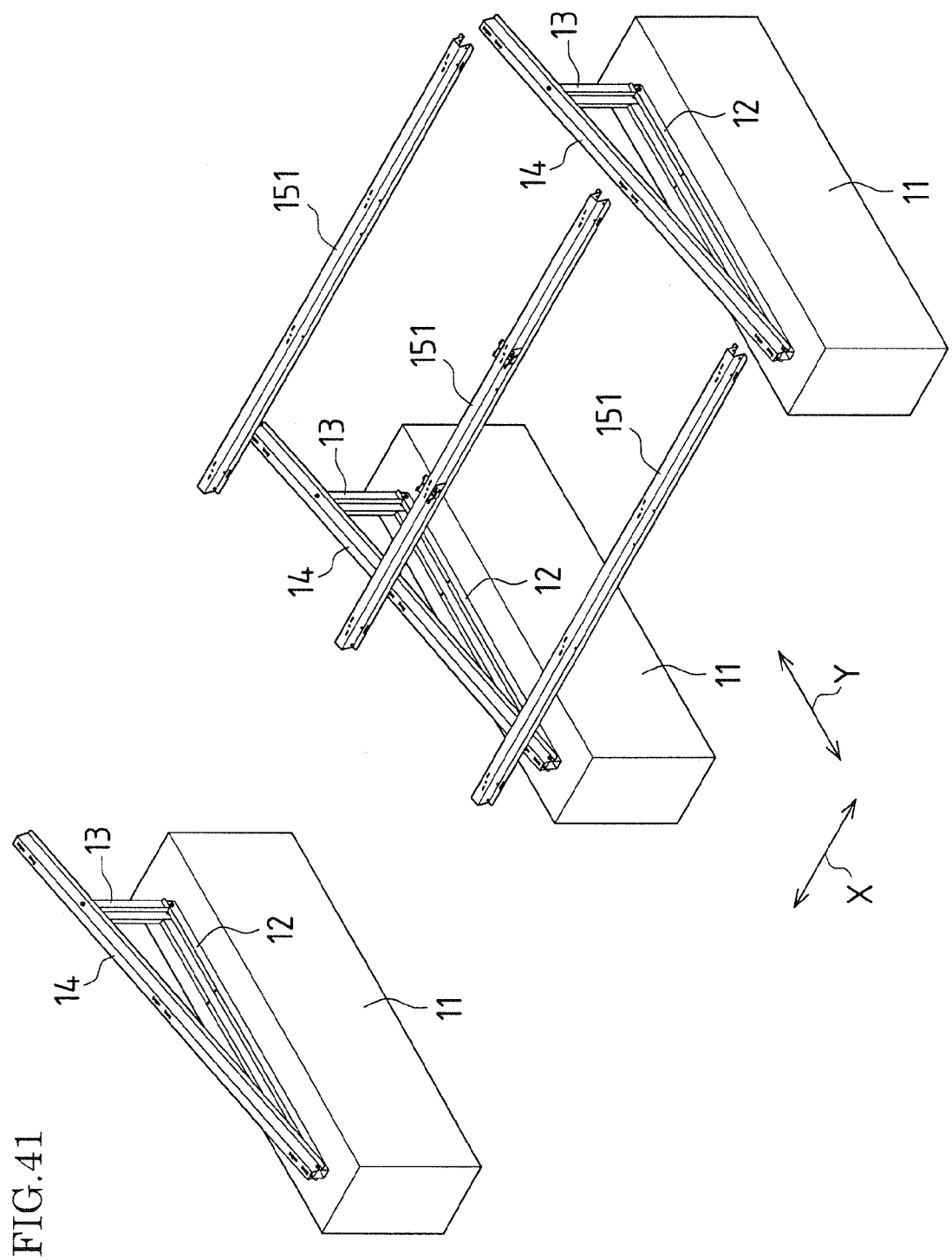
FIG. 41 is a perspective view of the state when three rail members have been placed spanning the first and second vertical rails on the far right side in the process of installing a solar cell system.

As shown in FIG. 41, three rail members 151 are provided spanning the vertical rails 14 of the first and second concrete foundations 11 on the far right side, and the rail members 151 are fixed to the vertical rails 14 by the attachment pieces 31 at three locations on the vertical rails 14. As shown in FIG. 39, the middle rail member 151 is attached to the first connecting pieces 41 and the reinforcing piece 42, and as shown in FIG. 40, the second connecting piece 51 are attached to the upper and lower rail members 151. At this point the rail members 151 are moved in the X direction to adjust their positions in the X direction. The spacing between the rail members 151 is also adjusted.

Figure 42:
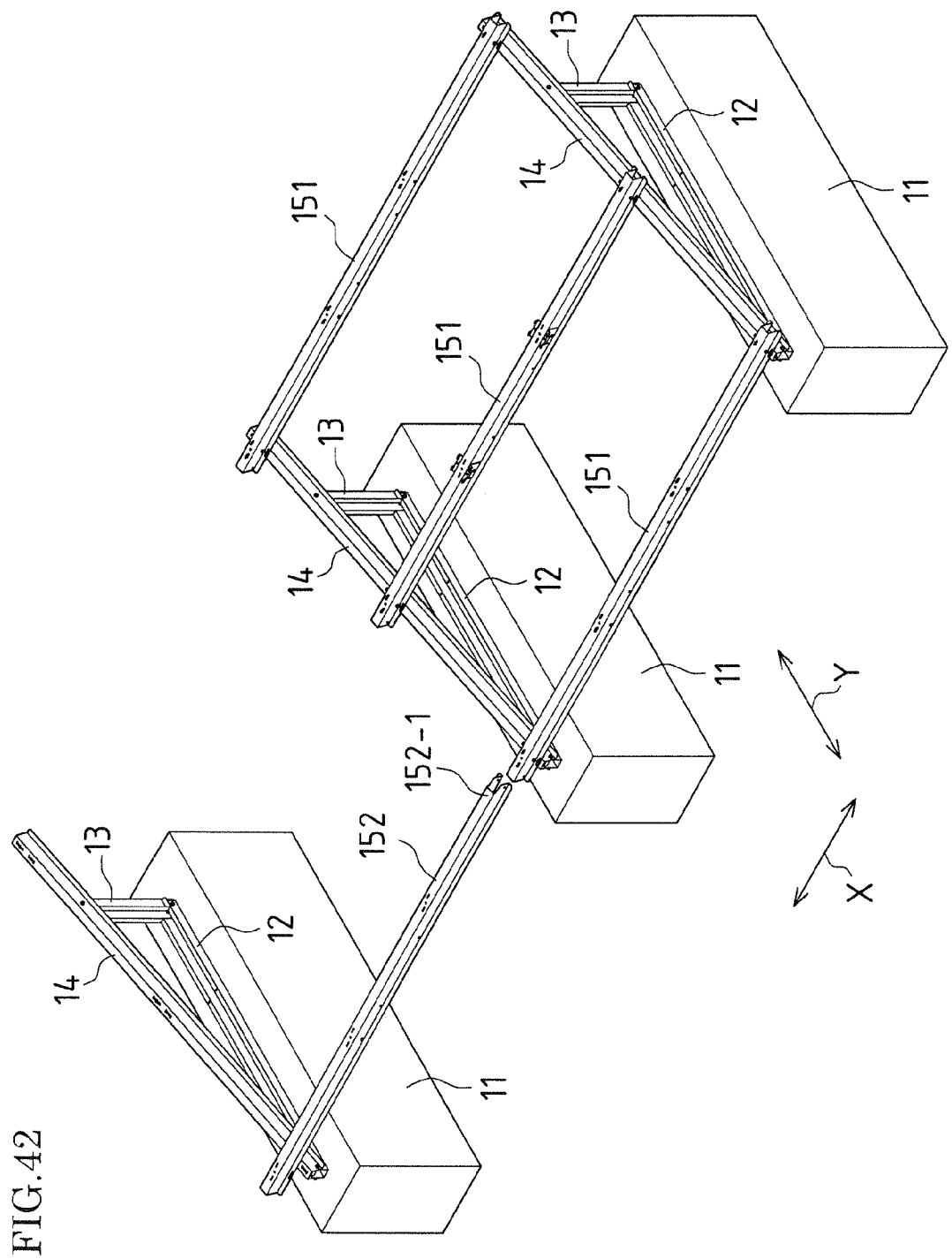
FIG. 42 is a perspective view of the state when a rail member has been placed spanning the first rail member and the third vertical rail in the process of installing a solar cell system.

As shown in FIG. 42, the rail members 151 are slightly longer than the spacing between the vertical rails 14, and the left ends of the rail members 151 stick out past the second vertical rails 14.

Figure 43:
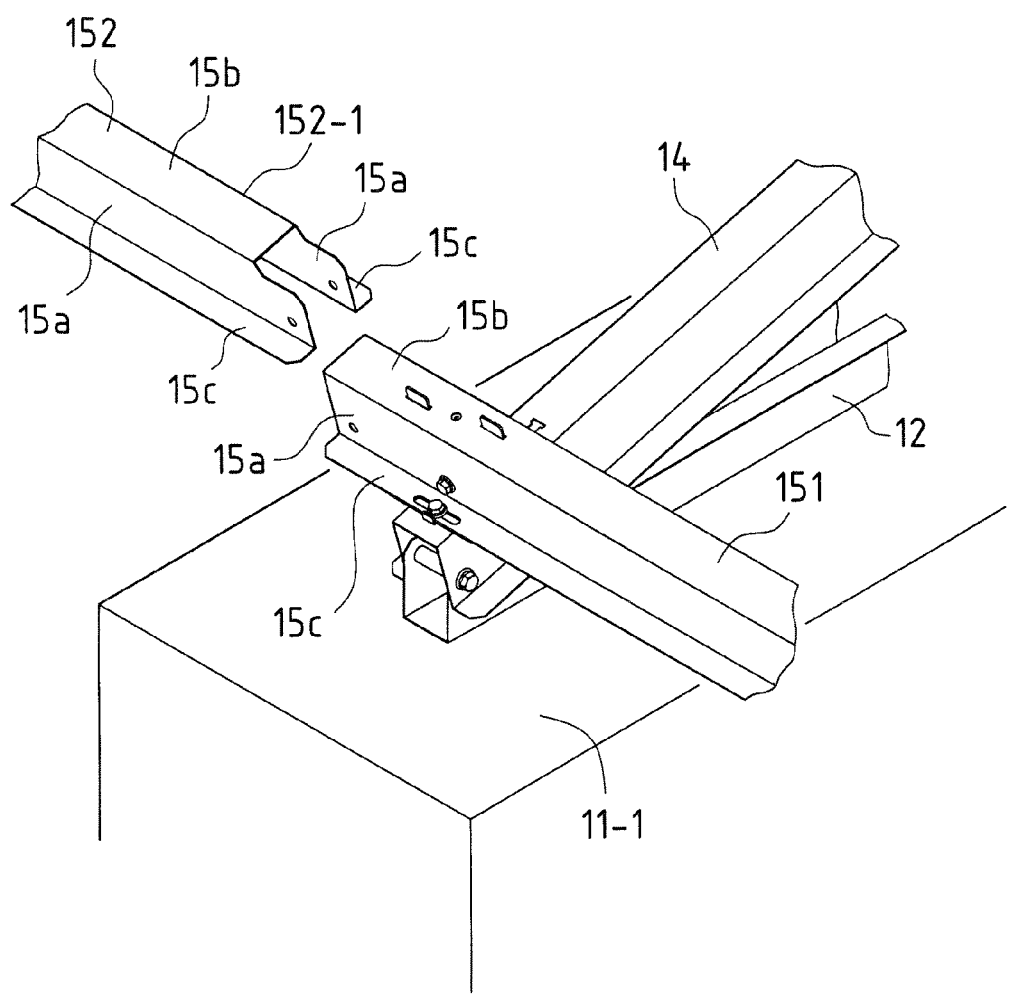
FIG. 43 is a perspective view showing FIG. 42 in partially enlarged view.

As shown in FIGS. 42 and 43, one side end 152-1 of the second lower rail member 152 is placed on the left end of the first rail member 151 sticking out from the second vertical rail 14, and the ends of the rail members 151 and 13 are connected with a pipe, a bolt, washers, a nut, etc. As shown in FIG. 10, since the distance between the side plates 15a is larger on the opening side of the hat-shaped cross sectional shape of the rail members 151 and 152, the left ends of the first side plates 15a can be inserted into and sandwiched inside the one side ends of the second side plates 15a merely by covering the left ends of the side plates 15a of the first rail member 151 with the one side ends of the side plates 15a of the second rail member 152. At the same time, the left end of the second lower rail member 152 is placed over the third vertical rail 14, and the left end of this rail member 152 is fixed with the attachment piece 31 of the vertical rail 14. By the same procedure, the second middle and upper rail members 152 are fixed spanning the third vertical rail 14 and the left ends of the first middle and upper rail members 151.

As shown in FIG. 42, for the third rail member 152, since the left end of the second rail member 152 is sticking out past the third vertical rail 14, the third rail member 152 is fixed spanning the fourth vertical rail 14 and the left end of the second rail member 152.

From there on, in the same fashion, the n-th rail member 152 is fixed spanning the (n+1)-th vertical rail 14 and the left end of the (n−1)-th rail member 152.

As is clear from FIGS. 42 and 43, the parts near the connections of the rail members 151 and 152 are placed on the vertical rails 14, providing the horizontal rails 15. This reinforces the connections of the rail members 151 and 152 and affords an increase in strength for the horizontal rails 15 overall.

Figure 44:
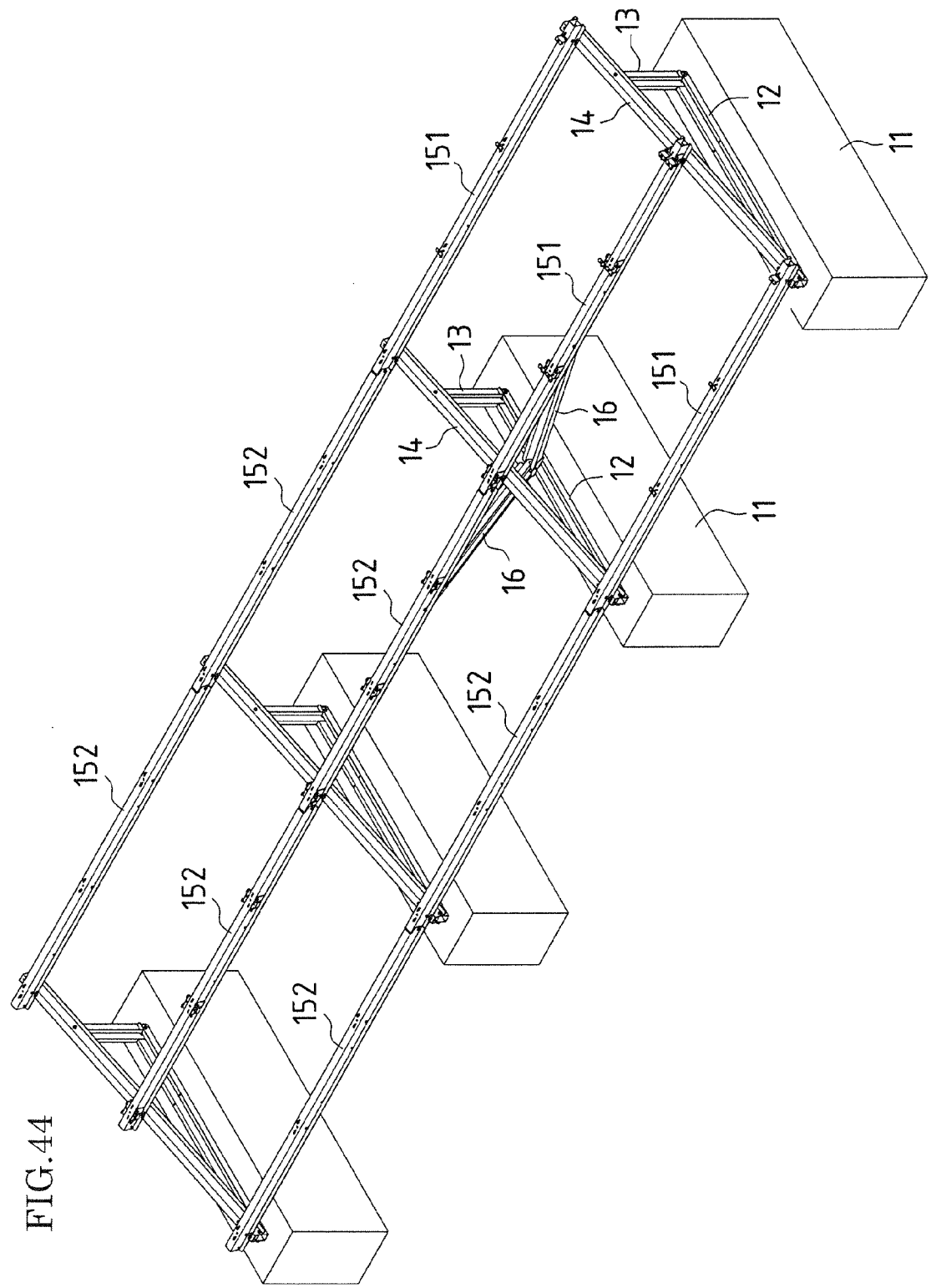
FIG. 44 is a perspective view of the state when a truss structure has been constructed in the process of installing a solar cell system.

As shown in FIG. 44, two trusses 16 are provided spanning between the base rail 12 and the middle horizontal rail 15 for every even-numbered base rail 12 to construct a truss structure for reinforcing the middle horizontal rail 15.

Figure 45:
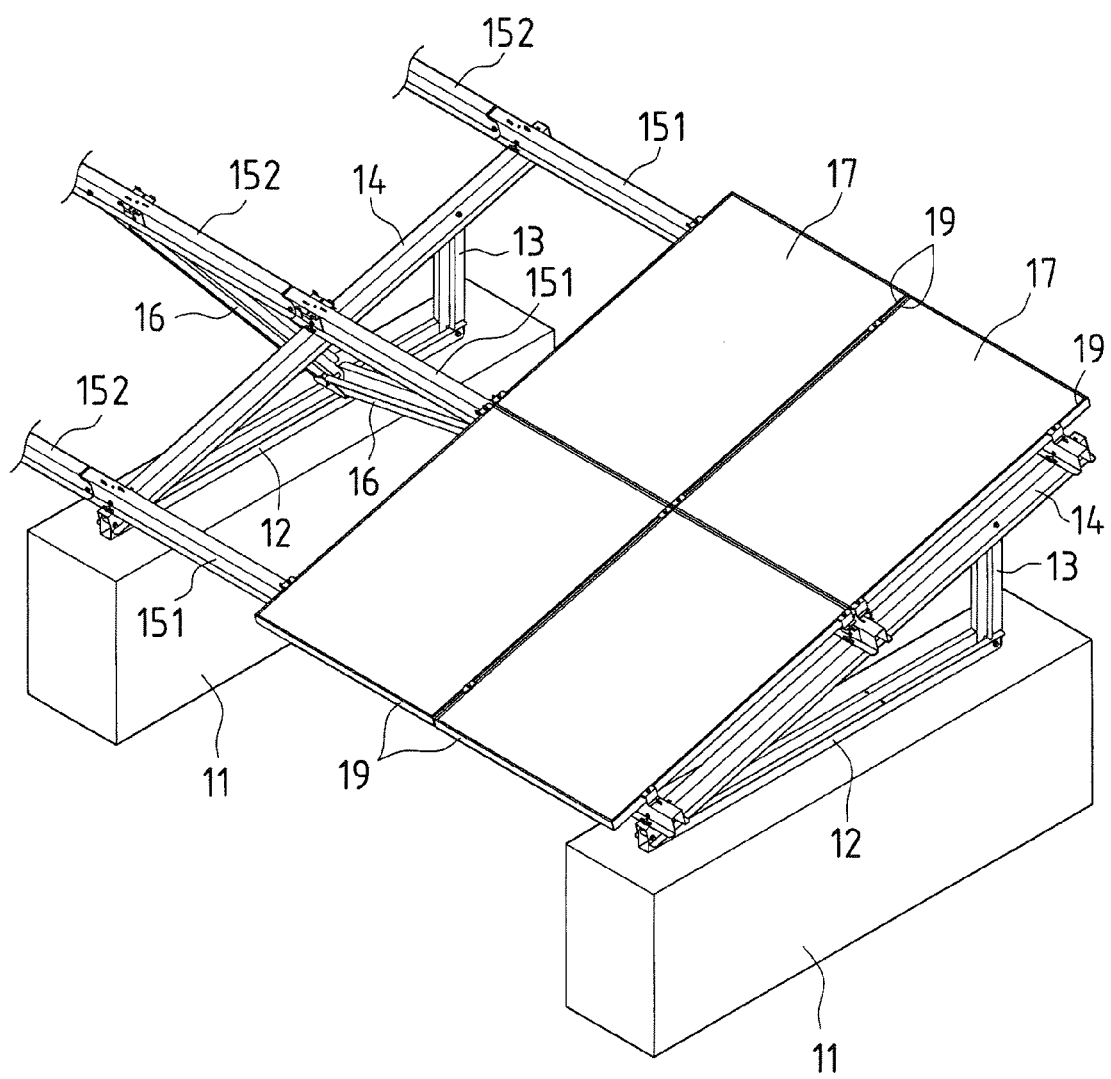
FIG. 45 is a perspective view of the state when top, bottom, left, and right solar cell modules have been attached in the process of installing a solar cell system.

As shown in FIG. 45, the frame members 19 of the upper, lower, left, and right solar cell modules 17 are fixed by the first connecting pieces 41, the second connecting pieces 51, the first fixing pieces 43, and the second fixing pieces 44. At this point, as discussed above, the inner edges 19a of the frame members 19 of the lower solar cell modules 17 are brought into contact with the protrusions 41f of the lower first connecting pieces 41 on the middle horizontal rail 15, which positions the lower solar cell modules 17 up and down, after which the frame members 19 of the upper solar cell modules 17 are brought into contact with the frame members 19 of the lower solar cell modules 17, which positions the upper solar cell modules 17 up and down.

As is clear from FIG. 45, two each of the first or second fixing pieces 43 or 44 and one each of the first and second connecting pieces 41 and 51 are disposed per side of the solar cell modules 17, and each side is fixed at two places at a spacing that is shorter than the side of the solar cell module 17. Accordingly, the fixing pieces and the connecting pieces can be spaced more tightly together, so the length of the vertical rails 14 is shorter than the sides of the solar cell modules 17, which affords a more compact structure installation rack.

An embodiment of the present invention was described in detail above, but the present invention is not limited to or by the above embodiment. Design modifications and the like are possible without departing from the gist of the present invention, and these are encompassed in the scope of the invention.

For example, the rack in the above embodiment was constructed by putting together base rails, arms, vertical rails, horizontal rails, and trusses, but some other structure may be used instead, and the horizontal rails may be provided using members that replace the base rails, arms, vertical rails, and trusses.

Also, a plurality of rail members were connected to constitute a horizontal rail, but this may instead be a vertical rail, a base rail, or another type of rail, and if this rail is so long that it is difficult for it to be constituted by a single member, a plurality of rail members may be connected to constitute another type of rail.

Figure 46:
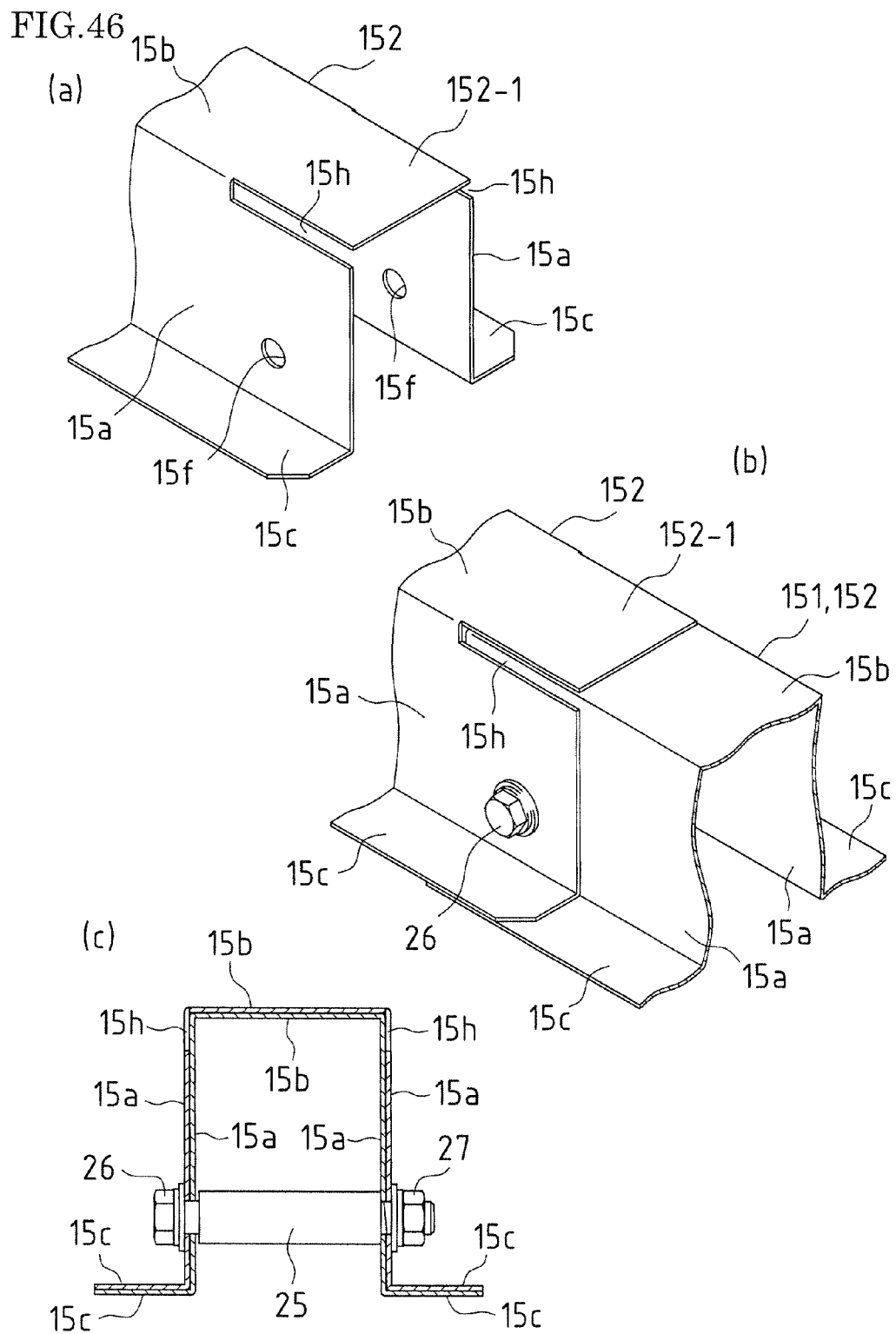
FIG. 46(a) is a perspective view of a variation of a rail member end.
FIG. 46(b) is a perspective view of the connection state between the rail member end in FIG. 46(a) and another rail member end.
FIG. 46(c) is a cross sectional view of the connection state between the rail member end in FIG. 46(a) and another rail member end.

Further, in the above embodiment, as shown in FIG. 8, a portion along one side of each of the side plates 15a and the main plate 15b were cut out at the one side end 152-1 of the rail member 152, leaving only the side plates 15a and the flanges 15c, but as shown in FIG. 46(a), portions 15h may be cut out along opposing sides of the side plates 15a at the one side end 152-1 of the rail member 152, and the side plates 15a merely separated this way from the main plate 15b. Here again, as shown in FIGS. 46(b) and 46(c), the ends of the side plates 15a of the other rail member 151 or 152 can be easily superposed on the inside or outside of the one side end 152-1 of the side plates 15a of the rail member 152.

With the one side end 152-1 of the rail member 152 in either FIG. 8 or FIG. 46(a), it is also possible to cover the outside of the one side end 152-1 by superposing it with the end of the other rail member 151 or 152, and to connect the ends of these rail members.

Figure 47:
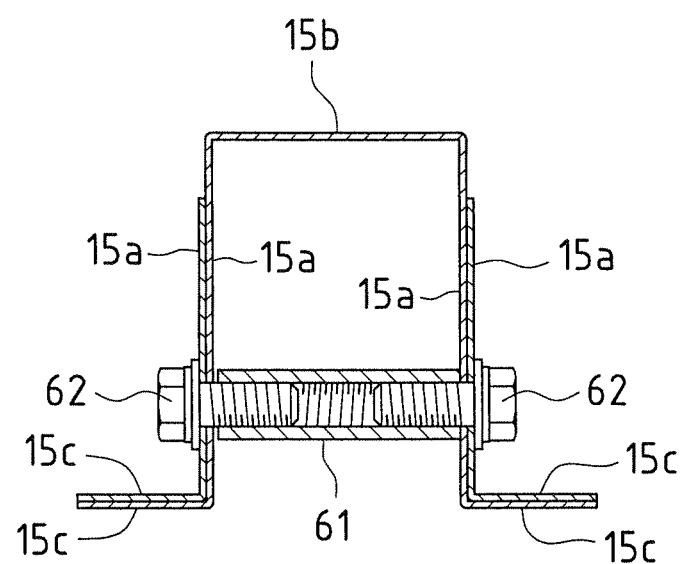
FIG. 47 is a cross sectional view of a variation of the connection structure of rail members.

The rails may also be connected to each other by some other method besides using pipes, bolts, and nuts as shown in FIG. 17(b), etc. For example, as shown in FIG. 47, a cylindrical female thread member 61 may be inserted between the side plates 15a of a rail member, and rail members may be connected by threading two bolts 62 into female threads inside this cylindrical female thread member 61 from both ends of the cylindrical female thread member 61, through the bolt holes 15f in the side plates 15a of the rail members, and tightening these bolts. Here again, the cylindrical female thread member 61 is sandwiched between the side plates 15a, which reinforces these side plates and prevents deformation of the hat-shaped cross sectional shape of the rail member. Also, the length of the cylindrical female thread member 61 is equal to the distance between the side plates, and the size of the cylindrical female thread member 61 is larger than that of the nuts, etc., which makes manual installation work easier. Also, since only the cylindrical female thread member 61 and the two bolts 62 are used, few parts and less labor are entailed, which lowers the cost.

Also, an example was given in which the base rails, arms, vertical rails, horizontal rails, and trusses had a hat-shaped cross section defined by a pair of side plates, a main plate that linked the opposing sides of the side plates, and flanges bent outward at the edges of the side plates, but instead there may be a groove-shaped cross section defined by a pair of side plates and a main plate that links the opposing sides of the side plates. Alternatively, a suitable combination of these cross sectional shapes may be used.

Further, the first connecting pieces 41 and the reinforcing pieces 42 were both used, but reinforcing pieces may be provided that fit inside the second connecting piece 51. The cross sectional shape of these reinforcing pieces may be hat-shaped or groove-shaped, and in either case, the cross sectional shape of the horizontal rails 15 may be a rectangular closed structure to improve the strength of the horizontal rails 15.

Also, the rack of this embodiment supported solar cell modules, but may instead support reflective mirror panels used for solar thermal power generation. This allows the construction of a solar thermal power generation system.

Further, in this embodiment, part of ends of the main plate and part of ends of the side plates were cut out, but the ends of the side plates can also be subjected to elastic deformation merely by making cuts in the touching portions of the main plate and side plates (the sides between the main plate and the side plates), so the rail members can be connected by superposing the ends of the side plates of one rail member on the inside or outside of the ends of the side plates of another rail member.

Also, in this embodiment, the pairs of first connecting pieces 41 were disposed in up and down symmetry with respect to the center line S of the horizontal rail 15, and the bolts 45 were also disposed in up and down symmetry with respect to the center line S of the horizontal rail 15, but as long as the same effect can be obtained, the first connecting pieces 41 or the bolts 45 may instead be offset slightly from a position of up and down symmetry.

Similarly, the bolt hole 15*e* in the main plate 15*b* of the horizontal rail 15 was formed on the center line S, and the threaded hole 51*e* in the second connecting piece 51 was formed on the center line S, but as long as the same effect can be obtained, the bolt hole 15*e* or the threaded hole 51*e* may instead be offset slightly from the center line S.

Also, with the rack of this embodiment, steel is mainly used as the material, but to superpose the ends of the side plates of one rail member on the ends of the side plates of another rail member among rail members that are the same size and have the same cross sectional shape, the ends of the side plates of the rail members must be manually subjected to elastic deformation by an amount equal to the sheet thickness of the side plates. Accordingly, the sheet thickness of the rail members is preferably 2.0 mm or less, and 1.6 mm or less is even better in terms of ease of installation. On the other hand, the rail members need to be strong enough to support the structures, so the sheet thickness of the rail members is preferably at least 0.5 mm.

Figure 48:
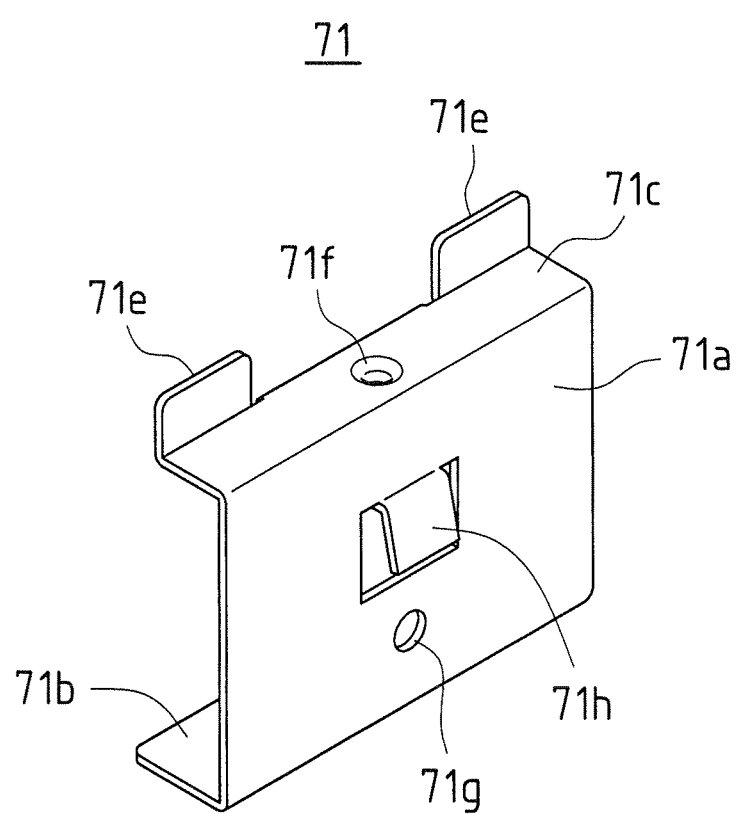
FIG. 48 is a perspective view of a variation of a first connecting piece for attaching a solar cell module to the middle horizontal rail.
Figure 49:
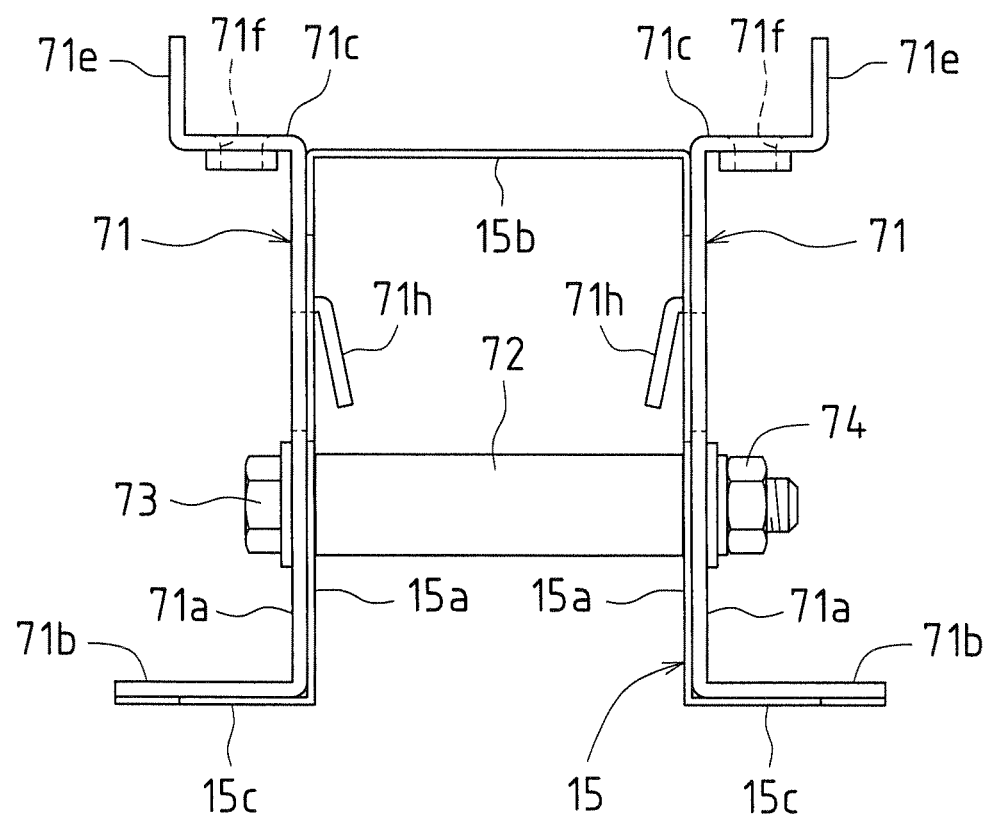
FIG. 49 is a cross sectional view of the state when the first connecting piece in FIG. 48 has been attached to the middle horizontal rail.

The shape or structure of the first or second connecting pieces may also be modified as needed. FIG. 48 is a perspective view of a variation of a first connecting piece for attaching a solar cell module 17 to a middle horizontal rail 15. FIG. 49 is a cross sectional view of the state when the first connecting piece in FIG. 48 has been attached to the middle horizontal rail.

The first A connecting piece 71 in this variation has a side plate 71*a*, a bottom plate 71*b* bent at the lower edge of the side plate 71*a*, a main plate 71*c* bent at the upper edge of the side plate 71*a*, protrusions 71*e* bent up at both ends on one side of the side plate 71*a*, a threaded hole 71*f* formed in the approximate center of the main plate 71*c*, and a bolt hole 71*g* formed in the approximately center of the side plate 71*a*.

A rectangular cut is made above the position of the bolt hole 71*g* in the side plate 71*a* of the first A connecting piece 71, and an inner portion of this rectangular cut is pushed out from the side plate 71*a* to the opposite side from the bottom plate 71*b* and the main plate 71*c*, and serves as a claw 71*h*.

The height from the lower face of the bottom plate 71*b* of the first A connecting piece 71 to the upper face of the main plate 71*c* is greater than the height from the upper face of the flanges 15*c* of the middle horizontal rail 15 to the upper face of the main plate 15*b*. More specifically, the height to the upper face of the main plate 71*c* of the first A connecting piece 71 is set to be greater than the height to the upper face of the main plate 15*b* of the horizontal rail 15 by an amount equal to the sheet thickness of the piece.

This first A connecting piece 71 is similar to the first connecting piece 41 in FIGS. 21(*a*) to 21(*c*) in that it is disposed in pairs at the places where the pair of slits 15*d* and the bolt hole 15*e* (see FIG. 3, etc.) are formed in the main plate 15*b* of the middle horizontal rail 15, the side plates 71*a* of the two first A connecting pieces 71 are superposed on the side plates 15*a* of the horizontal rail 15, the main plates 71*c* of the first A connecting pieces 71 are oriented so as to protrude outward from the horizontal rail 15, and the protrusions 71*e* of the first A connecting pieces 71 protrude above the main plate 15*b* of the horizontal rail 15.

The claw 71*h* in the side plate 71*a* of each of the first A connecting pieces 71 engages with an engagement hole (not shown) in each of the side plates 15*a* of the horizontal rail 15, and the first A connecting pieces 71 are temporarily fastened to the side plates 15*a* of the horizontal rail 15. Here, we will assume that the engagement holes are formed at appropriate locations on the side plates 15*a* of the horizontal rail 15.

Because of the above-mentioned height setting from the lower face of the bottom plate 71*b* of the first A connecting piece 71 to the upper face of the main plate 71*c*, the upper face of the main plate 71*c* of the first A connecting piece 71 is higher than the upper face of the main plate 15*b* of the horizontal rail 15 by an amount equal to the sheet thickness of the piece.

In this state, a pipe 72 is inserted between the side plates 15*a* of the horizontal rail 15, then the pipe 72, the bolt holes 15*f* in the side plates 15*a* of the horizontal rail 15, and the bolt holes 71*g* in the side plates 71*a* of the first A connecting pieces 71 are aligned, a bolt 73 is passed through the pipe 72, the bolt holes 15*f* in the side plates 15*a* of the horizontal rail 15, the bolt holes 71*g* in the side plates 71*a* of the first A connecting pieces 71, and washers, and a nut 74 is threaded into the end of the bolt 73 and tightened to fix the first A connecting pieces 71 to the horizontal rail 15.

Figure 50:
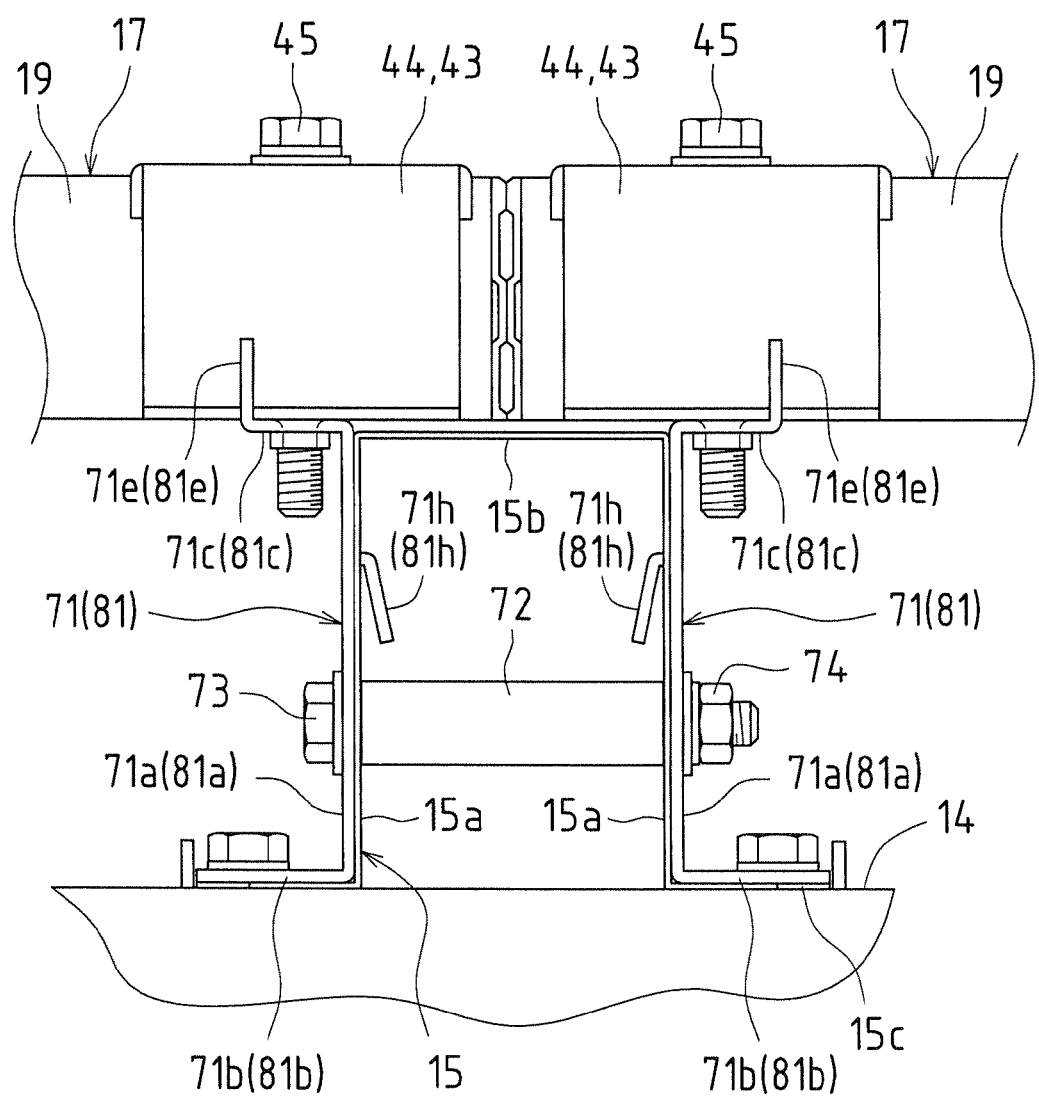
FIG. 50 is a cross sectional view of the state when the first connecting piece of FIG. 48 and a first or second fixing piece have been used to attach a solar cell module to a horizontal rail.

As shown in FIG. 50, the frame members 19 of solar cell modules 17 are then put between the protrusions 71*e* of the first A connecting pieces 71 and placed on the main plates 71*c*, the second fixing pieces 44 (or the first fixing pieces 43) are pushed against the frame members 19 of the solar cell modules 17, the bolts 45 are threaded into the threaded holes 71*f* of the main plates 71*c* of the first A connecting pieces 71 via the bolt holes 44*c* in the second fixing pieces 44 (or the bolt holes 43*c* in the first fixing pieces 43), and the bolts are tightened to sandwich and fix the frame members 19 of the solar cell modules 17 between the main plates 71*c* of the first A connecting pieces 71 and the second fixing pieces 44 (or the first fixing pieces 43).

In this state, since the upper face of the main plate 71*c* of the first A connecting piece 71 is higher than the upper face of the main plate 15*b* of the horizontal rail 15 by an amount equal to the sheet thickness of the piece, the frame members 19 of the solar cell modules 17 float above the upper face of the main plate 15b of the horizontal rail 15. Therefore, a channel is formed that allows water to escape between the frame members 19 of the solar cell modules 17 and the main plates 15b of the horizontal rails 15, which prevents the members from rusting. In this embodiment, the height was increased by an amount equal to the sheet thickness of the piece, but for the same purpose it is equally effective to increase the height by an amount equal to the sheet thickness of the rail.

Water release holes are sometimes formed in the corner sections of the frame members 19 of the solar cell modules 17, and if water that has leaked in through these water release holes stands for an extended period, it can cause the members to rust, but if this water is discharged through the channel between the main plates 15b of the horizontal rails 15 and the frame members 19 of the solar cell modules 17, then rusting of the members can be prevented.

Figure 51:
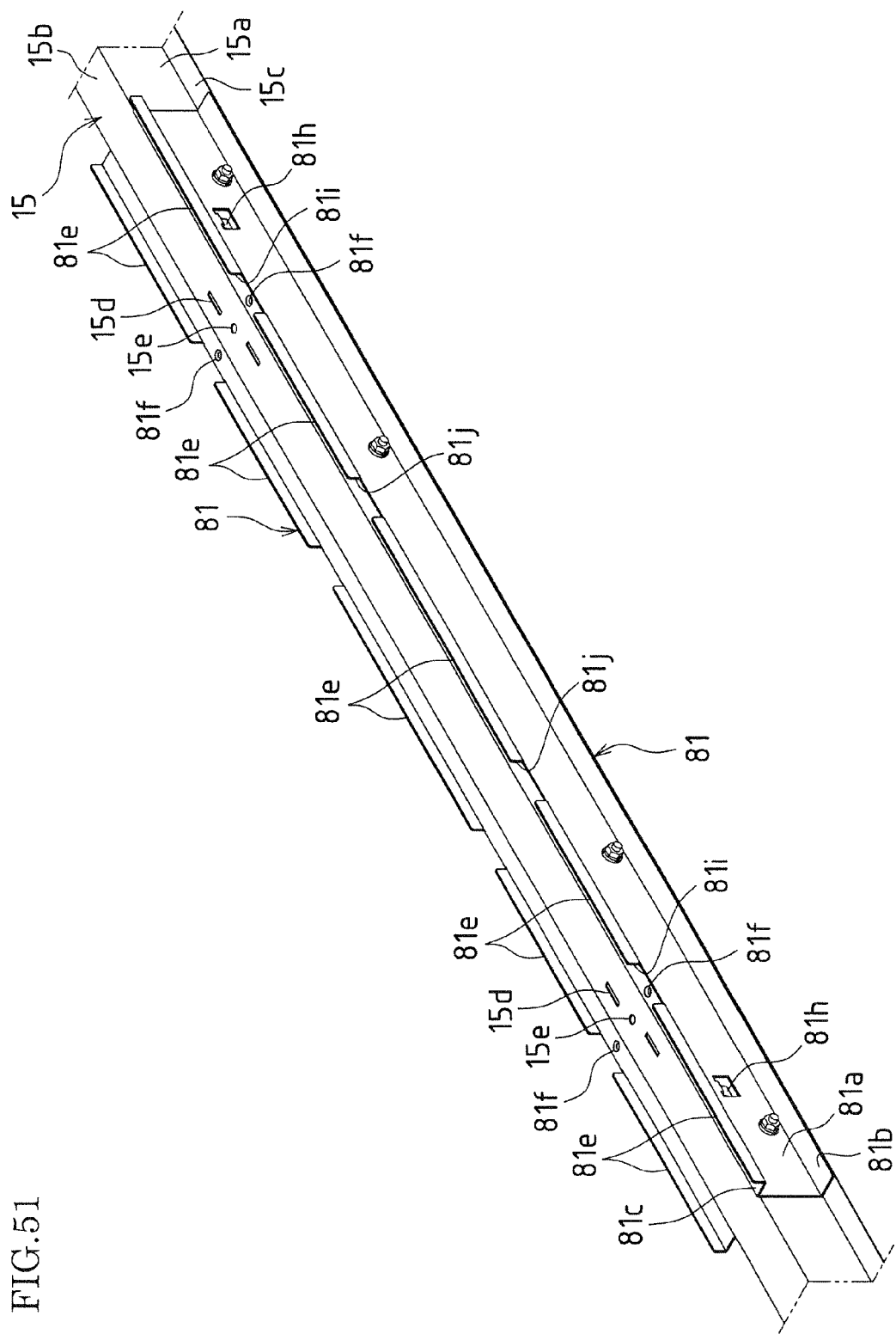
FIG. 51 is a perspective view of another variation of a first connecting piece.

FIG. 51 is a perspective view of another variation of a first connecting piece. The first B connecting piece 81 in this variation has a side plate 81a, a bottom plate 81b bent at the lower edge of the side plate 81a, a main plate 81c bent at the upper edge of the side plate 81a, protrusions 81e bent up at a plurality of locations on one side of the side plate 81a, two threaded holes 81f formed in the main plate 81c, bolt holes (not shown) formed at a plurality of locations in the side plate 81a, and two claws 81h. The length of this first B connecting piece 81 is set greater than the width of a solar cell module 17.

There are five of the protrusions 81e, a total of four cut-outs 81i and 81j are formed between the protrusions 81e, and the threaded holes 81f of the main plate 81c are formed at the locations of the two cut-outs 81i at both ends. The distance between the two threaded holes 81f is set somewhat greater than the width of a solar cell module 17.

The height from the lower face of the bottom plate 81b of the first B connecting piece 81 to the upper face of the main plate 81c is greater than the height from the upper face of the flanges 15c of the middle horizontal rail 15 to the upper face of the main plate 15b by an amount equal to the sheet thickness of the piece.

Figure 52:
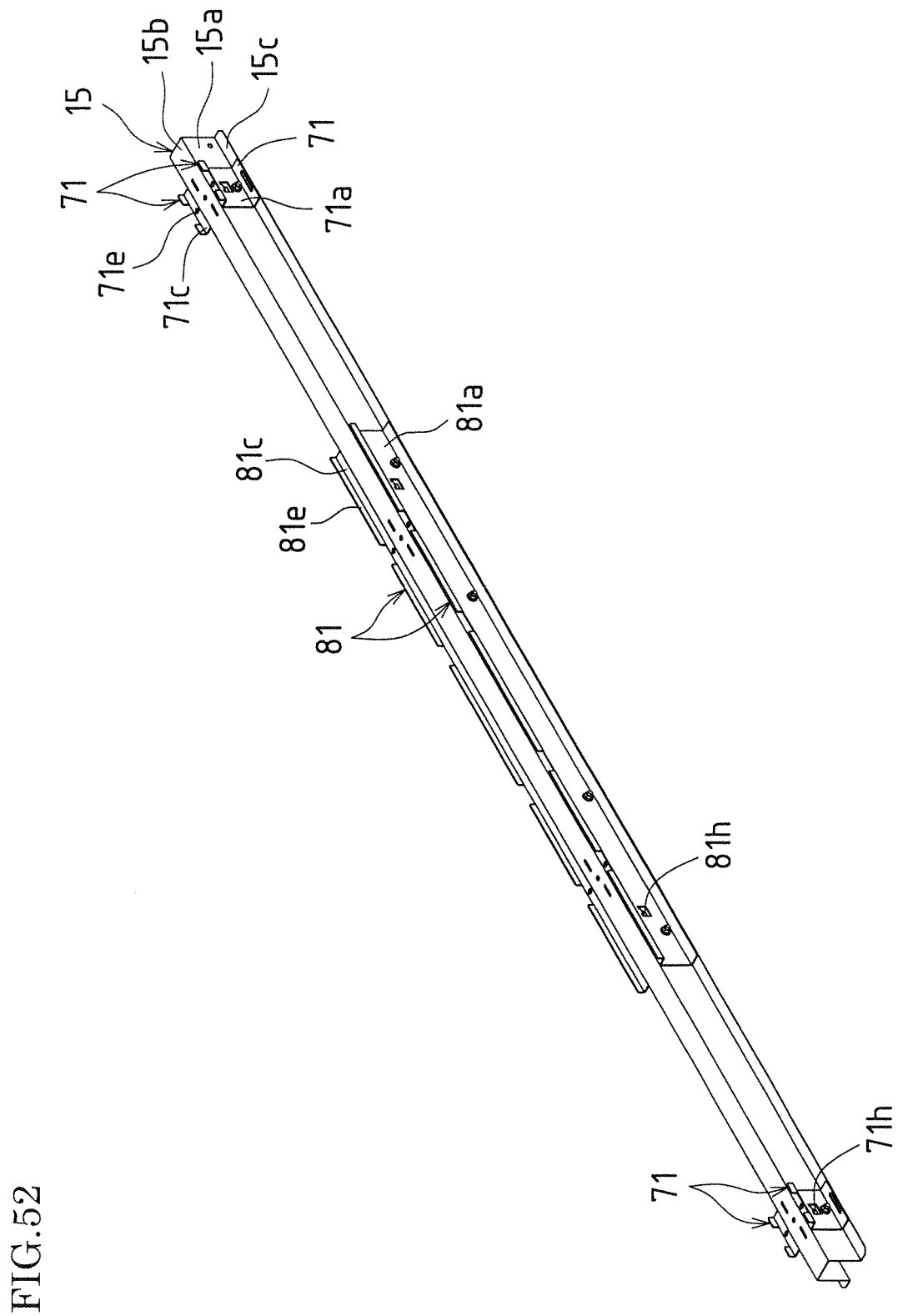
FIG. 52 is a perspective view of the state when the first connecting piece of FIG. 51 has been attached to the middle horizontal rail.

As shown in FIG. 52, the first B connecting piece 81 is used along with the first A connecting piece 71 shown in FIGS. 48 and 49. A pair of the first B connecting pieces 81 is disposed in the middle part of the middle horizontal rail 15, and a pair of the first A connecting pieces 71 is disposed at each end of the middle horizontal rail 15. The side plates 71a and 81a of the first A connecting pieces 71 and first B connecting pieces 81 are superposed on the side plates 15a of the horizontal rail 15, the main plates 71c and 81c are oriented so that they protrude outward from the horizontal rail 15, and the protrusions 71e and 81e protrude above the main plate 15b of the horizontal rail 15. Also, the claws 71h and 81h of the side plates 71a and 81a engage with engagement holes (not shown) in the side plates 15a of the horizontal rail 15, which temporarily fastens the first A connecting pieces 71 and the first B connecting pieces 81 to the side plates 15a of the horizontal rail 15. Further, the upper faces of the main plates 71c and 81c are higher than the upper face of the main plate 15b of the horizontal rail 15 by an amount equal to the sheet thickness of the pieces.

In this state, with the first A connecting pieces 71, just as in FIG. 49, pipes 72 are inserted between the side plates 15a of the horizontal rail 15, then bolts 73 are passed through the pipes 72, the bolt holes 15f in the side plates 15a of the horizontal rail 15, the bolt holes 71g in the side plates 71a of the first A connecting pieces 71, and washers, and nuts 74 are threaded into the ends of the bolts 73 and tightened to fix the first A connecting pieces 71 to the horizontal rail 15. For the first B connecting pieces 81 as well, the pipes 72 are inserted between the side plates 15a of the horizontal rail 15, then bolts 73 are passed through the pipes 72, the bolt holes 15f in the side plates 15a of the horizontal rail 15, the bolt holes in the side plates 81a of the first B connecting pieces 81, and washers, and nuts 74 are threaded into the ends of the bolts 73 and tightened to fix the first B connecting pieces 81 to the horizontal rail 15. Since four bolt holes are formed in the side plates 81a of the first B connecting pieces 81, the first B connecting pieces 81 are fixed to the horizontal rail 15 by using a pipe 72, a bolt 73, and a nut 74 for each of these bolt holes.

After this, the frame members 19 of the two (upper and lower) solar cell modules 17 are placed between the first A connecting pieces 71 at one end of the horizontal rail 15 and the first B connecting pieces 81, the frame members 19 of the two (upper and lower) solar cell modules 17 are placed on the first B connecting pieces 81, and the frame members 19 of the two (upper and lower) solar cell modules 17 are placed between the first A connecting pieces 71 at the other end of the horizontal rail 15 and the first B connecting pieces 81, with the frame members 19 of a total of six solar cell modules 17 being placed on a single horizontal rail 15.

The first A connecting pieces 71 fix the frame members 19 of the solar cell modules 17 as shown in FIG. 50.

Also, with the first B connecting pieces 81, the locations of the two cut-outs 81i at the ends corresponds to the space between the protrusions 71e of the first A connecting pieces 71, the frame members 19 of two adjacent (to the left and right) solar cell modules 17 are put in the locations of the cut-outs 81i and placed on the main plates 81c, and just as in FIG. 27, the first fixing pieces 43 are inserted between the frame members 19 of the solar cell modules 17, bolts 45 are threaded into the threaded holes 81f in the first B connecting pieces 81 via the bolt holes 43c in the first fixing pieces 43, and the bolts 45 are tightened to sandwich and fix the frame members 19 of the solar cell modules 17 between the first fixing pieces 43 and the main plates 81c of the first B connecting pieces 81.

Also, two cut-outs 81i are provided to each first B connecting piece 81, the two sides of the frame member 19 of a single solar cell module 17 are disposed in these cut-outs 81i, each first fixing piece 43 is pushed against the two sides of the frame member 19 of the solar cell module 17, and two bolts 45 are threaded into the threaded holes 81f in the main plates 81c of the first B connecting pieces 81 via the bolt holes 43c in the first fixing pieces 43. Therefore, the distance between the threaded holes 81f has to be greater than the width of the solar cell module 17 so that the solar cell module 17 can be disposed in the space between the two threaded holes 81f.

When these first B connecting pieces 81 are used along with the first A connecting pieces 71, since the upper faces of the main plates 71c of the first A connecting pieces 71 and the upper faces of the main plates 81c of the first B connecting pieces 81 float above the upper face of the main plate 15b of the horizontal rail 15 by an amount equal to the sheet thickness of the pieces, a channel is formed that allows water to escape between the frame members 19 of the solar cell modules 17 and the main plates 15b of the horizontal rails 15, which prevents the members from rusting.

Also, since the length of the first B connecting pieces 81 is greater than the width of the solar cell modules 17, the side plates 81a and bottom plates 81b of the first B connecting pieces 81 are superposed over a longer distance with the side plates 15a and flanges 15c of the middle horizontal rail 15, and when the first B connecting pieces 81 are fixed to the middle horizontal rail 15, this effectively reinforces this middle horizontal rail 15. Therefore, the first B connecting pieces 81 not only support the frame members 19 of three solar cell modules 17, but also serve as reinforcements for the middle horizontal rail 15. Since the middle horizontal rail 15 bears a heavier load than the upper and lower horizontal rails 15, such reinforcement of the middle horizontal rail 15 is beneficial.

The present invention can be worked in various other modes without departing from the gist or main features thereof. Accordingly, the above embodiments are in all respects nothing more than mere examples, and should not be interpreted as limiting in nature. The scope of the present invention is as indicated by the claims, and is not restricted whatsoever to the text of this Specification. Furthermore, all modifications and variations belonging to a scope equivalent to the claims fall within the scope of the present invention.

This application claims priority right based on Japanese Patent Applications 2009-185047 and 2009-185050 submitted in Japan on Aug. 7, 2009, and also claims priority right based on Japanese Patent Applications 2009-251345 and 2009-251346 submitted in Japan on Oct. 30, 2009. The entire content of these applications is hereby incorporated herein by reference.

Industrial Applicability

The present invention can be widely applied to any solar cell system that makes use of a solar cell module.

Description of Reference Numerals 11 concrete foundation
12 base rail
13 arm
14 vertical rail
15 horizontal rail
16 truss
17 solar cell module
18 solar cell panel
19 frame member
21, 26, 32, 45 bolt
22 reinforcing piece
25 pipe
27 nut
31 attachment piece
41 first connecting piece
42 reinforcing piece
43 first fixing piece
44 second fixing piece
51 second connecting piece
71 first A connecting piece
81 first B connecting piece

The invention claimed is:

1. A solar cell module connecting structure for connecting and fixing solar cell modules, comprising:
rails on which the solar cell modules are installed, and connecting members that connect and fix the solar cell modules to the rails, said solar cell modules being disposed directly on the connecting members,
wherein the rails have a main plate and a pair of side plates extending in the same direction, and have a shape in which the sides of the pair of side plates extending in said direction are linked by the main plate, the main plate is placed on top so that the solar cell modules are placed on the main plate,
the solar cell modules comprise two solar cell modules that are provided on the main plate of the rails that are common to the two solar cell modules,
the connecting members are in pairs, and
the connecting members in pairs are superposed on and fixed to the respective side plates of the rails, and the ends of the solar cell modules are connected to the pair of connecting members at positions that are linearly symmetrical in relation to the center lines of the rails.

2. The solar cell module connecting structure for connecting and fixing solar cell modules, according to claim 1, wherein:
the rails are obtained by connecting a plurality of rail members,
part of at least one end of the rail main plate and each rail side plate of each of the connected rail members is cut out along said direction, or a cut is made along said direction between the at least one end of the rail main plate and the at least one end of each side plate, and adjacent ones of the rail members are connected at ends of the rail side plates thereof, with the end of one rail side plate being superposed outside or inside the end of the other rail side plate as a result of the elastic deformation of the rail side plates of the rail members, and
the width of the rail main plates of the rail members is the same.

3. The solar cell module connecting structure according to claim 1,
wherein the connecting members comprise protrusions that stick out over the main plates of the rails.

4. A solar cell system, comprising:
a solar cell module connecting structure for connecting and fixing solar cell modules according to claim 1 is used to connect and fix solar cell modules on the rails.

5. A method for installing a solar cell module connecting structure, comprising:
providing a solar cell module connecting structure for connecting and fixing solar cell modules according to claim 1, wherein the connecting member includes a protrusion that sticks up on the main plate of the rail, and
the solar cell module is placed on the main plate of the rail and the solar cell module is positioned by being latched to the protrusion of the connecting member.

6. A solar cell module connecting structure for connecting and fixing solar cell modules, comprising:
rails on which the solar cell modules are installed, and connecting members that connect and fix the solar cell modules to the rails, said solar cell modules being disposed directly on the connecting members,
wherein the rails have a main plate and a pair of side plates extending in the same direction, and have a shape in which the sides of the pair of side plates extending in said direction are linked by the main plate, the main plate is placed on top so that the solar cell modules are placed on the main plate,
the solar cell modules comprise two solar cell modules that are provided on the main plate of the rails that are common to the two solar cell modules,
wherein the connecting members each have a main plate and a pair of side plates extending in the same direction, and have a shape in which the sides of the pair of side plates extending in said direction are linked by the main plate, and
a cross section of the connecting members is disposed so as to be superposed on the inside of a cross section of the rails, and the solar cell modules are connected to the main plates of the connecting members via holes on the center lines of the main plates of the rails.

7. A solar cell module connecting structure for connecting and fixing solar cell modules, comprising:

rails on which the solar cell modules are installed, and connecting members that connect and fix the solar cell modules directly to the rails, wherein the rails have a main plate and a pair of side plates extending in the same direction, and have a shape in which the sides of the pair of side plates extending in said direction are linked by the main plate, the main plate being placed on top so that the solar cell modules are placed on the main plate, the solar cell modules are provided on the main plate of the rails, and the connecting members have a main plate and a pair of side plates extending in the same direction, said side plates being linked and having protrusions, the main plate of the rails has a slit, the connecting members of the rails are provided superposed inside the rails so that the protrusions of the connecting members protrude from the slit in the main plate of the rails, the solar cell modules are connected using the protrusions of the connecting members which protrude from the slit in the main plate of the rails.

8. A solar cell system in which the solar cell module connecting structure according to claim 7 is used to connect and fix solar cell modules on the rails.

9. The solar cell module connecting structure for connecting and fixing solar cell modules, according to claim 7, wherein:

the rails are obtained by connecting a plurality of rail members, part of at least one end of the rail main plate and each rail side plate of each of the connected rail members is cut out along said direction, or a cut is made along said direction between the at least one end of the rail main plate and the at least one end of each side plate, and adjacent ones of the rail members are connected at ends of the rail side plates thereof, with the end of one rail side plate being superposed outside or inside the end of the other rail side plate as a result of the elastic deformation of the rail side plates of the rail members, and the width of the rail main plates of the rail members is the same.

\* \* \* \* \*